(12) United States Patent
Kim

(10) Patent No.: US 10,358,085 B2
(45) Date of Patent: Jul. 23, 2019

(54) LAMP FOR VEHICLE

(71) Applicant: LG ELECTRONICS INC., Seoul (KR)

(72) Inventor: Geunhyeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 415 days.

(21) Appl. No.: 15/153,582

(22) Filed: May 12, 2016

(65) Prior Publication Data

US 2016/0332568 A1 Nov. 17, 2016

(30) Foreign Application Priority Data

May 12, 2015 (KR) .................. 10-2015-0066002

(51) Int. Cl.
| | |
|---|---|
| *B60Q 1/00* | (2006.01) |
| *B60Q 9/00* | (2006.01) |
| *B60Q 1/14* | (2006.01) |
| *B60Q 1/50* | (2006.01) |
| *F21S 41/64* | (2018.01) |

(52) U.S. Cl.
CPC ............ *B60Q 9/00* (2013.01); *B60Q 1/1438* (2013.01); *B60Q 1/50* (2013.01); *F21S 41/645* (2018.01); *B60Q 2300/112* (2013.01); *B60Q 2300/305* (2013.01); *B60Q 2300/322* (2013.01); *B60Q 2300/324* (2013.01); *B60Q 2300/41* (2013.01); *B60Q 2300/45* (2013.01); *B60Q 2400/50* (2013.01)

(58) Field of Classification Search
CPC .................................. B60Q 1/00; B60K 1/00
See application file for complete search history.

(56) References Cited

U.S. PATENT DOCUMENTS

| | | | |
|---|---|---|---|
| 2002/0092346 A1* | 7/2002 | Niekerk .............. | B60C 23/0416 73/146.2 |
| 2008/0198372 A1 | 8/2008 | Pan | |
| 2014/0085917 A1* | 3/2014 | Guan ................... | F21S 41/695 362/512 |
| 2014/0177243 A1* | 6/2014 | Noh ...................... | B60Q 1/143 362/466 |
| 2014/0218212 A1* | 8/2014 | Nykerk ................ | B60Q 1/0023 340/901 |
| 2015/0224926 A1* | 8/2015 | Mochizuki ............ | B60R 1/00 701/36 |

(Continued)

FOREIGN PATENT DOCUMENTS

| | | |
|---|---|---|
| DE | 102009020910 | 11/2010 |
| JP | 2005157873 | 6/2005 |
| JP | 2008-143505 | 6/2008 |

(Continued)

OTHER PUBLICATIONS

Extended European Search Report issued in European Application No. 16169313.0 dated Oct. 5, 2016, 7 pages.

*Primary Examiner* — Shirley Lu
(74) *Attorney, Agent, or Firm* — Fish & Richardson P.C.

(57) ABSTRACT

A lamp, for a vehicle, that includes at least one light source configured to generate light; a transparent display configured to allow at least a portion of the light to pass through the transparent display; and a processor configured to control the transparent display to display, on a projection surface using the light, information related to the vehicle or driving conditions for the vehicle is disclosed.

30 Claims, 48 Drawing Sheets

(56) References Cited

U.S. PATENT DOCUMENTS

2015/0232030 A1\* 8/2015 Bongwald ................. B60R 1/00
348/115

FOREIGN PATENT DOCUMENTS

| JP | 2010-095048 | 4/2010 |
|----|-------------|--------|
| JP | 2014-013524 | 1/2014 |
| JP | 2014-144725 | 8/2014 |
| JP | 2014153868 | 8/2014 |
| JP | 2014-189198 | 10/2014 |
| KR | 10-2013-0117992 | 10/2013 |
| WO | 2015/032795 | 3/2015 |
| WO | 2015/033900 | 3/2015 |

\* cited by examiner

LAMP FOR VEHICLE

CROSS-REFERENCE TO RELATED APPLICATION

This application claims the priority benefit of Korean Patent Application No. 10-2015-0066002, filed on May 12, 2015 in the Korean Intellectual Property Office, the disclosure of which is incorporated herein by reference.

TECHNICAL FIELD

The present disclosure generally relates to a lamp for a vehicle.

BACKGROUND

A vehicle is an apparatus that moves into a specific direction as a driver operates. A common example of a vehicle is a car.

A vehicle is equipped with various lamps including a headlamp and a rear combination lamp. The headlamp secures a clear view for drivers at night. A rear combination lamp includes a brake light, a stop lamp, and a turn signal lamp. The rear combination lamp provides information, such as braking and turning, to pedestrians or other vehicles.

SUMMARY

A lamp for a vehicle includes a transparent display. The lamp can secure a clear view for a driver at night and provide information to the driver. Also, the lamp can provide detailed information about the surroundings of the vehicle to the back of the vehicle.

In general, one innovative aspect of the subject matter described in this specification can be embodied in a lamp for a vehicle including at least one light source configured to generate light; a transparent display configured to allow at least a portion of the light to pass through the transparent display; and a processor configured to control the transparent display to display, on a projection surface using the light, information related to the vehicle or driving conditions for the vehicle.

The foregoing and other embodiments can each optionally include one or more of the following features, alone or in combination. In particular, one embodiment includes all the following features in combination. The processor is configured to control the transparent display to display a pattern on at least one area of the transparent display. The processor is configured to display a predetermined content on the transparent display. The lamp further includes an aspheric lens configured to allow the light generated by the light source to be refracted and pass through the aspheric lens, wherein the transparent display is disposed at a front end or at a rear end of the aspheric lens. The processor is configured to display the information related to the vehicle or the driving conditions for the vehicle in one area corresponding to a user's gaze sensed by a camera. The lamp further includes a position adjustment unit configured to adjust a position of the transparent display, wherein the processor is configured to control the position adjustment unit to adjust the position of the transparent display based on a location of the projection surface. The processor is configured to filter the information related to the vehicle or the driving conditions for the vehicle using an optical filter, wherein the optical filter is located at a windshield. The projection surface is a road surface, and wherein the processor is configured to display driving lanes on the road surface. The processor is configured to display the information related to the vehicle or the driving conditions for the vehicle between the driving lanes. The processor is configured to display the information related to the vehicle or the driving conditions for the vehicle between the lanes based on curve information of a road on which the vehicle travels. The lamp further includes an interface unit configured to receive the information related to the vehicle or the information related to the driving condition for the vehicle, wherein the information related to the driving condition for the vehicle includes forward objects information, rearward objects information, navigation information, road information, or driving environment information, wherein the information related to the vehicle includes vehicle condition information, vehicle driving information, or in-vehicle situation information, and wherein the light source comprises a headlamp. The interface unit receives distance information about a forward object ahead of the vehicle, wherein the processor is configured to display the distance information on the projection surface. The road information comprises gradient information or curve information of a road on which the vehicle travels, wherein the processor is configured to display the gradient information or the curve information on the projection surface. The forward objects information comprises traffic sign recognition (TSR) detection information or speed bump detection information, wherein the processor is configured to display the TSR detection information or the speed bump detection information on the projection surface. The TSR detection information comprises traffic signboard detection information, traffic light detection information, and road surface detection information, wherein the processor is configured to display, on the projection surface, information based on a design or text marked on a traffic signboard, a signal output from a traffic light, or a design or text marked on a road surface. The processor is configured to display, on the projection surface, a bump image based on the speed bump detection information. The forward objects information comprises other-vehicle detection information, two-wheeled vehicle detection information, pedestrian detection information, traffic accident information, construction information, or road congestion information, wherein the processor is configured to display the other-vehicle detection information, the two-wheeled vehicle detection information, the pedestrian detection information, the traffic accident information, the construction information, or the road congestion information on the projection surface. The interface unit is configured to receive side vehicle detection information, wherein the processor is configured to, based on the other-vehicle detection information, two-wheeled vehicle detection information or pedestrian detection information being received with the side vehicle detection information, display the other-vehicle detection information, two-wheeled vehicle detection information, or pedestrian detection information on a lane of a side vehicle. The navigation information comprises driving route information, preset destination information, remaining distance information, driving area information, driving road information, or speed camera information, wherein the processor is configured to display the driving route information, the preset destination information, the remaining distance information, the driving area information, the driving road information, or the speed camera information on the projection surface. The processor is configured to display a straight arrow, a left turn arrow, a right turn arrow, or a U-turn arrow on the projection surface as the driving route information. The interface unit is configured to receive side vehicle detection information, wherein the processor is configured to, based on the driving route information being received with the side vehicle detection information, display the straight arrow, the left turn arrow, the right turn arrow, or the U-turn arrow on the lane of the side vehicle as the driving route information. The vehicle condition information comprises parking brake state information, high beam on/off information, washer liquid level information, engine oil level information, power source temperature information, remaining energy information, tire pressure information, brake oil condition information, or door opening information, wherein the processor is configured to display the parking brake state information, the high beam on/off information, the washer liquid level information, the engine oil level information, the power source temperature information, the remaining energy information, the tire pressure information, the brake oil condition information, or the door opening information on the projection surface. The vehicle driving information comprises driving speed information, gear shift information, or turn signal information delivered to a turn signal lamp, wherein the processor is configured to display the driving speed information, the gear shift information, or the turn signal information on the projection surface. The interface unit is configured to receive side vehicle detection information, wherein the processor is configured to, based on the turn signal information being received with the side vehicle detection information, display the turn signal information on a lane of a side vehicle. The interface unit is configured to receive user input provided through an input unit, wherein the processor is configured to display, on the projection surface, in-vehicle situation information corresponding to the user input. The in-vehicle situation information comprises patient evacuation situation information, or emergency aid request information, wherein the in-vehicle situation information is generated according to the user input. The driving environment information comprises weather information or time information, wherein the processor is configured to display the weather information or the time information on the projection surface. The lamp further includes an interface unit configured to receive forward objects information, rearward objects information, navigation information, vehicle condition information, vehicle driving information, driving environment information, or in-vehicle situation information, wherein the light source comprises a rear combination lamp. The in-vehicle situation information comprises emergency aid information, infant-on-board information, or inexperienced driver information. The processor is configured to, based on distance information about a rearward object behind the vehicle being received through the interface unit, adjust a distance between the projection surface and the rear combination lamp or an intensity of light emitted outward from the rear combination lamp according to the distance information. The forward objects information comprises traffic sign recognition (TSR) detection information or speed bump detection information, wherein the processor is configured to display the TSR detection information or the speed bump detection information. The driving environment information comprises fog information, and wherein the processor is configured to, based on the vehicle travelling in an area with fog, display the fog information in the area with fog.

In general, another innovative aspect of the subject matter described in this specification can be embodied in a lamp for a vehicle including at least one light source configured to generate light; a laser generation unit configured to generate laser output; and a processor configured to control the laser generation unit to display, on a projection surface in light emitted from the light source using the laser output, information related to the vehicle or driving conditions for the vehicle.

The foregoing and other embodiments can each optionally include one or more of the following features, alone or in combination. In particular, one embodiment includes all the following features in combination. The light source comprises a headlamp or a rear combination lamp.

In general, another innovative aspect of the subject matter described in this specification can be embodied in a vehicle including a lamp that includes at least one light source configured to generate light; a transparent display configured to allow at least a portion of the light to pass through the transparent display; and a processor configured to control the transparent display to display, on a projection surface using the light, information related to the vehicle or driving conditions for the vehicle.

DETAILED DESCRIPTION

A vehicle described in this specification may include a car and a motorcycle. Hereinafter, description will be given focusing on a car as the vehicle.

The vehicle described in this specification may include a motor vehicle equipped with an internal combustion engine as a power source, a hybrid vehicle equipped with both an engine and an electric motor as a power source, and an electric vehicle equipped with an electric motor as a power source.

In the description given below, the left side of a vehicle indicates the left side with respect to the forward driving direction of the vehicle, and the right side of the vehicle indicates the right side with respect to the forward driving direction of the vehicle.

In the description given below, the term "front" indicates the forward driving direction of the vehicle, and "rear" indicates the rearward driving direction of the vehicle.

Figure 1:
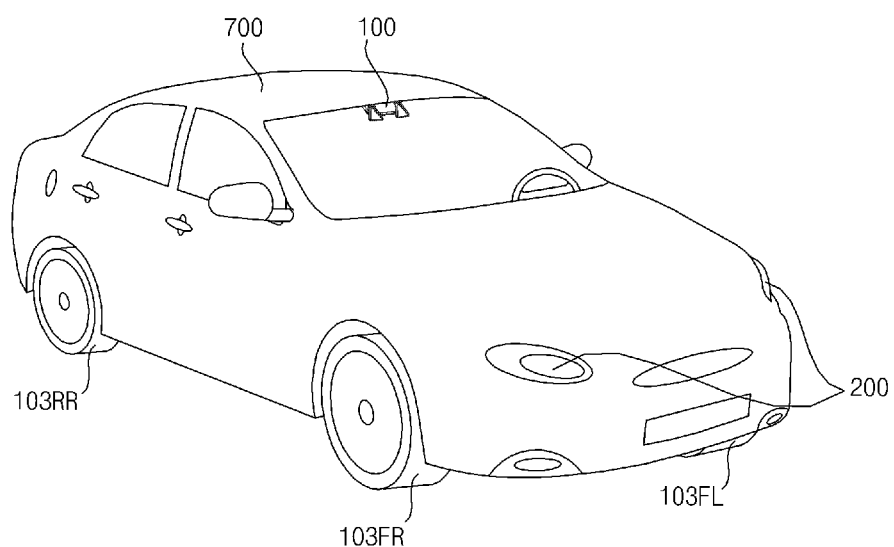
FIG. 1 is a diagram illustrating an example exterior of a vehicle including a lamp for a vehicle.
Figure 1:
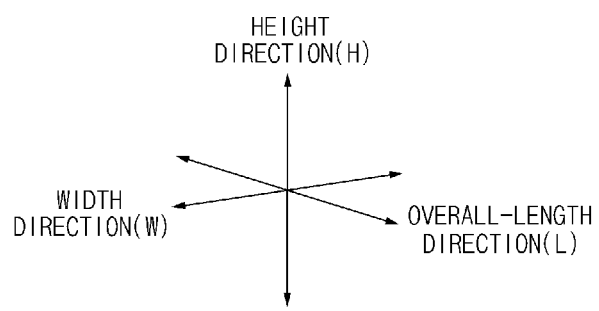

FIG. 1 illustrates an example exterior of a vehicle including a lamp for vehicles.

Referring to FIG. 1, a vehicle 700 may include wheels 103FR, 103FL, 103RR rotated by a power source, a driver assistance system 100 provided in the vehicle 700, and lamps 200 for vehicles.

Figure 7A:
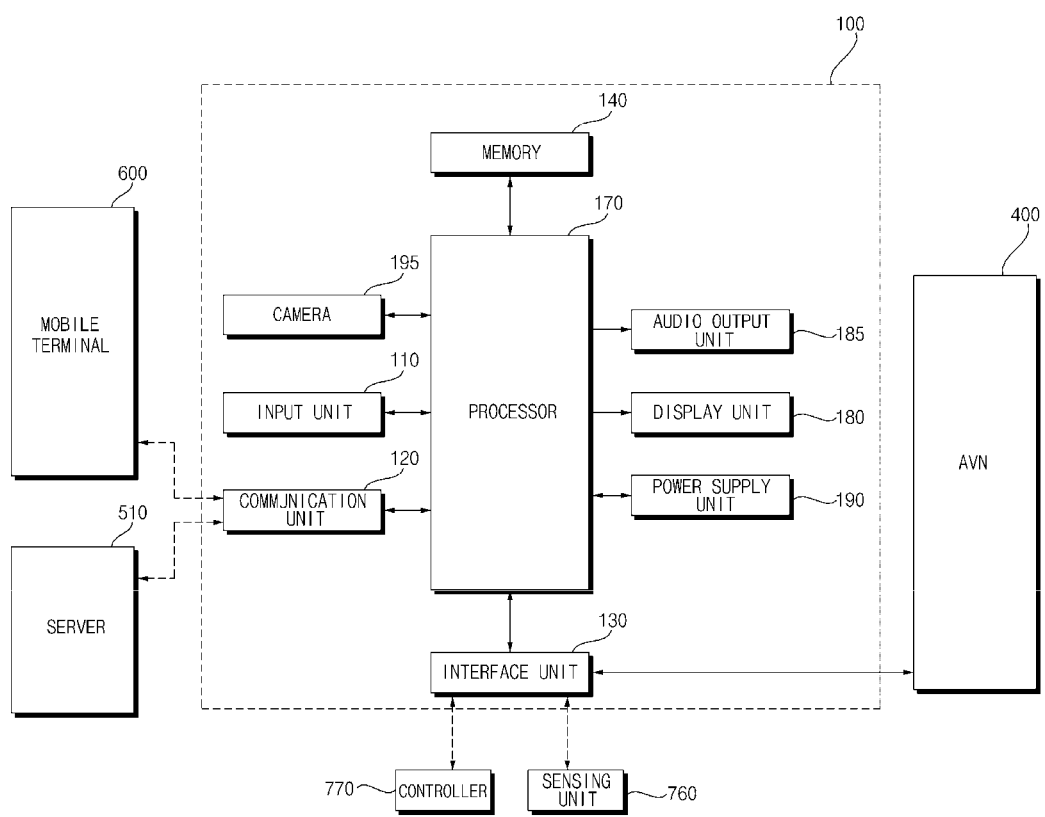
FIGS. 7A to 7C are block diagrams illustrating an example interior of a driver assistance system.
Figure 7B:
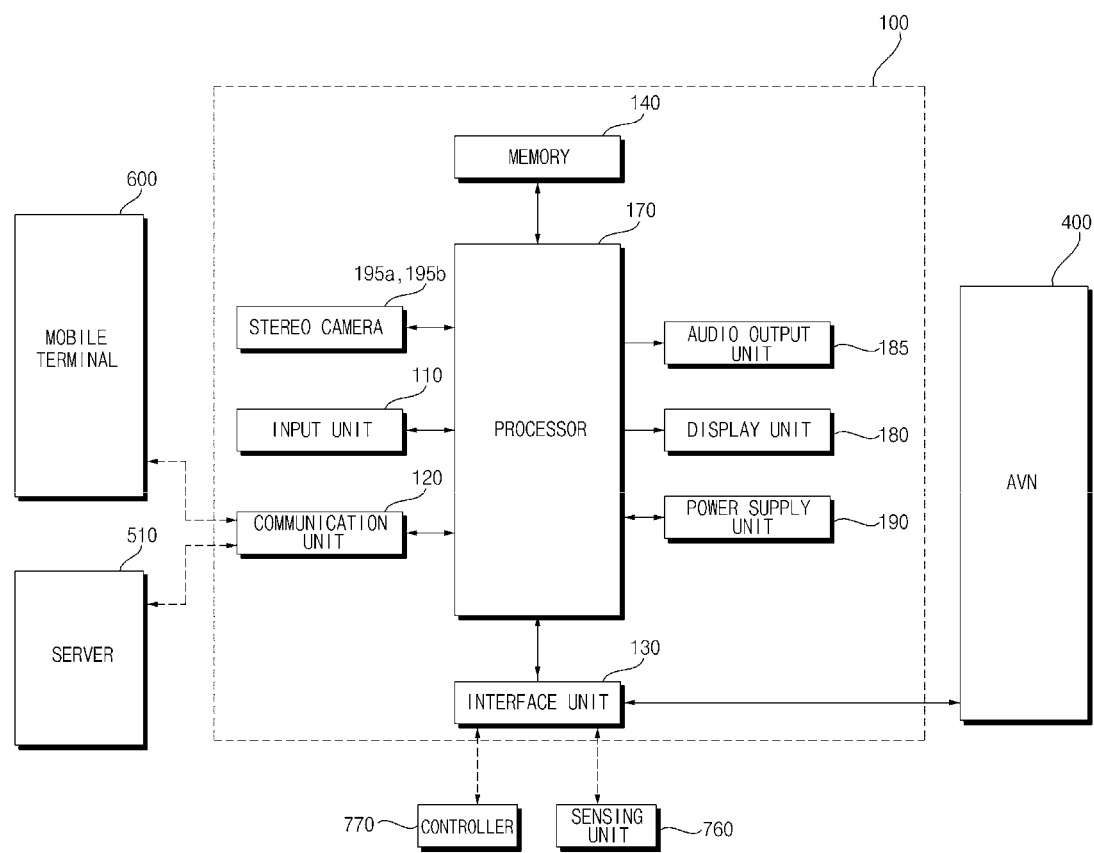
Figure 7C:
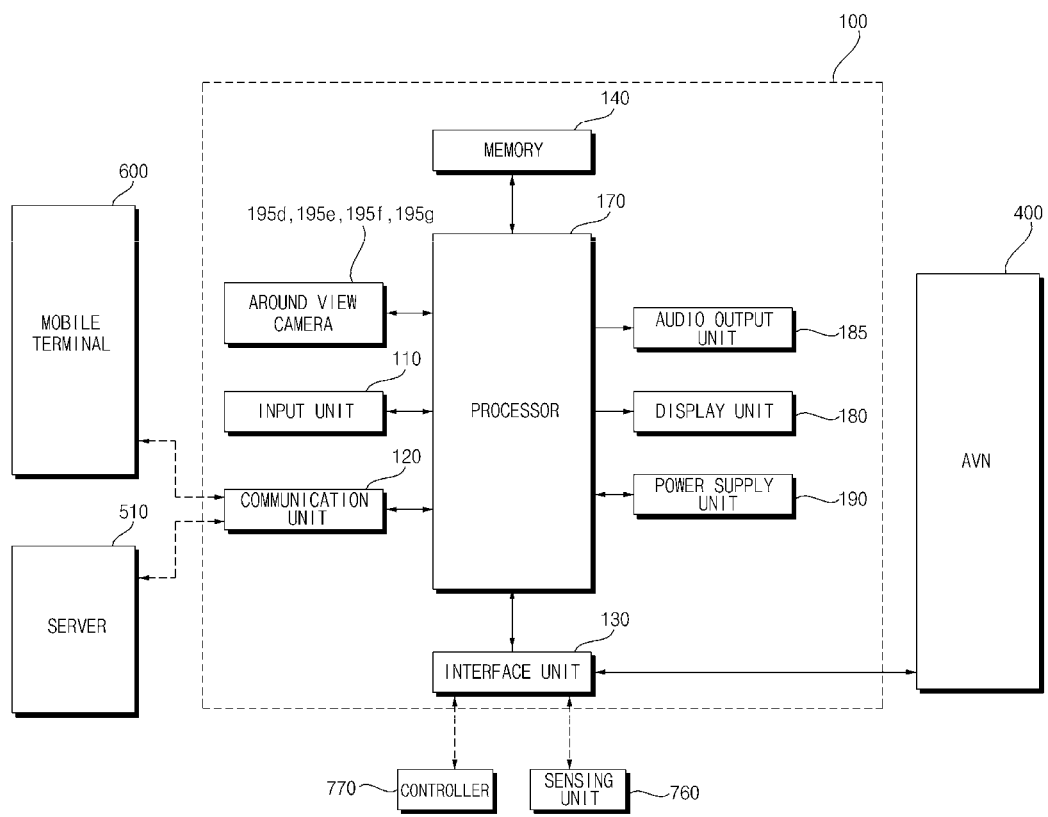

The driver assistance system 100 may be provided with at least one camera, and images acquired by the at least one camera may be signal-processed in a processor 170 (see FIGS. 7A to 7C).

In the illustrated example, the driver assistance system 100 is provided with two cameras.

The lamp 200 may be one of a headlamp and a rear combination lamp.

The headlamp may include a 2-light type, 4-light type and a 6-light type. In addition, light output from the headlamp may be white or yellow light. Configuration and color of light of the headlamp are variable according to the regulations of each nation or situations, and not intended to limit the scope of the present invention.

The rear combination lamp includes various lamps attached to the back of the vehicle 700. The rear combination lamp includes at least one of a stop lamp, a taillight, a turn signal lamp, a fog light, a sidelight and a reverse light.

Meanwhile, the overall length refers to the length of the vehicle 700 from the front to back of the vehicle, the width refers to width of the vehicle 700, and the height refers to the distance from the bottom of a wheel to the roof of the vehicle. In the description below, the overall-length direction L may indicate a direction in which measurement of overall length of the vehicle 700 is performed, the width direction W may indicate a direction in which measurement of width of the vehicle 700 is performed, and the height direction H may indicate a direction in which measurement of height of the vehicle 700 is performed.

Figure 2A:
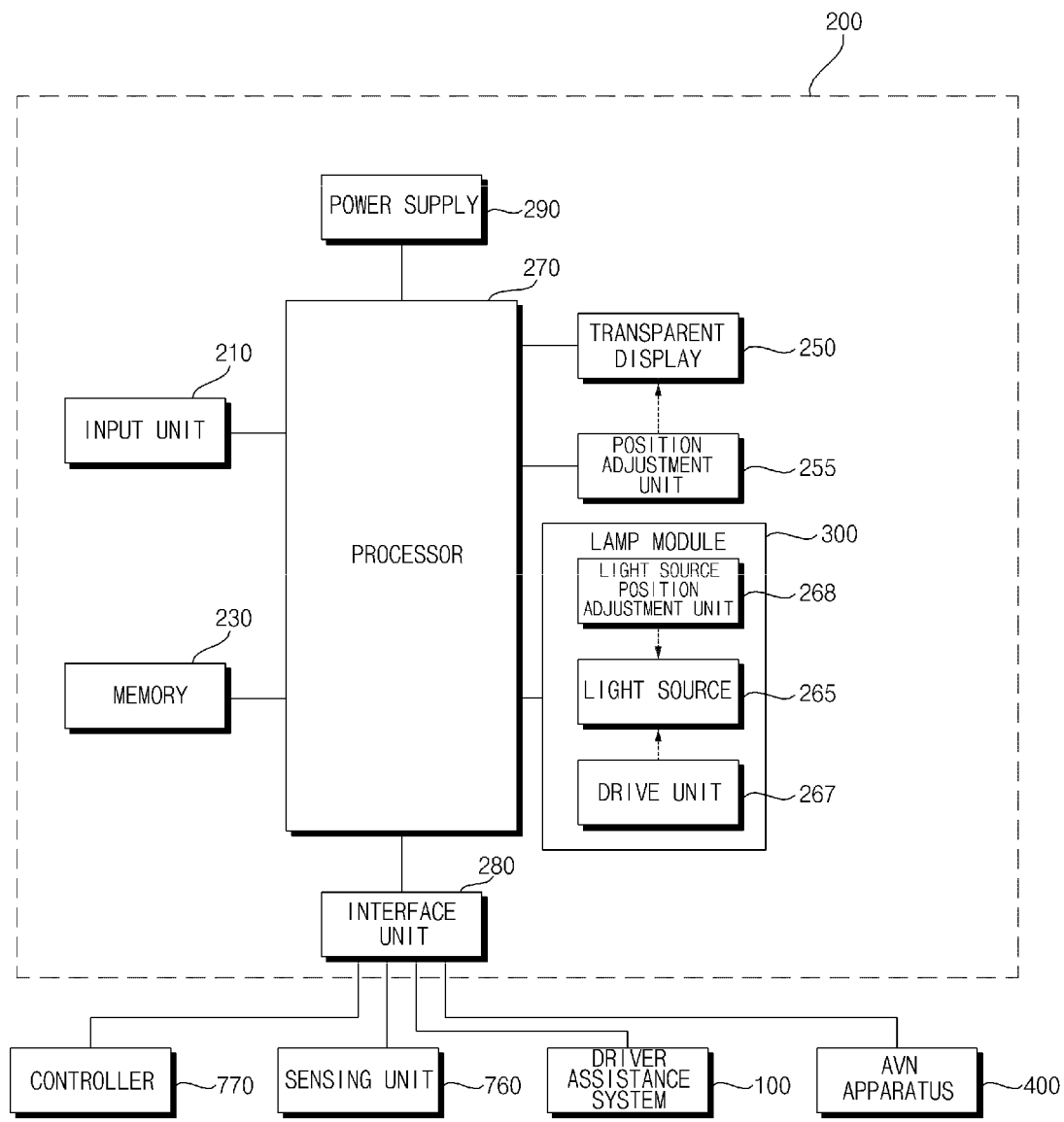
FIGS. 2A and 2B are block diagrams illustrating a lamp for a vehicle.
Figure 2B:
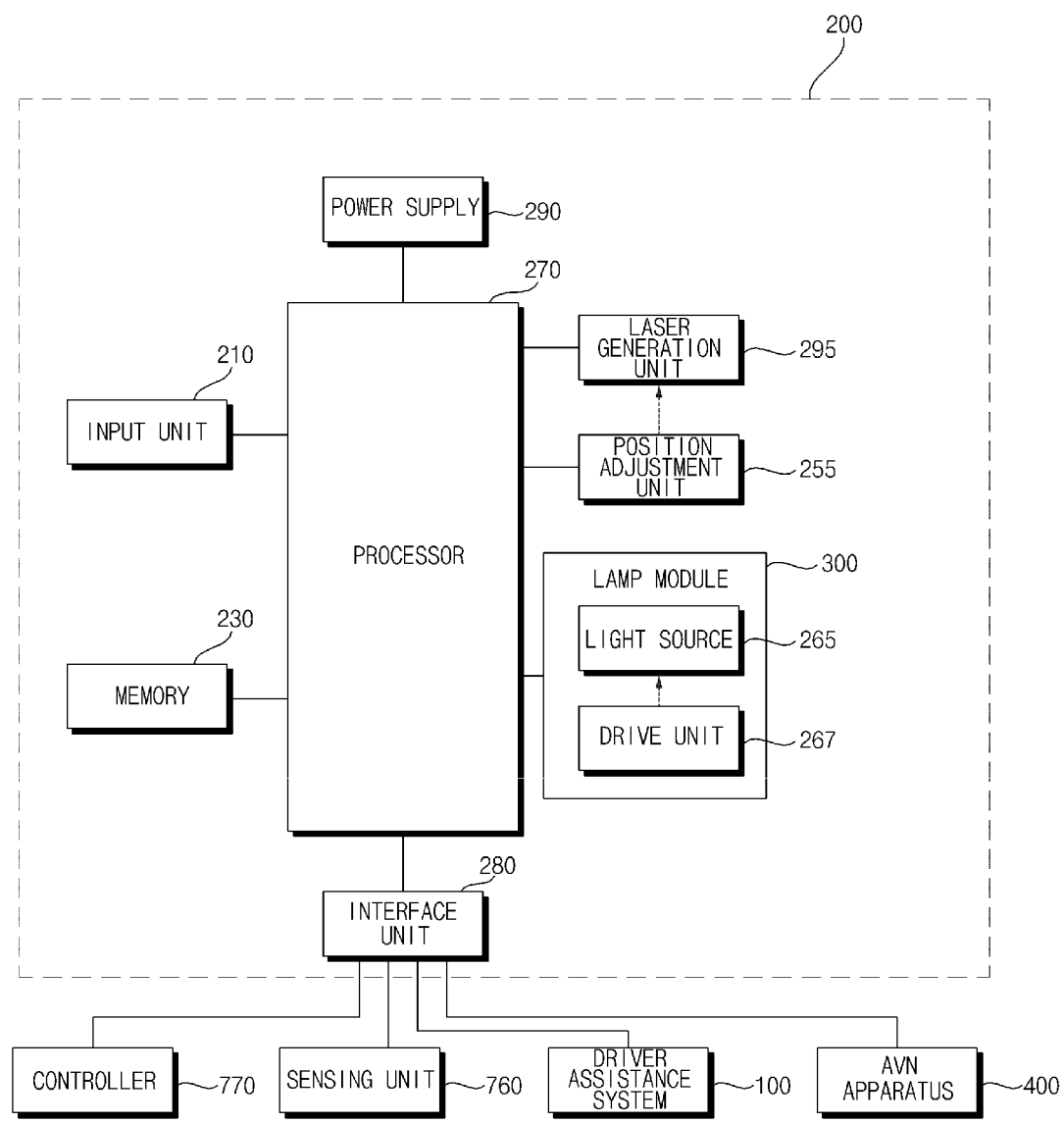

FIGS. 2A and 2B illustrate an example lamp for vehicles.

Hereinafter, a lamp for vehicles will be described in terms of control with reference to FIGS. 2A and 2B. The lamp 200 illustrated in FIGS. 2A and 2B may be a headlamp or a rear combination lamp.

Referring to FIG. 2A, the lamp 200 may include an input unit 210, a memory 230, a transparent display 250, a position adjustment unit 255, a light source 265, a drive unit 267, a processor 270, an interface unit 280, and a power supply 290.

The input unit 210 may include an input device capable of receiving user input for controlling operation of the lamp 200. The input unit 210 may be disposed in the vehicle 700. The input unit 210 may include a touch input device or a mechanical input device. The input unit 210 may receive user input for turning the lamp 200 on or off. The input unit 210 may receive user inputs for controlling various operations of the lamp 200.

The input unit 210 may receive user input for controlling a lamp module 300.

The memory 230 may store basic data for each unit of the lamp 200, control data for controlling operation of each unit, and data input to and output from the lamp 200.

When implemented through hardware, the memory 230 may include various storage devices such as a ROM, RAM, EPROM, flash drive, and hard drive.

The memory 230 may store various kinds of data for overall operation of the lamp 200 including a program for processing or controlling operation of the processor 270.

Figure 3A:
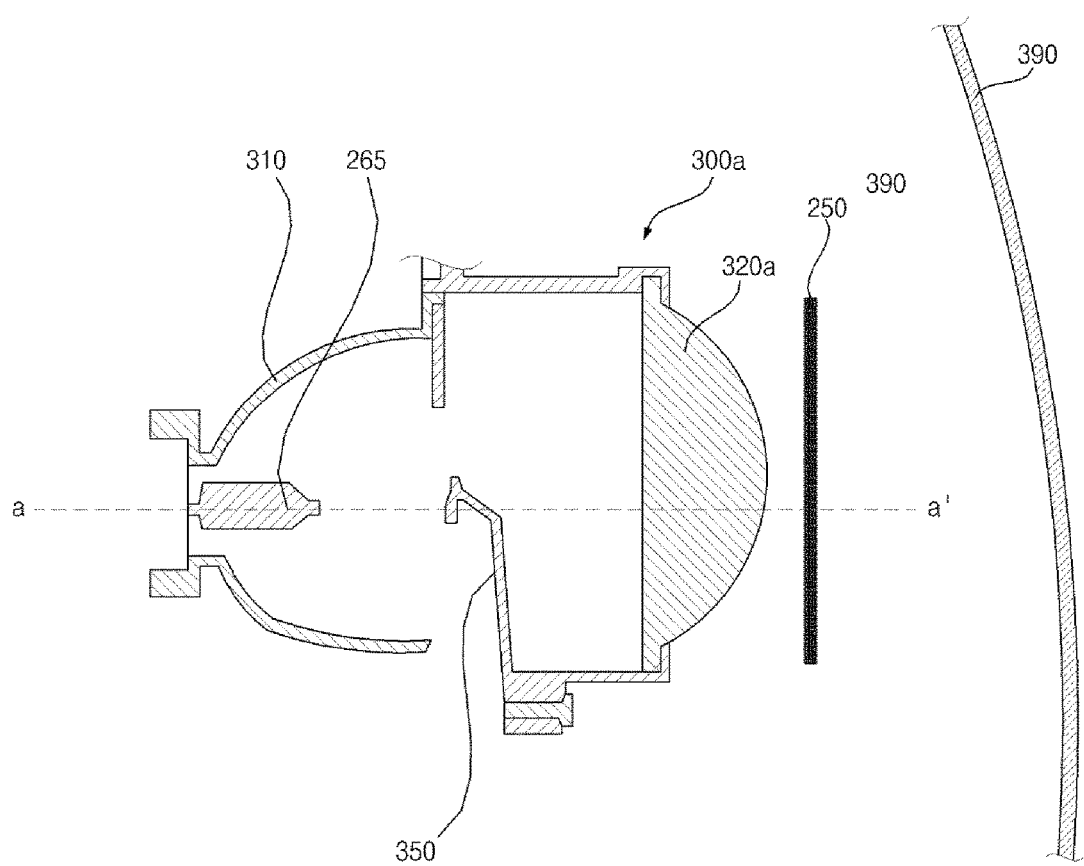
FIGS. 3A to 3C are diagrams illustrating an example first type lamp module.
Figure 3B:
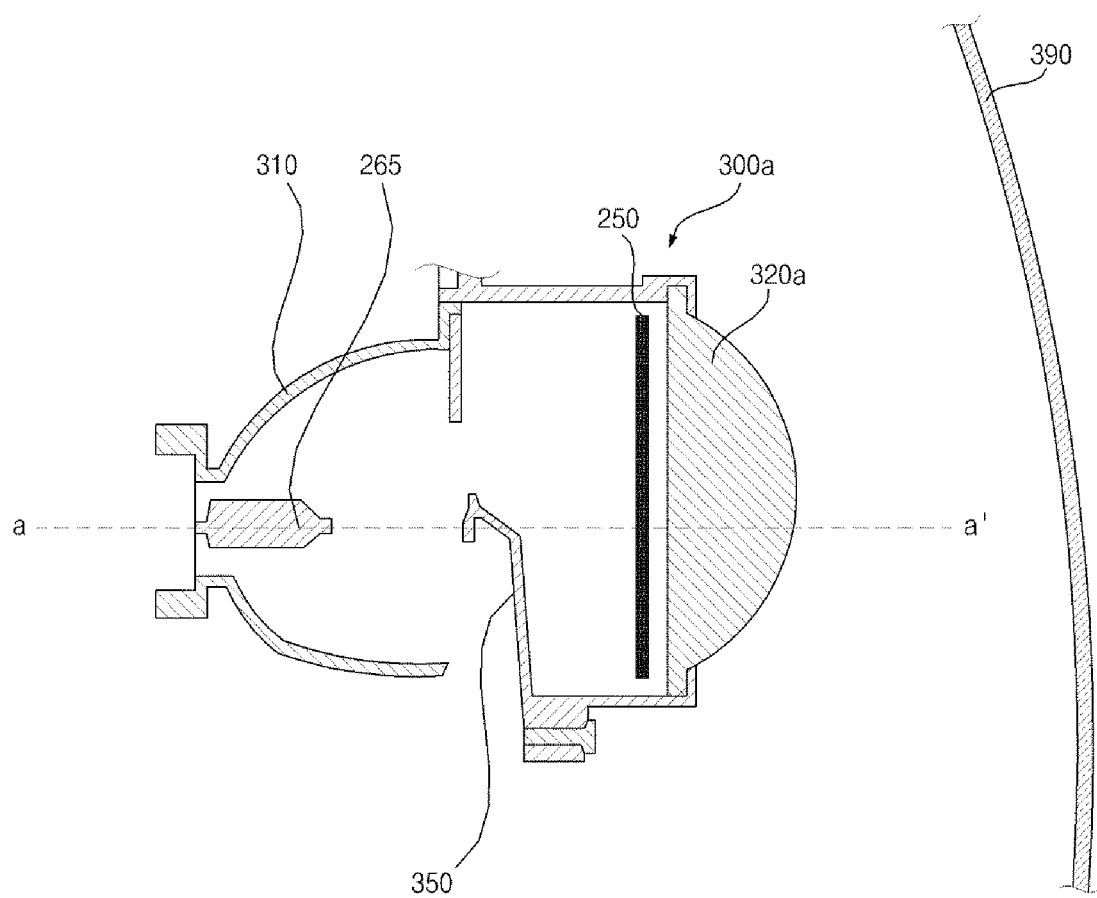
Figure 3C:
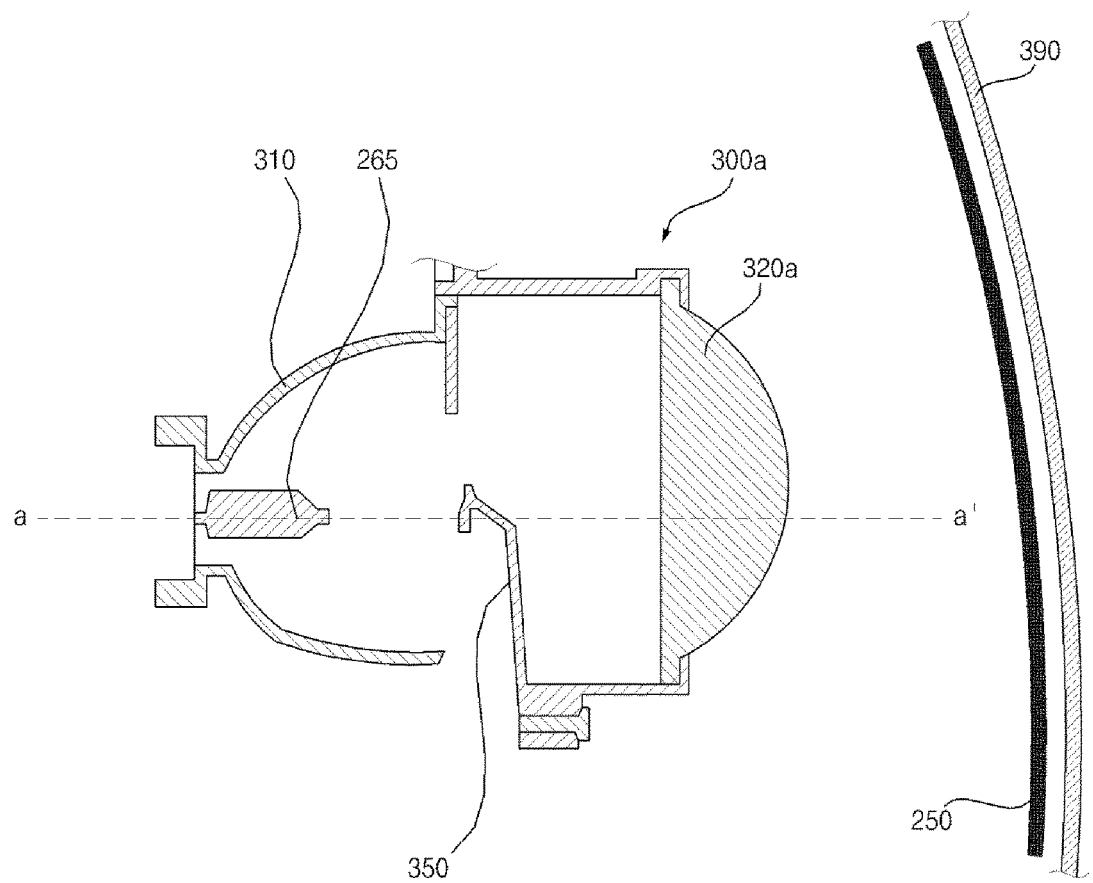
Figure 3D:
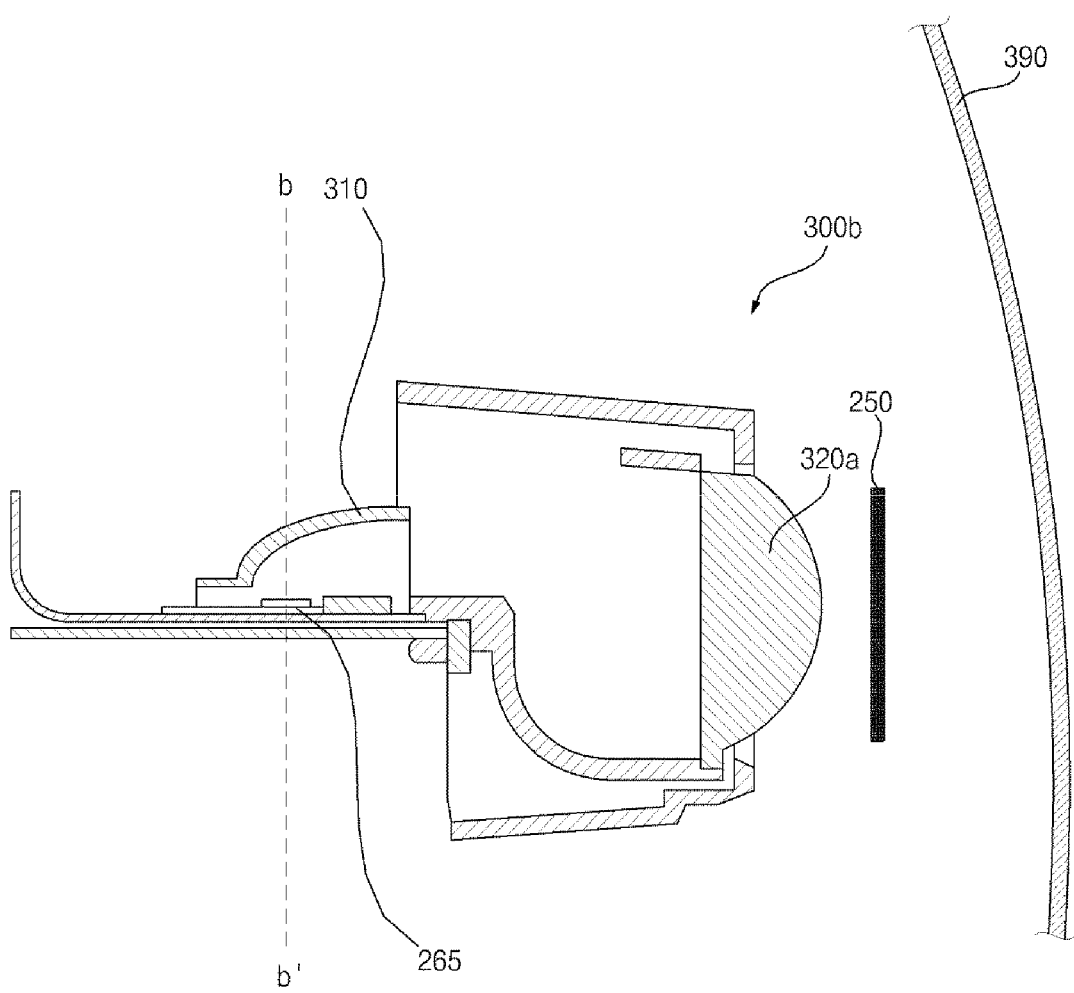
FIGS. 3D to 3F are diagrams illustrating an example second type lamp module.
Figure 3E:
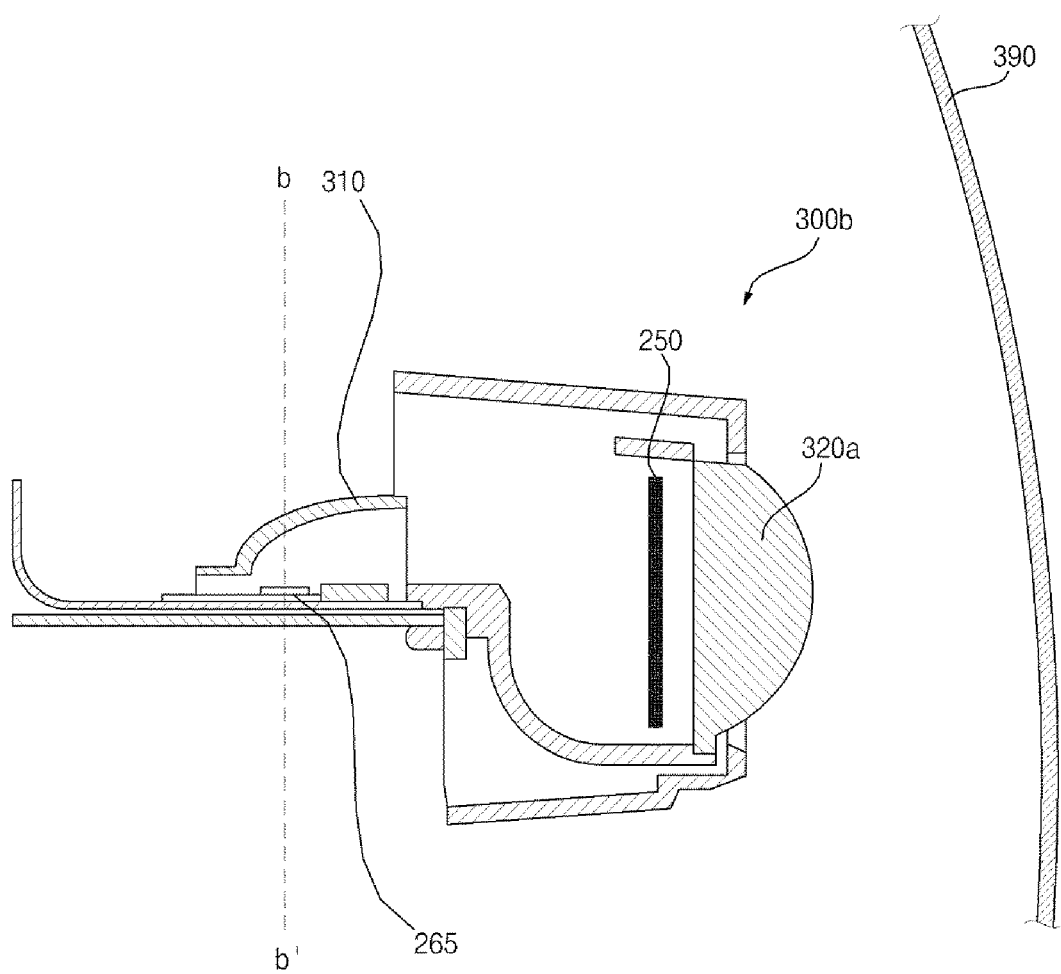
Figure 3F:
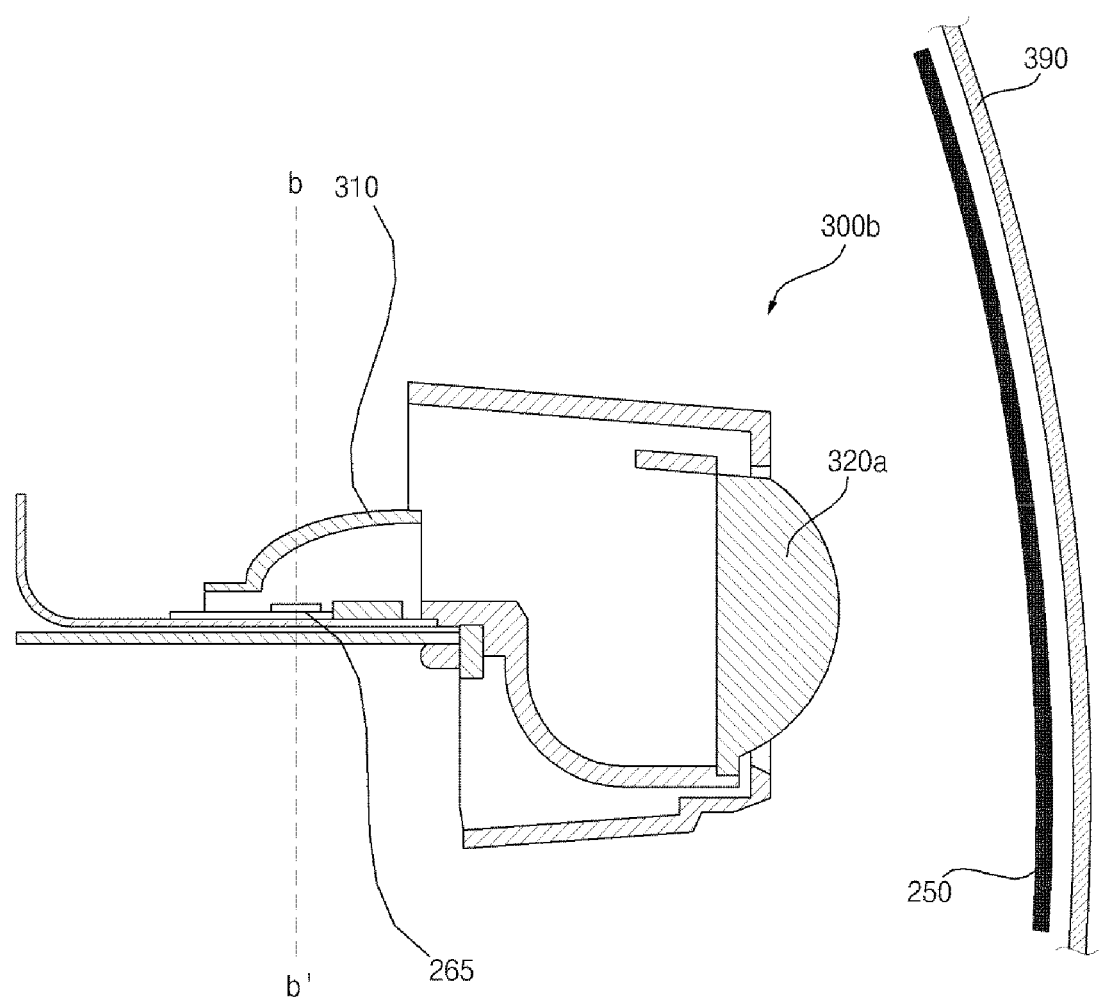
Figure 3G:
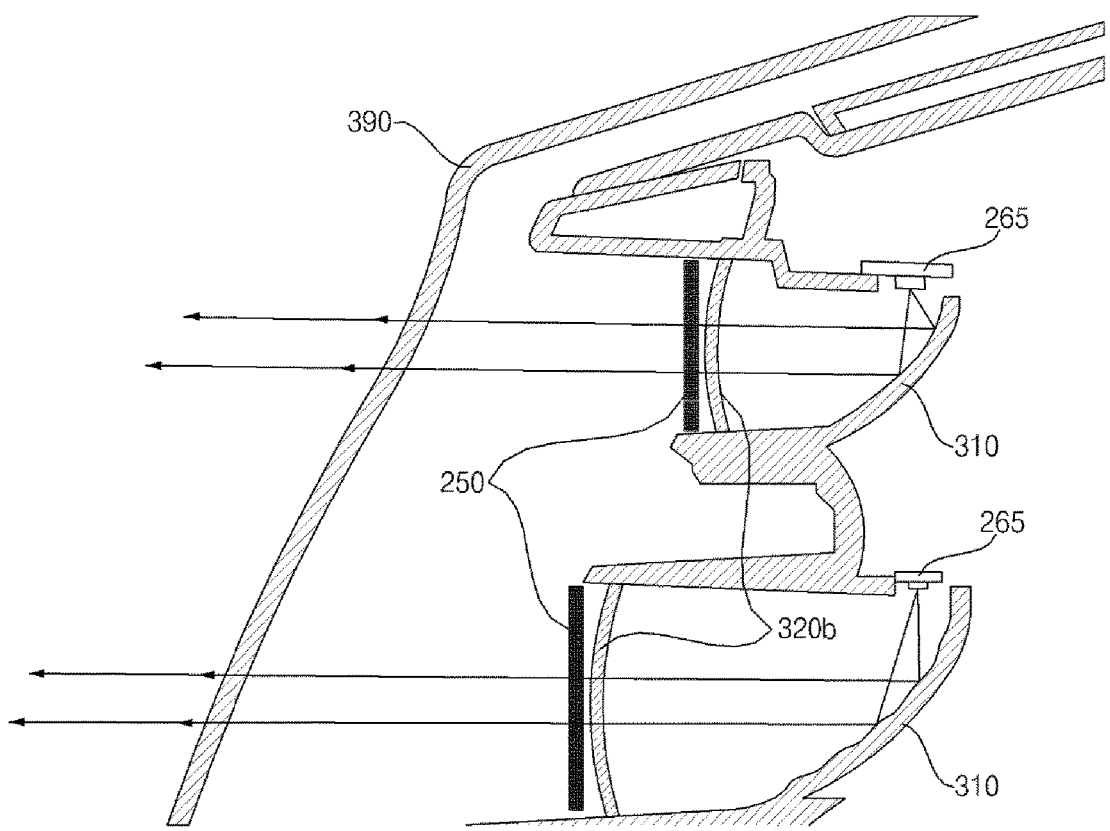
FIGS. 3G to 3I are diagrams illustrating an example third type lamp module.
Figure 3H:
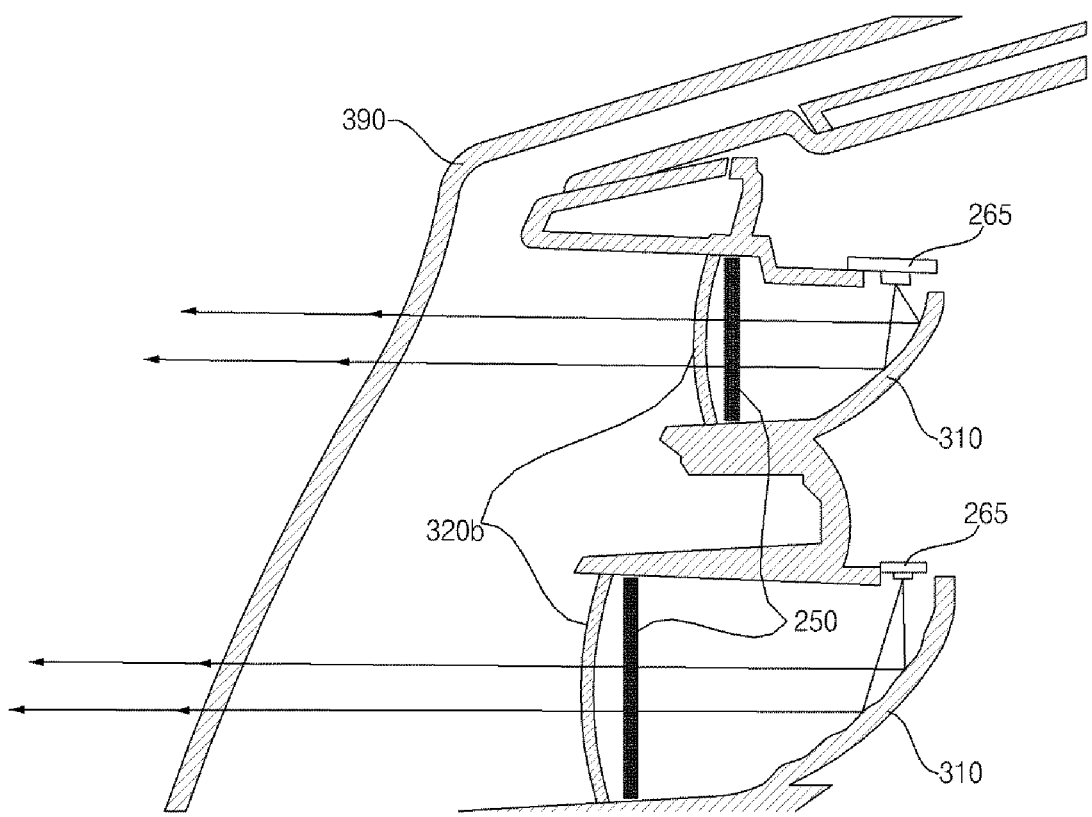
Figure 3I:
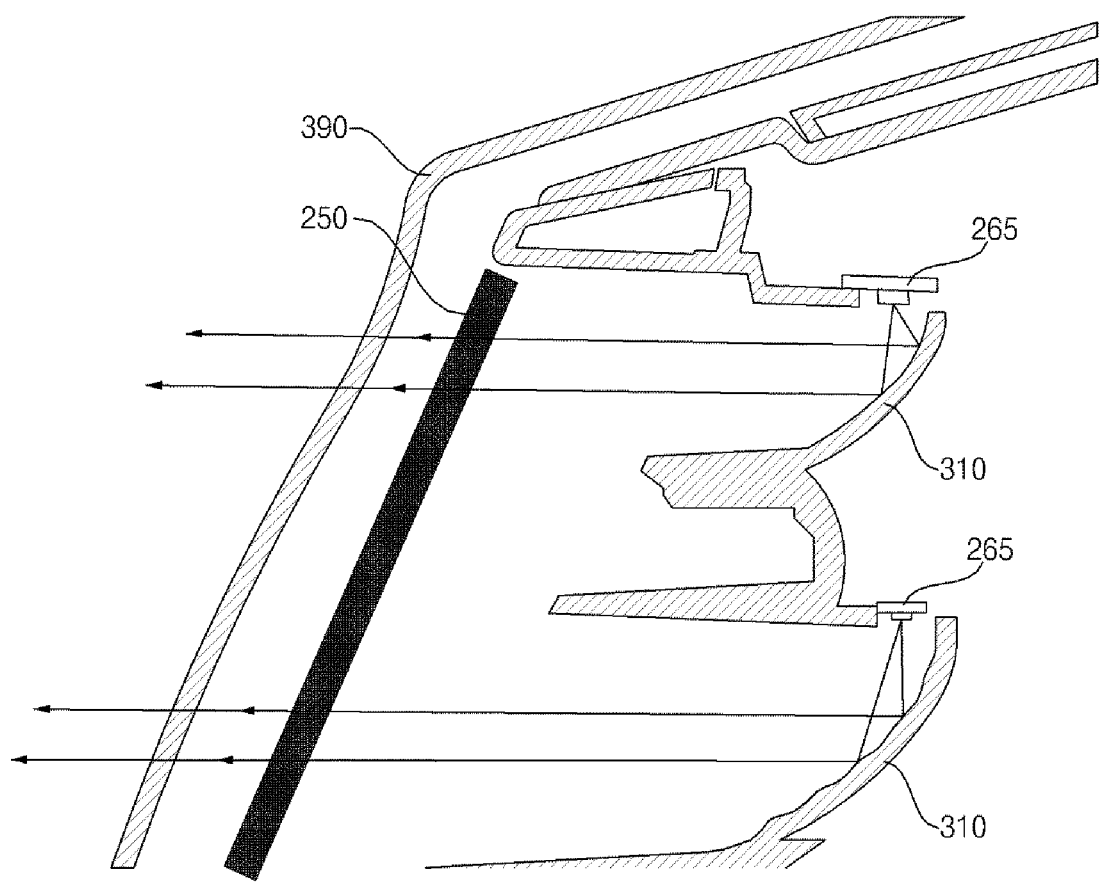
Figure 4:
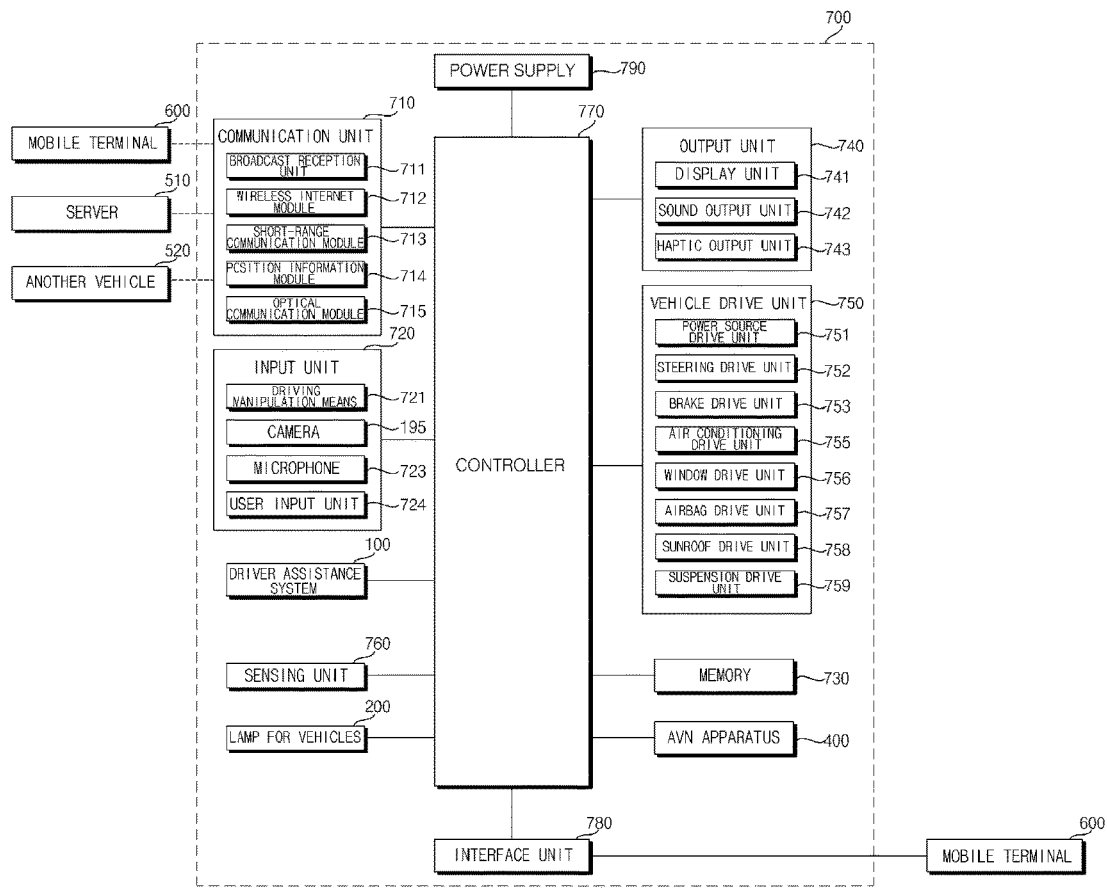
FIG. 4 is a block diagram illustrating an example vehicle.

The lamp module 300 may include a drive unit 267, a light source 265, a light source position adjustment unit 268, a reflector 310 (see FIGS. 3A to 3D), and a lens 320 (see FIGS. 3 to 4).

The drive unit 267 is configured to control the light source 265 according to a control signal from the processor 170. Specifically, the drive unit 267 applies a drive current to the light source 265 according to the control signal. Light emitted from the light source 265 may be controlled according to the drive current applied by the drive unit 267.

The drive unit 267 may operate based on a control signal received from the processor 270.

The light source 265 may generate light. The light source 265 may convert electrical energy into light energy. The light source 265 may include one of a metal filament lamp, a halogen bulb, a high-intensity discharge (HID) lamp, a neon gas discharge lamp, a light emitting diode (LED) lamp and a laser diode.

The light source 265 may be the light source of the headlamp or rear combination lamp.

The light source position adjustment unit 268 may adjust the position of the light source 265. The light source position adjustment unit 268 may include a light source position adjustment drive unit for generating driving force for adjusting the position of the transparent display 250 and a connector to connect the light source position adjustment unit 268 to the transparent display 250.

The light source position adjustment unit 268 may operate based on a control signal received from the processor 270.

The light source position adjustment drive unit may include a power generation device capable of generating power such as a motor, an actuator, and a solenoid.

The connector may include a driving power transmission device such as a gear which is capable of transmitting driving power generated by the position adjustment drive unit to the transparent display 250.

The reflector 310 (see FIGS. 3A to 3F) and the lens 320 (see FIG. 3A to 3F) will be described with reference to FIGS. 3 and 4.

The transparent display 250 may allow a part or the entirety of light generated by the light source 265 to be transmitted therethrough.

When the transparent display 250 is not used as a display, it may remain transparent. In this case, the transparent display 250 may allow light generated by the light source 265 to be transmitted therethrough.

The transparent display 250 may operate based on a control signal received from the processor 270.

Predetermined content may be displayed in one area of the transparent display 250. The content may come in various colors and brightness. When light is transmitted through the transparent display 250 having content displayed thereon, the light transmitted through an area of the transparent display 250 in which the content is displayed may come in a different color and different brightness over the light transmitted through another area of the display in which the content is not displayed. According to this principle, if light is projected through the transparent display 250 with predetermined information displayed on the transparent display 250, the predetermined information may be displayed on a projection surface.

A pattern may be created in one area of the transparent display 250 based on a difference in brightness or color. Herein, the pattern may be created based on the difference in brightness or color between a first area and second area of the transparent display 250.

The transparent display 250 employs transparent electronic devices having a predetermined transmissivity.

The transparent display 250 may be divided into a projection view-type transparent display and a direct view-type transparent display.

The transparent display 250 may include one of a transparent TFEL, transparent OLED, transparent LCD, transparent PDP, transparent LED and transparent AMOLED.

If the vehicle 700 is provided with a plurality of lamps, a plurality of transparent displays 250 corresponding to the number of the lamps may be provided. Alternatively, the transparent display 250 may be provided to only one lamp. For example, the vehicle 700 generally includes two headlamps. In this case, each of the headlamps may include the transparent display 250. Alternatively, only one of the headlamps may include the transparent display 250.

If one lamp for vehicles includes a plurality of lamp modules 300, a plurality of transparent displays 250 corresponding to the lamp modules 300 respectively may be provided. Alternatively, the transparent displays 250 may be provided to only one lamp module 300. For example, if a first headlamp includes a plurality of lamp modules 300, a plurality of transparent displays 250 corresponding to the lamp modules 300 respectively may be provided. Alternatively, the transparent displays 250 may be provided to only the first lamp module among the plurality of lamp modules.

The transparent display 250 may have a shape corresponding to a beam pattern of light generated by the light source 265, light reflected by the reflector 310 (see FIGS. 3A to 3F), or light transmitted through the lens 320 (see FIGS. 3A to 3F). For example, if the beam pattern is circular, the transparent display 250 may have a circular shape. Alternatively, if the beam pattern is rectangular, the transparent display 250 may have a rectangular shape.

The transparent display 250 may be controlled by the processor 270. In some implementations, the transparent display 250 may be controlled by a controller 770 of the vehicle 700.

The position adjustment unit 255 may adjust the position of the transparent display. The position adjustment unit 255 may include a position adjustment drive unit for generating driving force for adjusting the position of the transparent display 250 and a connector to connect the position adjustment unit 255 to the transparent display 250.

The position adjustment unit 255 may operate based on a control signal received from the processor 270.

The position adjustment drive unit may include a power generation device capable of generating power such as a motor, an actuator, and a solenoid.

The connector may include a driving power transmission device such as a gear which is capable of transmitting driving power generated by the position adjustment drive unit to the transparent display 250.

The processor 270 is configured to control overall operation of each unit in the lamp 200.

The processor 270 is configured to control the transparent display 250 to display information on a projection surface using light transmitted through the transparent display 250. Herein, the projection surface may be a road surface, fog or a vehicle body of another vehicle.

The processor 270 may perform a control operation such that a pattern is formed in one area of the transparent display 250.

The processor 270 may perform a control operation such that predetermined content is displayed on the transparent display 250.

When light generated by the light source 26 is projected onto the projection surface through the transparent display 250 on which a predetermined content or predetermined pattern is formed, information formed by the content or pattern may be displayed on the projection surface.

Meanwhile, predetermined information may be displayed through light emitted by the transparent display 250.

The processor 270 is configured to control the transparent display 250 to display predetermined information in an area corresponding to the user's gaze sensed by an internal camera. The processor 270 may receive, through the interface unit 280, user gaze information sensed by an internal camera 195 (see FIG. 4) disposed in the vehicle 700. The processor 270 is configured to control the transparent display 250 to display predetermined information in an area corresponding to the user's gaze. Specifically, the processor 270 may change an area of the transparent display 250 where content or a pattern is formed, according to the user's gaze. In this case, the predetermined information may be displayed in the area corresponding to the user's gaze.

Alternatively, the processor 270 is configured to control the position adjustment unit 255 to display predetermined information in an area corresponding to the user's gaze sensed by the internal camera. Specifically, when the position adjustment unit 255 operates as controlled by the processor 270, the position of the transparent display 250 may be changed in accordance with the user's gaze. In this case, the predetermined information may be displayed in an area corresponding to the user's gaze.

As the information display area is changed according to the user's gaze, it may be ensured that the displayed information is delivered to the user.

The processor 270 may adjust the location of a projection surface by controlling the position adjustment unit 255 such that the position of the transparent display 250 is adjusted.

Alternatively, the processor 270 may adjust the location of the projection surface by controlling the light source position adjustment unit 268 such that the position of the light source 265 is adjusted.

If the projection surface is a road surface, the processor 270 may adjust the position of the transparent display 250 or the light source 265 by controlling the position adjustment unit 255 or the light source position adjustment unit 268 such that information is displayed on the road surface.

For example, if a foregoing vehicle is located close to the vehicle 700, and thus information cannot be displayed on the road surface, the processor 270 may adjust the position of the transparent display 250 or the light source 265 by controlling the position adjustment unit 255 or the light source position adjustment unit 268 such that the information is displayed on the body of the foregoing vehicle.

For example, in foggy weather, the processor 270 may adjust the position of the transparent display 250 or the light source 265 by controlling the position adjustment unit 255 or the light source position adjustment unit 268 such that information is displayed on the fog. Herein, the fog may be detected by the driver assistance system 100.

Meanwhile, the processor 270 is configured to control the position adjustment unit 255 or the light source position adjustment unit 268 such that the position of the transparent display 250 or the light source 265 is adjusted according to a distance to a front object.

For example, in the case where the light source 265 is a light source of the headlamp, if the distance to a foregoing vehicle is greater than or equal to a reference value, the processor 270 may adjust the position of the transparent display 250 or the light source 265 by controlling the position adjustment unit 255 or the light source position adjustment unit 268 such that information is displayed on the road surface.

For example, in the case where the light source 265 is a light source of the headlamp, if the distance to a foregoing vehicle is less than or equal to a reference value, the processor 270 may adjust the position of the transparent display 250 or the light source 265 by controlling the position adjustment unit 255 or the light source position adjustment unit 268 such that information is displayed on the body of the foregoing vehicle.

In the case where the light source 265 is a light source of the rear combination lamp, the processor 270 may adjust the position of the transparent display 250 or the light source 265 by controlling the position adjustment unit 255 or the light source position adjustment unit 268 such that the road surface serves as the projection surface.

The processor 270 is configured to control the transparent display 250 such that predetermined information filtered by an optical filter provided to the windshield is delivered to the user.

The windshield of the vehicle 700 may be provided with an optical filter. The optical filter may allow a specific wavelength to be transmitted therethrough or reflected therefrom. The processor 270 may perform a control operation to create content or a pattern on the transparent display 250 such that information can be checked only through the optical filter. Specifically, the processor 270 may perform a control operation to create content or a pattern on the transparent display 250 such that information having a specific wavelength is displayed on the projection surface. In this case, the optical filter provided to the windshield may allow the wavelength of the displayed information to be transmitted therethrough, and the information may be delivered to the user. Since the windshield of another vehicle is not provided with an optical filter, the information having the specific wavelength may not be delivered to the driver of another vehicle.

The processor 27 is configured to control the transparent display 250 to display a virtual drive lane on the road surface.

When the driver is driving the vehicle at night or in bad weather, the drive lane may be temporarily unidentified. In this case, the processor 270 is configured to control the transparent display 250 to display a virtual drive lane on the road surface. Specifically, the processor 270 is configured to control the transparent display 250 such that a pattern corresponding to the virtual lane is created on the transparent display. When light generated by the light source 265 is transmitted through the transparent display 250 and projected onto the road surface, the virtual lane may be displayed on the road surface.

Meanwhile, the processor 270 may receive previous drive lane information through the interface unit 280. Herein, the drive lane information may be acquired by processing an image captured by a camera 195 (see FIGS. 4 to 7C) configured to capture images of the outside of the vehicle 700. The processor 270 is configured to control the transparent display 250 such that a virtual lane is displayed based on the previous drive lane information.

The processor 270 is configured to control the transparent display 250 to display predetermined information in a lane on which the vehicle 700 is traveling.

The processor 270 may receive, through the interface unit 280, information about the lane on which the vehicle 700 is traveling. Herein, the drive lane information may be acquired by processing an image captured by a camera 195 (see FIGS. 4 to 7C) configured to capture images of the outside of the vehicle 700. The processor 270 is configured to control the transparent display 250 to display predetermined information only in the lane on which the vehicle is traveling, based on the received drive lane information.

Meanwhile, the processor 270 may receive, through the interface unit 280, curve information about a road on which the vehicle is traveling. When the vehicle 700 is traveling on a curved road, the processor 270 is configured to control the transparent display 250 to display predetermined information only on the lane on which the vehicle is traveling, based on the curve information.

As the information is displayed only in the lane on which the vehicle is traveling, incorrect information may be prevented from being delivered to drivers of other nearby vehicles.

The processor 270 may receive forward objects information, rearward objects information, navigation information, road information, vehicle condition information, vehicle driving information, in-vehicle situation information or driving environment information through the interface unit 280.

The processor 270 is configured to control the transparent display 250 to display forward objects information, rearward objects information, navigation information, road information, vehicle condition information, vehicle driving information, in-vehicle situation information or driving environment information on a projection surface.

The forward objects information may include traffic sign recognition (TSR) information and speed bump detection information.

The processor 270 is configured to control the transparent display 250 to display TSR information and speed bump detection information on the projection surface.

The TSR information may include detection information on a design or text indicated on a traffic signboard, detection information on a signal output from a traffic light, and detection information on a design or text indicated on a road surface.

The processor 270 is configured to control the transparent display 250 to display, on the projection surface, information corresponding to a design or text indicated on a traffic signboard, a signal output from a traffic light, or a design or text indicated on a road surface.

The processor 270 is configured to control the transparent display 250 to display a bump image corresponding to the speed bump detection information on the projection surface.

The forward objects information may include other-vehicle detection information, two-wheeled vehicle detection information, pedestrian detection information, traffic accident information, construction information or road congestion information. Herein, another vehicle, a two-wheeled vehicle, a pedestrian, a traffic accident situation, construction or a road congestion situation may be called an obstacle.

The processor 270 is configured to control the transparent display 250 to display the other-vehicle detection information, two-wheeled vehicle detection information, pedestrian detection information, traffic accident information, construction information, or road congestion information on the projection surface.

Meanwhile, the processor 270 may receive side traveling vehicle detection information through the interface unit 280.

If other-vehicle detection information, two-wheeled vehicle detection information or pedestrian detection information is received after the side traveling vehicle detection information is received, the processor 270 is configured to control the transparent display 250 to display other-vehicle detection information, two-wheeled vehicle detection information or pedestrian detection information on the vehicle traveling on one side.

The rearward objects information may be information about another vehicle traveling behind the vehicle 700.

The navigation information may include driving route information, predetermined destination information, remaining distance information, driving area information, driving road information, and speed camera information.

The processor 270 is configured to control the transparent display 250 to display the driving route information, predetermined destination information, remaining distance information, driving area information, driving road information or speed camera information on the projection surface.

The processor 270 may display driving route information on projection surface through turn-by-turn (TBT). The processor 270 is configured to control the transparent display 250 to display the driving route information with a straight arrow, a left turn arrow, a right turn arrow or a U-turn arrow on the projection surface.

If the driving route information is received after the side traveling vehicle detection information is received, the processor 270 may display the driving route information on the drive lane of the vehicle traveling on one side in a TBT manner.

The road information may include inclination or curvature information on a road on which the vehicle is traveling.

The processor 270 is configured to control the transparent display 250 to display the inclination or curvature information on the projection surface.

The vehicle condition information may be On Board Diagnostics (OBD) information. The vehicle condition information may include parking brake state information, high beam on/off information, washer liquid level information, engine oil level information, power source temperature information, remaining energy information, tire pressure information, brake oil condition information or door opening information.

The processor 270 is configured to control the transparent display 250 to display the OBD information. The processor 270 is configured to control the transparent display 250 to display the parking brake state information, high beam on/off information, washer liquid level information, engine oil level information, power source temperature information, remaining energy information, tire pressure information, brake oil condition information or door opening information.

The vehicle driving information may include driving speed information, gear shift information or turn signal information delivered to the turn signal lamp.

The processor 270 is configured to control the transparent display 250 to display the driving speed information, gear shift information or turn signal information on the projection surface.

If the turn signal information is received after the side traveling vehicle detection information is received, the processor 270 is configured to control the transparent display 250 to display the turn signal information on the drive lane of the vehicle traveling on one side.

Meanwhile, the processor 270 may receive, through the interface unit 280, user input that is input through the input unit 720 of the vehicle 700. In this case, the processor 270 is configured to control the transparent display 250 to display information corresponding to the user input on the projection surface.

The in-vehicle situation information may be patient evacuation situation information, emergency aid request information, infant-on-board information or inexperienced driver information. Herein, the in-vehicle situation information may be generated through the input unit 720 of the vehicle 700 according to user input.

The driving environment information may include weather information or time information.

The processor 270 is configured to control the transparent display 250 to display the weather information or time information on the projection surface.

Meanwhile, when the vehicle 700 is traveling in a foggy space, the processor 270 is configured to control the transparent display to display information in the foggy space. The processor 270 is configured to control the transparent display to display information using the fog as the projection surface. Meanwhile, fog information may be detected through a camera 195 provided to the driver assistance system 100. Alternatively, the fog information may be received from an external server through a communication unit 710 of the vehicle 700. The fog information detected by the driver assistance system 100 or received through the communication unit 710 may be delivered to the lamp 200 through the interface unit 280.

The processor 270 may receive information on the distance to an object ahead of or behind the vehicle through the interface unit 280. The processor 270 is configured to control the transparent display 250 to display the received distance information on a projection surface. The distance information about an object ahead of or behind the vehicle may be generated by the driver assistance system 100. The driver assistance system 100 may generate the distance information about an object ahead of or behind the vehicle based on the disparity information or object size information detected as time passes.

If the light source 265 is a light source of the headlamp, the processor 270 may use the light generated by the light source 265 and transmitted through the transparent display 250 to display forward objects information, rearward objects information, navigation information, road information, vehicle condition information, vehicle driving information, in-vehicle situation information or driving environment information on the projection surface.

If the light source 265 is a light source of the rear combination lamp, the processor 270 may use the light generated by the light source 265 and transmitted through the transparent display 250 to display the forward objects information, rearward objects information, navigation information, road information, vehicle condition information, vehicle driving information, in-vehicle situation information or driving environment information on the projection surface.

Meanwhile, if the light source 265 is a light source of the rear combination lamp, the processor 270 is configured to control the position adjustment unit 255 or the light source position adjustment unit 268 such that the distance between the projection surface and the rear combination lamp is adjusted according to the information about the distance to the rear object. The processor 270 may perform a control operation to control the intensity of light generated by the light source 265. If the rear object is at a far distance, the intensity of light may be increased to enhance visibility of the object. If the rear object is at a close distance, the intensity of light may be decreased to prevent glare.

Hereinafter, the operation of displaying the respective information will be described in detail with reference to FIGS. 11 to 32.

The processor 270 may output a control signal to the drive unit 267 to control the operation or state of the light source 265.

The processor 270 may be controlled by the controller 770.

The processor 270 may be implemented as hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The interface unit 280 may exchange date with the controller 770, sensing unit 760 or driver assistance system 100 of the vehicle 700.

The interface unit 280 may receive vehicle-related data or user inputs or transmit, to the outside, a signal processed or generated by the processor 270. To this end, the interface unit 280 may perform data communication with the controller 770, the sensing unit 760, or the driver assistance system 100 provided in the vehicle in a wired or wireless manner.

The interface unit 280 may receive sensor information from the controller 770 or the sensing unit 760.

Herein, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, interior temperature information, and interior humidity information.

Such sensor information may be acquired from a heading sensor, a yaw sensor, a gyro sensor, a position module, a vehicle drive/reverse drive sensor, a wheel sensor, a vehicle speed sensor, a vehicle body tilt sensor, a battery sensor, a fuel sensor, a tire sensor, a steering sensor based on turning of the steering wheel, an interior temperature sensor, and an interior humidity sensor. The position module may include a GPS module for receiving GPS information.

Among the pieces of sensor information, the vehicle direction information, vehicle location information, vehicle orientation information, vehicle speed information and vehicle inclination information, which are related to traveling of the vehicle, may be called vehicle travel information.

The interface unit 280 may receive user gaze information acquired by the internal camera 195c (see FIG. 4).

Meanwhile, the interface unit 280 may receive, from the controller 770 or the driver assistance system 100, object information detected by the driver assistance system 100.

The driver assistance system 100 may perform lane detection (LD), vehicle detection (VD), pedestrian detection (PD), bright spot detection (BD), traffic sign recognition (TSR), and road surface detection, based on an acquired front view image of the vehicle 700. The driver assistance system 100 may generate information about a distance to a detected object.

The interface unit 280 may receive the detected object information from the driver assistance system 100. Alternatively, the interface unit 280 may receive the detected object information via the controller 770.

The interface unit 280 may receive drive lane information. The drive lane information may be acquired by computer-processing a lane detected through the driver assistance system 100.

The interface unit 280 may receive curve information about a road on which the vehicle is traveling. The curve information may be acquired by computer-processing a lane detected through the driver assistance system 100.

The interface unit 280 may receive forward objects information, rearward objects information, navigation information, road information, vehicle condition information, vehicle driving information, in-vehicle situation information or driving environment information.

The interface unit 280 may receive navigation information through data communication with the controller 770, an AVN apparatus 400 or a separate navigation device (not shown). Herein, the navigation information may include predetermined destination information, route information according to the destination, map information, and current location information, wherein the map information and the current location information are related to traveling of the vehicle. The navigation information may include information about the location of the vehicle on the road.

The interface unit 280 may receive information about the distance to a front object or rear object.

The interface unit 280 may receive side traveling vehicle detection information. The side traveling vehicle detection may be performed through the driver assistance system 100.

The interface unit 280 may receive user input that is input through the input unit 720 of the vehicle 700.

The driver assistance system 100 will be described in more detail with reference to FIGS. 5 to 7C.

The power supply 290 may be controlled by the processor 270 to supply electric power necessary for operation of each unit of the lamp 200. In particular, the power supply 290 may receive power from, for example, a battery in the vehicle 700.

Next, referring to FIG. 2B, the lamp 200 of FIG. 2B is different from the lamp 200 of FIG. 2A in that it includes a laser generation unit 295. Hereinafter, the lamp 200 of FIG. 2B will be described, focusing on this difference. Unless specifically mentioned otherwise, description of the lamp 200 of FIG. 2A is applicable.

The laser generation unit 295 may generate laser. Laser generated by the laser generation unit 295 may be used to display information. That is, the lamp 200 may separately include the laser generation unit 295 for displaying information in addition to the light source 265.

The processor 270 is configured to control the laser generation unit 295 to display information in the light projected from the light source 265 onto a projection surface using the laser generated by the laser generation unit 295. Herein, the light source 265 may be a light source of the headlamp or rear combination lamp.

FIGS. 3A to 3C illustrate an example first type lamp module. FIGS. 3D to 3F illustrate an example second type lamp module. FIGS. 3G and 3I illustrate an example third type lamp module.

Hereinafter, description will be given of the first and second type lamp modules in terms of structure with reference to FIGS. 3A to 3F. The first and second type lamp modules may be included in a headlamp.

A lamp module 300a, 300b may include a light source 265, a reflector 310 and a lens 320a.

The light source 265 may generate light. The light generated by the light source 265 may be emitted directly forward of the vehicle or may be reflected by the reflector 310 and emitted forward of the vehicle.

The reflector 310 may reflect and guide the light generated by the light source 265 such that the light is emitted forward of the vehicle 700. The reflector 310 may be formed of aluminum (Al) or silver (Ag), which has good reflectivity, or may be coated onto a surface for reflecting light.

For the first type lamp module (see FIGS. 3A to 3C), an optical axis a-a' is formed in the front-to-back direction of the vehicle, and the reflector 310 reflects light emitted in directions other than the forward direction to guide the light forward.

If the first type lamp module 300a (see FIGS. 3A to 3C) generates a low beam, the lamp module 300a includes a light shield cap 350, which prevent light from being emitted upward. If the first type lamp module (see FIG. 3) generates a high beam, the lamp module 300a does not include the light shield cap 350.

For the second type lamp module 300b (see FIGS. 3D to 3F), an optical axis b-b' is formed in a direction perpendicular to the front-to-back direction of the vehicle, and the reflector 310 reflects light emitted from the light source 265 to guide the light forward.

The lens 320a is disposed in front of the light source 265 and the reflector 310. The lens 320a causes light emitted from the light source 265 or reflected from the reflector 310 to be refracted and transmitted therethrough. The lens 320a may include an aspheric lens.

Light passing through the reflector 310 may be transmitted through the aspheric lens 320a, thereby traveling straight forward of the vehicle 700. The lens 320a may be formed of transparent glass or plastics.

In some implementations, the lamp module 300a, 300b may not include the lens 320a.

The lamp 200 may further include an outer lens 390. The outer lens 390 covers the opening of a housing defining the exterior of the lamp. The outer lens 390 may be disposed in front of the light source 265, the reflector 310, and the lens 320a. The outer lens 390 may be formed of transparent plastics or glass. Preferably, the outer lens 390 is generally formed of an ALDC plastic material having excellent thermal conductivity.

The lamp 200 may include the transparent display 250.

As shown in FIGS. 3A and 3D, the transparent display 250 may be disposed in front of the lens 320a. The transparent display 250 may be disposed between the lens 320a and the outer lens 390. In this case, the transparent display 250 may be disposed closer to the lens 320a than to the outer lens 390. For example, the transparent display 250 may be disposed to contact a part or the entirety of one surface of the lens 320a facing forward of the vehicle. In this case, light generated by the light source 265 or reflected from the reflector 310 may be transmitted through the lens 320a, and the light transmitted through the lens 320a may be emitted outward through the transparent display 250. As shown in FIGS. 3B and 3E, the transparent display 250 may be disposed behind the lens 320a. The transparent display 250 may be disposed between the lens 320a and the light source 265. In this case, the transparent display 250 may be disposed closer to the lens 320a than to the light source 265. For example, the transparent display 250 may be disposed to contact a part or the entirety of one surface of the lens 320a facing rearward of the vehicle. In this case, light generated by the light source 265 or reflected from the reflector 310 may be transmitted through the transparent display 250, and the light transmitted through the transparent display 250 may be emitted outward through the lens 320a.

Meanwhile, a plurality of lenses 320b may be provided depending on the number of light sources 265. In this case, one or more transparent displays 250 may be provided.

As shown in FIGS. 3C and 3F, the transparent display 250 may be disposed behind the outer lens 390. The transparent display 250 may be disposed between the outer lens 390 and the light source 265. The transparent display 250 may be disposed closer to the outer lens 390 than to the light source 265. For example, the transparent display 250 may be disposed to contact a part or the entirety of one surface of the outer lens 390 facing rearward of the vehicle.

The transparent display 250 may be disposed such that information is readily displayed on the projection surface. For example, the transparent display 250 may be disposed perpendicular to the direction in which the vehicle travels. Alternatively, the transparent display 250 may be disposed to form a predetermined angle with respect to the direction in which the vehicle travels.

Hereinafter, description will be given of the third type lamp module in terms of structure with reference to FIGS. 3G to 3I. The third type lamp module may be included in the rear combination lamp.

The light source 265 may generate light. The light generated by the light source 265 may be emitted directly forward of the vehicle or may be reflected by the reflector 310 and emitted forward of the vehicle.

The reflector 310 may reflect and guide the light generated by the light source 265 such that the light is emitted forward of the vehicle 700. The reflector 310 may be formed of aluminum (Al) or silver (Ag), which has good reflectivity, or may be coated onto a surface for reflecting light.

A lens 320b is disposed behind the light source 265 and the reflector 310. The lens 320b refracts the light emitted from the light source 265 or reflected from the reflector 310 and allows the light to be transmitted therethrough.

The lens 320b may be inner lenses of the rear combination lamp.

In some implementations, the lamp module 300c may not include the lens 320b.

The lamp 200 may further include an outer lens 390. The outer lens 390 covers the opening of a housing defining the exterior of the lamp. The outer lens 390 may be disposed behind the light source 265, the reflector 310, and the lens 320b. The outer lens 390 may be formed of transparent plastics or glass. Preferably, the outer lens 390 is generally formed of an ALDC plastic material having excellent thermal conductivity.

As shown in FIG. 3G, a transparent display 250 may be disposed behind the lens 320b. The transparent display 250 may be disposed between the lens 320b and the outer lens 390. In this case, the transparent display 250 may be disposed closer to the lens 320b than to the outer lens 390. For example, the transparent display 250 may be disposed to contact a part or the entirety of one surface of the lens 320b facing rearward of the vehicle. In this case, light generated by the light source 265 or reflected from the reflector 310 may be transmitted through the lens 320b, and the light transmitted through the lenses may be emitted outward through the transparent display 250.

As shown in FIG. 3H, the transparent display 250 may be disposed in front of the lens 320b. The transparent display 250 may be disposed between the lenses 320b and the light source 265. In this case, the transparent display 250 may be disposed closer to the lens 320b than to the light source 265. For example, the transparent display 250 may be disposed to contact a part or the entirety of one surface of the lens 320b facing forward of the vehicle. In this case, light generated by the light source 265 or reflected from the reflector 310 may be transmitted through the transparent display 250, and the light transmitted through the transparent display 250 may be emitted outward through the lens 320b.

Meanwhile, a plurality of lenses 320b may be provided depending on the number of light sources 265. In this case, one or more transparent displays 250 may be provided.

As shown in FIG. 3I, a transparent display 250 may be disposed in front of the outer lens 390. The transparent display 250 may be disposed between the outer lens 390 and the lenses 320b. In this case, the transparent display 250 may be disposed closer to the outer lens 390 than to the lenses 320b. For example, the transparent display 250 may be disposed to contact a part or the entirety of one surface of the outer lens 390 facing forward of the vehicle.

The transparent display 250 may be disposed such that information is readily displayed on the projection surface. For example, the transparent display 250 may be disposed perpendicular to the direction in which the vehicle travels. Alternatively, the transparent display 250 may be disposed to form a predetermined angle with respect to the direction in which the vehicle travels.

FIG. 4 illustrates an example vehicle.

Referring to FIG. 4, the vehicle 700 may include a communication unit 710, an input unit 720, a sensing unit 760, an output unit 740, a vehicle drive unit 750, a memory 730, an interface unit 780, a controller 770, a power supply 790, a driver assistance system 100, a lamp 200 for vehicles and an AVN apparatus 400.

The communication unit 710 may include at least one module enabling wireless communication between the vehicle 700 and the mobile terminal 600, between the vehicle 700 and the external server 510 or between the vehicle 700 and another vehicle 520. The communication unit 710 may also include at least one module for connecting the vehicle 700 to at least one network.

The communication unit 710 may receive traffic accident information, construction information or road congestion information from the external devices 600, 510 and 520. For example, the communication unit 710 may receive traffic accident information, construction information or road congestion information through the wireless Internet module 712.

The communication unit 710 may include a broadcast reception module 711, the wireless Internet module 712, the short-range communication module 713, the location information module 714 and an optical communication module 715.

The broadcast reception module 711 receives a broadcast signal or broadcast-related information from an external broadcast management server over a broadcast channel. Herein, the broadcast includes radio broadcast or TV broadcast.

The wireless Internet module 712, which refers to a module for wireless Internet access, may be internally or externally installed on the vehicle 700. The wireless Internet module 712 is configured to transmit and receive a radio signal on a communication network according to wireless Internet technologies.

Examples of wireless Internet technologies include Wireless LAN (WLAN), Wi-Fi, Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 712 transmits and receives data according to at least one wireless Internet technology selected from among wireless Internet technologies including the aforementioned technologies. For example, the wireless Internet module 712 may wirelessly exchange data with the external server 510. The wireless Internet module 712 may receive weather information and traffic situation information (e.g., TPEG (Transport Protocol Expert Group)) from the external server 510.

The short-range communication module 713, which is intended for short-range communication, may support short-range communication using at least one of Bluetooth™, Radio Frequency Identification (RFID), Infrared Data Association (IrDA), Ultra Wideband (UWB), ZigBee, Near Field Communication (NFC), Wi-Fi, Wi-Fi Direct, and Wireless Universal Serial Bus (Wireless USB) technologies.

The short-range communication module 713 may establish a wireless local area network to implement short-range communication between the vehicle 700 and at least one external device. For example, the short-range communication module 713 may wirelessly exchange data with the mobile terminal 600. The short-range communication module 713 may receive weather information, and traffic situation information (e.g., TPEG (Transport Protocol Expert Group)) from the mobile terminal 600. For example, when a user enters the vehicle 700, the mobile terminal 600 of the user may be paired with the vehicle 700 automatically or by execution of an application by the user.

A typical example of the location information module 714, which serves to acquire the location of the vehicle 700, is a global positioning system (GPS) module. For example, if the vehicle utilizes the GPS module, the location of the vehicle may be acquired using a signal from a GPS satellite.

The optical communication module 715 may include a light transmitter and a light receiver.

The light receiver may covert a light signal to an electrical signal to receiver information. The light receiver may include a photodiode (PD) for receiving light. The PD is capable of converting light into an electrical signal. For example, the light receiver may receive information on a foregoing vehicle through light emitted from a light source included in the foregoing vehicle.

The light transmitter may include at least one light emitting device for converting an electrical signal to a light signal. Preferably, the light emitting device is a light emitting diode (LED). The light transmitter converts an electrical signal into a light signal and transmits the light signal outside. For example, the light transmitter transmits a light signal by blinking a light emitting device at a predetermined frequency. In some implementations, the light transmitter may include an array of a plurality of light emitting devices. In some implementations, the light transmitter may be integrated with a lamp provided to the vehicle 700. For example, the light transmitter may be at least one of a headlight, a taillight, a stop lamp, a turn signal lamp and a sidelight. For example, the optical communication module 715 may exchange data with another vehicle 520 through optical communication.

The input unit 720 may include a driving manipulation device 721, a camera 195, a microphone 723 and user input unit 724.

The driving manipulation device 721 receives user input for driving the vehicle 700. The driving manipulation device 721 may include a steering input device 721a, a shift input device 721b, an acceleration input device 721c, and a brake input device 721d.

The steering input device 721a receives a travel direction input of the vehicle 700 from the user. The steering input device 721a is preferably formed in the shape of a wheel such that steering can be input by a turning operation. In some implementations, the steering input device 721a may be defined in the form of a touchscreen, touch pad, or button.

The shift input device 721*b* receives, from the user, inputs of Park (P), Drive (D), Neutral (N) and Reverse (R) of the vehicle 700. Preferably, the shift input device 721*b* is formed in the shape of a lever. In some implementations, the shift input device 721*b* may be defined in the form of a touchscreen, touch pad, or button.

The acceleration input device 721*c* receives an input for accelerating the vehicle 700 from the user. The brake input device 721*d* receives an input for decelerating the vehicle 700 from the user. Preferably, the acceleration input device 721*c* and the brake input device 721*d* are formed in the shape of a pedal. In some implementations, the acceleration input device 721*c* or the brake input device 721*d* may have the form of a touchscreen, touch pad, or button.

The camera 195 may include an image sensor and an image processing module. The camera 195 may process a still image or a moving image obtained by the image sensor (e.g., CMOS or CCD). The image processing module may process the still image or moving image acquired through the image sensor to extract necessary information and deliver the extracted information to the controller 770. Meanwhile, the vehicle 700 may include a camera 195 for capturing an image of a front view or surroundings of the vehicle and an internal camera 195*c* for capturing an image of the inside of the vehicle.

The internal camera 195*c* may acquire an image of a person on board. The internal camera 195*c* may obtain an image for biometric identification of the person.

While FIG. 4 illustrates the camera 195 as being included in the input unit 720, the camera 195 may be included in the driver assistance system 100.

The microphone 723 may process an external sound signal to create electrical data. The data created through processing may be utilized for various purposes according to a function in execution in the vehicle 700. The microphone 723 may convert a voice command from the user into electrical data. The electrical data may be delivered to the controller 770.

In some implementations, the camera 722 or the microphone 723 may be included in the sensing unit 760 rather than in the input unit 720.

The user input unit 724 is intended to receive information input by the user. When information is input through the user input unit 724, the controller 770 is configured to control operation of the vehicle 700 in accordance with the input information. The user input unit 724 may include a touch input device or a mechanical input device. In some implementations the user input unit 724 may be disposed in one area of the steering wheel. In this case, the driver may manipulate the user input unit 724 with fingers while holding the steering wheel.

The sensing unit 760 senses a signal related to traveling of the vehicle 700. To this end, the sensing unit 760 may include a collision sensor, a wheel sensor, a speed sensor, a tilt sensor, a weight sensor, a heading sensor, a yaw sensor, a gyro sensor, a position module, a vehicle drive/reverse sensor, a battery sensor, a fuel sensor, a tire sensor, a steering sensor based on turning of the steering wheel, an interior temperature sensor, an interior humidity sensor, an ultrasonic sensor, radar, and lidar.

Thereby, the sensing unit 760 may acquire vehicle collision information, vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, interior temperature information, interior humidity information, and a sensing signal for an angle by which the steering wheel is rotated.

The sensing unit 760 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crankshaft angle sensor (CAS).

The sensing unit 760 may include a biometric identification information sensing unit. The biometric identification information sensing unit senses and acquires biometric identification information of a passenger. The biometric identification information may include fingerprint information, iris-scan information, retina-scan information, hand geometry information, facial recognition information, and voice recognition information. The biometric identification information sensing unit may include a sensor for sensing biometric identification information of a passenger. Herein, the internal camera 195*c* and the microphone 723 may operate as sensors. The biometric identification information sensing unit may acquire hand geometry information and facial recognition information through the internal camera 195*c*.

The output unit 740, which serves to output information processed by the controller 770, may include a display unit 741, a sound output unit 742 and a haptic output unit 743.

The display unit 741 may display information processed by the controller 770. For example, the display unit 741 may display vehicle-related information. Herein, the vehicle-related information may include vehicle control information for direction control of the vehicle or vehicle driving assistance information for assisting the driver in driving. The vehicle-related information may also include vehicle condition information indicating the current condition of the vehicle or vehicle driving information related to driving.

The display unit 741 may include at least one of a liquid crystal display (LCD), a thin film transistor-liquid crystal display (TFT LCD), an organic light-emitting diode (OLED), a flexible display, a 3D display, and an e-ink display.

The display unit 741 may form a layered architecture together with a touch sensor or be integrated with the touch sensor, thereby implementing a touchscreen. Such touchscreen may function as the user input unit 724 providing an input interface between the vehicle 700 and the user and also as an output interface between the vehicle 700 and the user. In this case, the display unit 741 may include a touch sensor for sensing touch applied to the display unit 741 in order to receive a control command in a touch manner. Thereby, when the display unit 741 is touched, the touch sensor may sense the touch, and the controller 770 may generate a control command corresponding to the touch. Content input through touch may include characters, numbers, or menu items which can be indicated or designated in various modes.

Meanwhile, the display unit 741 may include a cluster to allow a driver to check the vehicle condition information or vehicle driving information while driving the engine. The cluster may be positioned on the dashboard. In this case, the driver can check the information displayed on the cluster while looking forward of the vehicle.

In some implementations, the display unit 741 may be implemented as a head up display (HUD). If the display unit 741 is implemented as the HUD, information may be output through a transparent display provided to the windshield. Alternatively, the display unit 741 may be provided with a projection module, thereby, outputting information through an image projected onto the windshield.

The sound output unit 742 converts an electrical signal from the controller 770 into an audio signal and outputs the audio signal. To this end, the sound output unit 742 may be provided with a speaker. The sound output unit 742 may output a sound corresponding to an operation of the user input unit 724.

The haptic output unit 743 generates a haptic output. For example, the haptic output unit 743 may vibrate the steering wheel, a seat belt and a seat to allow the user to recognize the output.

The vehicle drive unit 750 is configured to control operation of various vehicular devices. The vehicle drive unit 750 may include a power source drive unit 751, a steering drive unit 752, a brake drive unit 753, a lamp drive unit 754, an air conditioner drive unit 755, a window drive unit 756, an airbag drive unit 757, a sunroof drive unit 758 and a suspension drive unit 759.

The power source drive unit 751 may perform electronic control of the power source in the vehicle 700.

For example, if a fossil fuel-based engine is the power source, the power source drive unit 751 may perform electric control of the engine. Thereby, the output torque of the engine may be controlled. If the power source drive unit 751 is an engine, the output torque of the engine may be controlled by the controller 770 to limit the speed of the vehicle.

As another example, if an electricity-based motor is the power source, the power source drive unit 751 may perform control operation on the motor. Thereby, the rotational speed and torque of the motor may be controlled.

The steering drive unit 752 may perform electronic control of the steering apparatus in the vehicle 700. Thereby, the travel direction of the vehicle may be changed.

The brake drive unit 753 may perform electronic control of a brake apparatus in the vehicle 700. For example, by controlling the operation of the brakes disposed on the wheels, the speed of the vehicle 700 may be reduced. In another example, the brake disposed on a left wheel may be operated differently from the brake disposed on a right wheel in order to adjust the travel direction of the vehicle 700 to the left or right.

The air conditioner drive unit 755 may perform electronic control of an air conditioner in the vehicle 700. For example, if the temperature of the inside of the vehicle is high, the air conditioner drive unit 755 is configured to control the air conditioner to supply cool air to the inside of the vehicle.

The window drive unit 756 may perform electronic control of a window apparatus in the vehicle 700. For example, the unit is configured to control opening or closing of the left and right windows on both sides of the vehicle.

The airbag drive unit 757 may perform electronic control of an airbag apparatus in the vehicle 700. For example, the unit is configured to control the airbag apparatus such that the airbags are inflated when the vehicle is exposed to danger.

The sunroof drive unit 758 may perform electronic control of a sunroof apparatus in the vehicle 700. For example, the unit is configured to control opening or closing of the sunroof.

The suspension drive unit 759 may perform electronic control of a suspension apparatus in the vehicle 700. For example, when a road surface is uneven, the unit is configured to control the suspension apparatus to attenuate vibration of the vehicle 700.

The memory 730 is electrically connected to the controller 770. The memory 730 may store basic data for each unit, control data for controlling operation of each unit, and input/output data. When implemented through hardware, the memory 730 may include various storage devices such as a ROM, RAM, EPROM, flash drive, and hard drive. The memory 730 may store various kinds of data for overall operation of the vehicle 700 including a program for processing or controlling operation of the controller 770.

The interface unit 780 may serve as a path between the vehicle 700 and various kinds of external devices connected thereto. For example, the interface unit 780 may be provided with a port connectable to the mobile terminal 600, and thus be connected to the mobile terminal 600 through the port. In this case, the interface unit 780 may exchange data with the mobile terminal 600.

The interface unit 780 may also serve as a path through which electrical energy is supplied to the mobile terminal 600 connected thereto. If the mobile terminal 600 is electrically connected to the interface unit 780, the interface unit 780 is controlled by the controller 770 to provide the mobile terminal 600 with electrical energy supplied from the power supply 7904.

The controller 770 is configured to control overall operations of the respective units in the vehicle 700. The controller 770 may be called an electronic control unit (ECU).

The controller 770 may be implemented as hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The power supply 790 may be controlled by the controller 770 to supply electric power necessary for operation of respective constituents. In particular, the power supply 790 may receive power from, for example, a battery in the vehicle.

The driver assistance system 100 may exchange data with the controller 770. A signal or data from the driver assistance system 100 may be output to the controller 770. Alternatively, a signal or data from the driver assistance system 100 may be output to the lamp 200.

The lamp 200 may be the lamp for vehicles described above with reference to FIGS. 1 to 3F.

The Audio Video Navigation (AVN) apparatus 400 may exchange data with the controller 770. A signal or data from the AVN apparatus 400 may be output to the controller 770. Alternatively, a signal or data from the AVN apparatus 400 may be output to the lamp 200.

Figure 5:
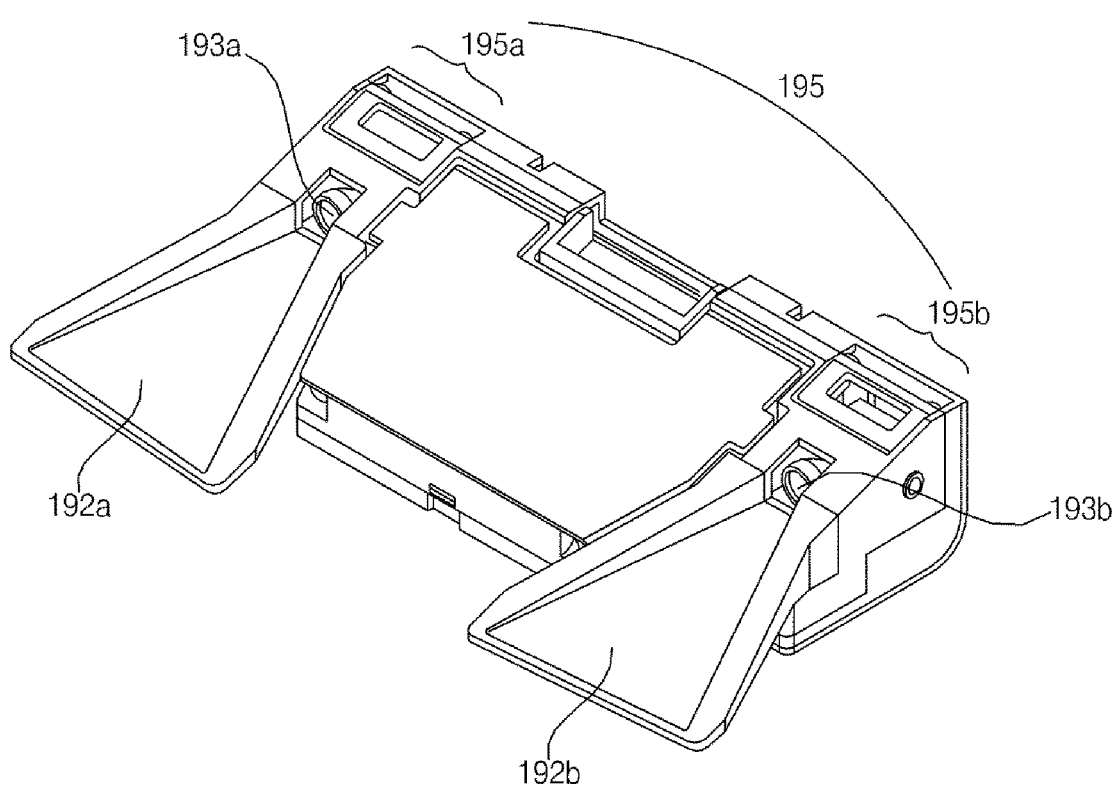
FIGS. 5 to 6B are diagrams illustrating example cameras attached to the vehicle of FIG. 1.
Figure 6A:
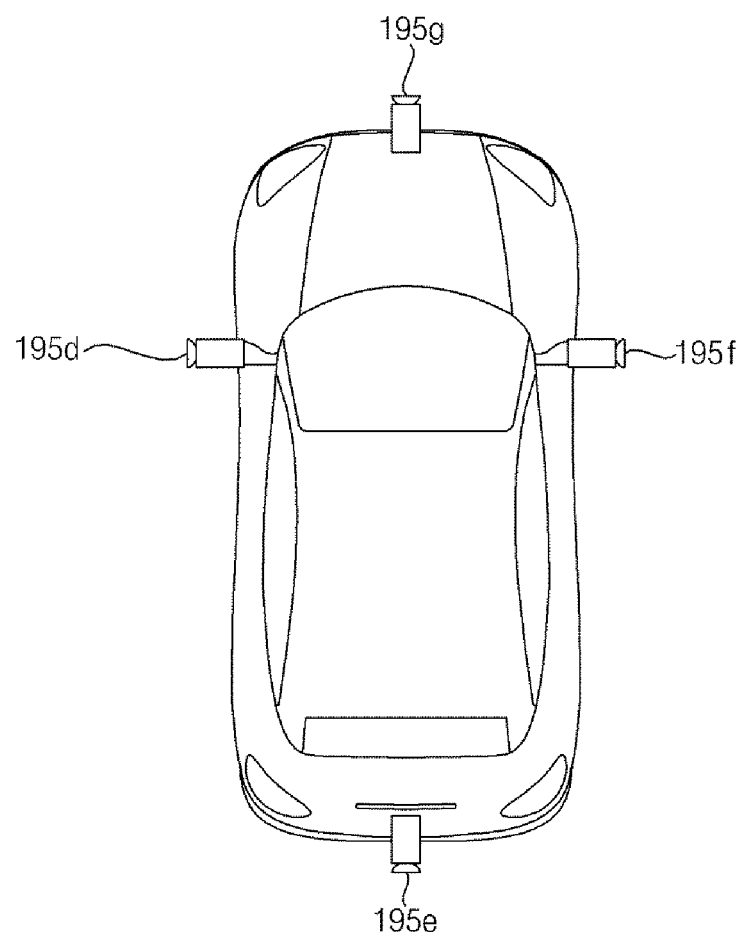
Figure 6B:
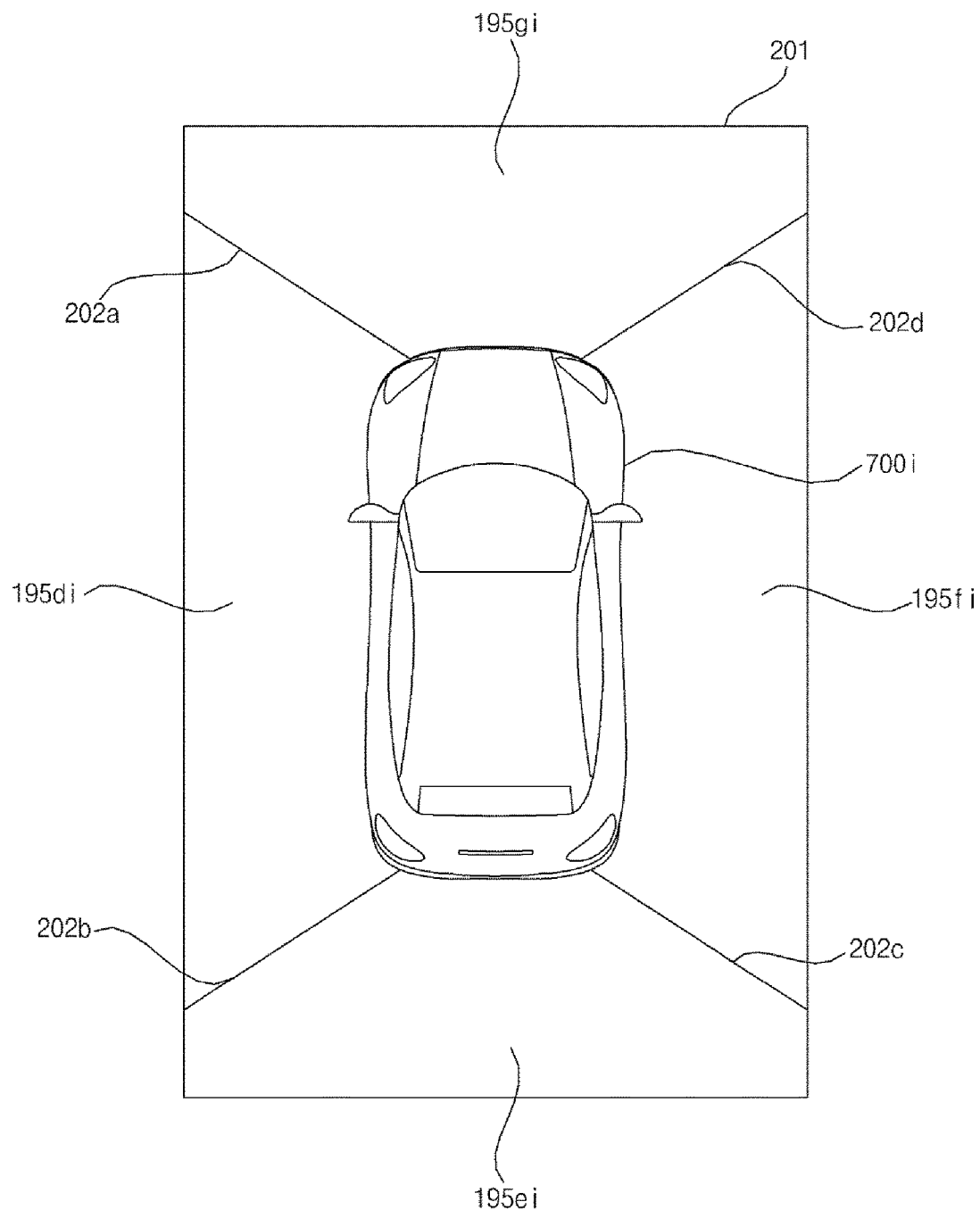

FIGS. 5 to 6B illustrate example cameras attached to the vehicle of FIG. 1.

Hereinafter, description will be given of a driver assistance system including cameras 195a and 195b for acquiring an image of the front view of the vehicle, with reference to FIG. 5.

While the driver assistance system 100 is illustrated as including two cameras in FIG. 5, it is apparent that the number of cameras is not limited thereto.

Referring to FIG. 5, the driver assistance system 100 may include a first camera 195a provided with a first lens 193a and a second camera 195b provided with a second lens 193b. In this case, the camera 195 may be called a stereo camera.

The driver assistance system 100 may include a first light shield 192a and a second light shield 192b, which are intended to shield light incident on the first lens 193a and the second lens 193b, respectively.

The driver assistance system 100 shown in the figure may be detachably attached to the ceiling or windshield of the vehicle 700.

The driver assistance system 100 may acquire stereo images of the front view of the vehicle from the first and second cameras 195a and 195b, perform disparity detection based on the stereo images, perform object detection in at least one stereo image based on the disparity information, and continuously track movement of an object after the object detection.

Hereinafter, description will be given of a driving assistance system including cameras 195d, 195e, 195f and 195g for acquiring images of the surroundings of the vehicle with reference to FIGS. 6A and 6B.

While FIGS. 6A and 6B illustrate the driver assistance system 100 as including four cameras, it is apparent that the number of cameras is not limited thereto.

Referring to FIGS. 6A and 6B, the driver assistance system 100 may include a plurality of cameras 195d, 195e, 195f and 195g. In this case, the camera 195 may be called an around view camera.

The cameras 195d, 195e, 195f and 195g may be disposed at the left, back, right and front of the vehicle, respectively.

The left camera 195d may be disposed in a case surrounding the left side-view mirror. Alternatively, the left camera 195d may be disposed at the exterior of the case surrounding the left side-view mirror. Alternatively, the left camera 195d may be disposed in one outer area of the left front door, left rear door or left fender.

The right camera 195f may be disposed in a case surrounding the right side-view mirror. Alternatively, the right camera 195f may be disposed at the exterior of the case surrounding the right side-view mirror. Alternatively, the right camera 195f may be disposed at one outer area of the right front door, right rear door or right fender.

The rear camera 195e may be disposed near the rear license plate or trunk switch.

The front camera 195g may be disposed near the badge or radiator grille.

Images captured by the plurality of cameras 195d, 195e, 195f and 195g may be delivered to the processor 170, and the processor 170 may synthesize the images to generate an image of the surroundings of the vehicle.

FIG. 6B shows an exemplary image of the surroundings of the vehicle. A vehicle surroundings image 201 may include a first image area 195di of an image captured by the left camera 195d, a second image area 195ei of an image captured by the rear camera 195e, the third image area 195fi of an image captured by the right camera 195f, and the fourth image area of an image captured by the front camera 195g.

When an around view image is generated from the plurality of cameras, boundary parts may be produced among the respective image areas. The boundary parts may be processed through image blending to look natural when they are displayed.

Meanwhile, boundary lines 202a, 202b, 202c, and 202d may be displayed on the respective boundaries of a plurality of images.

The vehicle surroundings image 201 may include a vehicle image 700i. Herein, the vehicle image 700i may be generated by the processor 170.

The vehicle surroundings image 201 may be displayed through the display unit 741 of the vehicle or a display unit 180 of the driver assistance system.

FIGS. 7A to 7C illustrate an example interior of a driver assistance system.

In FIGS. 7A and 7B, the driver assistance system 100 may generate vehicle-related information by performing signal processing of an image received from the camera 195 based on computer vision. Herein, the vehicle-related information may include vehicle control information for direction control of the vehicle or vehicle driving assistance information for assisting the driver in driving.

Herein, the camera 195 may be a mono camera for capturing images of the front view or rear view of the vehicle. Alternatively, the camera 195 may include stereo cameras 195a and 195b for capturing images of the front view or rear view of the vehicle. Alternatively, the camera 195 may include around view cameras 195d, 195e, 195f and 195g for capturing images of surroundings of the vehicle.

FIG. 7A is a block diagram illustrating the interior of the driver assistance system 100.

Referring to FIG. 7A, the driver assistance system 100 may include an input unit 110, a communication unit 120, an interface unit 130, a memory 140, a processor 170, a power supply 190, a camera 195, a display unit 180 and an audio output unit 185.

The input unit 110 may be equipped with a plurality of buttons or a touchscreen attached to the driver assistance system 100, in particular, the camera 195. The driver assistance system 100 may be turned on and operated through the plurality of buttons or the touchscreen. Various input operations may also be performed through the buttons or touchscreen.

The communication unit 120 may wirelessly exchange data with the mobile terminal 600 or the server 500. In particular, the communication unit 120 may wirelessly exchange data with a mobile terminal of the vehicle driver. Wireless data communication schemes may include Bluetooth, Wi-Fi Direct, Wi-Fi, APiX, and NFC.

The communication unit 120 may receive weather information and traffic situation information (e.g., TPEG (Transport Protocol Expert Group)) from the mobile terminal 600 or the server 500. The driver assistance system 100 may transmit recognized real-time information to the mobile terminal 600 or the server 500.

When a user enters the vehicle, the mobile terminal 600 of the user may be paired with the driver assistance system 100 automatically or by execution of an application by the user.

The communication unit 120 may receive change-of-traffic light information from the external server 510. Herein, the external server 510 may be a server positioned at a traffic control center that controls traffic.

The interface unit 130 may receive vehicle-related or transmit a signal processed or generated by the processor 170. To this end, the interface unit 130 may perform data communication with the controller 770, the AVN apparatus 400, the sensing unit 760 and the like which are included in the vehicle through wired or wireless communication.

The interface unit 130 may receive navigation information through data communication with the controller 770, the AVN apparatus 400 or a separate navigation apparatus. Herein, the navigation information may include predetermined destination information, route information according to the destination, map information, and current location information, wherein the map information and the current location information are related to traveling of the vehicle. The navigation information may include information about the location of the vehicle on the road.

Meanwhile, the interface unit 130 may receive sensor information from the controller 770 or the sensing unit 760.

Herein, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, and interior temperature information, interior humidity information.

Such sensor information may be acquired from a heading sensor, a yaw sensor, a gyro sensor, a position module, a vehicle drive/reverse sensor, a wheel sensor, a vehicle speed sensor, a vehicle body tilt sensor, a battery sensor, a fuel sensor, a tire sensor, a steering sensor based on turning of the steering wheel, an interior temperature sensor, and an interior humidity sensor. The position module may include a GPS module for receiving GPS information.

Among the pieces of sensor information, the vehicle direction information, vehicle location information, vehicle orientation information, vehicle speed information and vehicle inclination information, which are related to traveling of the vehicle, may be called vehicle travel information.

The memory 140 may store various kinds of data for overall operation of the driver assistance system 100 including a program for processing or controlling operation of the processor 170.

The memory 140 may store data for identifying an object. For example, if a predetermined object is detected in an image acquired through the camera 195, the memory 140 may store data for identifying the object according to a predetermined algorithm.

The memory 140 may store traffic information data. For example, if predetermined traffic information is detected in an image acquired through the camera 195, the memory 140 may store data for identifying the traffic information according to a predetermined algorithm.

When implemented through hardware, the memory 140 may include various storage devices such as a ROM, RAM, EPROM, flash drive, and hard drive.

The processor 170 is configured to control overall operation of each unit in the driver assistance system 100.

The processor 170 may process an image of the vehicle front view image or a vehicle surroundings image acquired by the camera 195. In particular, the processor 170 performs signal processing based on computer vision. Thereby, the processor 170 may acquire an image of the front view or surroundings of the vehicle from the camera 195, and may detect and track an object based on the image. In particular, in detecting an object, the processor 170 may perform lane detection (LD), vehicle detection (VD), pedestrian detection (PD), bright spot detection (BD), traffic sign recognition (TSR), and road surface detection.

A traffic sign may represent predetermined information which can be delivered to the driver of the vehicle 700. The traffic sign may be delivered to the driver through a traffic light, a traffic signboard or a road surface. For example, the traffic sign may be a Go or Stop signal output from a traffic light for a vehicle or pedestrian. For example, the traffic sign may include various designs or texts marked on traffic signboards. For example, the traffic sign may include various designs or texts marked on the road surface.

The processor 170 may detect information in a vehicle front view image, vehicle rear view image or surroundings-of-vehicle image acquired by the camera 195.

The information may include forward objects information, rearward objects information, and road information.

The processor 170 may compare the detection information with information stored in the memory 140 to identify the information.

Meanwhile, the processor 170 is configured to control zoom of the camera 195. For example, the processor 170 is configured to control zoom of the camera 195 according to a result of the object detection. For example, if a traffic signboard is detected, but details marked on the traffic signboard are not detected, the processor 170 is configured to control the camera 195 such that the camera 195 zooms in.

The processor 170 may receive weather information and traffic situation information (e.g., TPEG (Transport Protocol Expert Group)) through the communication unit 120.

The processor 170 may recognize, in real time, information about a traffic situation around the vehicle recognized by the driver assistance system 100 based on stereo images.

The processor 170 may receive navigation information from the AVN apparatus 400 or a separate navigation apparatus through the interface unit 130.

The processor 170 may receive sensor information from the controller 770 or the sensing unit 760 through the interface unit 130. Herein, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, interior temperature information, interior humidity information and steering wheel rotation information.

The processor 170 may receive navigation information from the controller 770, the AVN apparatus 400, or a separate navigation apparatus through the interface unit 130.

The processor 170 may detect a relative distance to an object based on change in size of the object detected in time. The processor 170 may detect a relative speed of the detected object based on the detected relative distance and vehicle speed.

For example, if the mono camera 195 captures a front view image of the vehicle 700, the processor 170 may detect a front object. The processor 170 may detect a relative distance to the front object based on change in size of the front object detected in time. Herein, the front object may be a foregoing vehicle.

For example, if the mono camera 195 captures a rear view image of the vehicle 700, the processor 170 may detect a rear object. The processor 170 may detect a relative distance to the rear object based on change in size of the rear object detected in time. Herein, the rear object may be a following vehicle.

Meanwhile, the processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The processor 170 may be controlled by the controller 770.

The display unit 180 may display various kinds of information processed by the processor 170. The display unit 180 may display an image related to operation of the driver assistance system 100. To display such image, the display unit 180 may include a cluster or HUD on the inner front of the vehicle. If the display unit 180 is an HUD, the unit may include a projection module for projecting an image onto the wind shied of the vehicle 700.

The audio output unit 185 may output sound based on an audio signal processed by the processor 170. To this end, the audio output unit 185 may include at least one speaker.

An audio input unit may receive a user's voice. To this end, the unit may include a microphone. The received voice may be converted into an electrical signal and delivered to the processor 170.

The power supply 190 may be controlled by the processor 170 to supply electric power necessary for operation of respective constituents. In particular, the power supply 190 may receive power from, for example, a battery in the vehicle.

The camera 195 acquires a vehicle front view image, a vehicle rear view image or a surroundings-of-vehicle image. The camera 195 may be a mono camera or stereo camera 195a, 195b for capturing the vehicle front view image or rear view image. Alternatively, the camera 195 may include a plurality of cameras 195d, 195e, 195f and 195g for capturing a surroundings-of-vehicle image.

The camera 195 may include an image sensor (e.g., CMOS or CCD) and an image processing module.

The camera 195 may process a still image or a moving image obtained by the image sensor. The image processing module may process the still image or moving image acquired through the image sensor. In some implementations, the image processing module may be configured separately from the processor 170 or integrated with the processor 170.

Zoom of the camera 195 may be controlled by the processor 170. For example, a zoom barrel included in the camera 195 may be moved as controlled by the processor 170, thereby setting the zoom.

The camera 195 may be controlled by the processor 170 to set the focus. For example, a focus barrel included in the camera 195 may be moved as controlled by the processor 170, thereby setting the focus. The focus may be automatically set based on the zoom setting.

Meanwhile, the processor 170 may automatically control the focus according to zoom control of the camera 195.

The camera 195 may detect a front object or rear object of the vehicle.

FIG. 7B is a block diagram illustrating the interior of the driver assistance system 100.

Referring to FIG. 7B, the driver assistance system 100 of FIG. 7B differs from the driver assistance system 100 of FIG. 7A in that the system of FIG. 7B includes stereo cameras 195a and 195b. Hereinafter, description will be given focusing on this difference.

The driver assistance system 100 may include first and second cameras 195a and 195b. Herein, the first and second cameras 195a and 195b may be called stereo cameras.

The stereo camera 195a and 195b may be detachably formed on the ceiling or windshield of the vehicle 700. The stereo camera 195a and 195b may include a first lens 193a and a second lens 193b.

The stereo camera 195a and 195b may include a first light shield 192a and a second light shield 192b, which are intended to shield light incident on the first lens 193a and the second lens 193b, respectively.

The first camera 195a acquires a first image of the front view of the vehicle. The second camera 195b acquires a second image of the front view of the vehicle. The second camera 195b is spaced a predetermined distance from the first camera 195a. As the first and second cameras 195a and 195b are spaced a predetermined distance from each other, a disparity therebetween is produced, and a distance to an object may be detected according to the disparity.

If the driver assistance system 100 includes the stereo cameras 195a and 195b, the processor 170 performs signal processing based on computer vision. Thereby, the processor 170 may acquire stereo images of the front view of the vehicle from the stereo cameras 195a and 195b, perform disparity calculation based on the stereo images, perform object detection in at least one of the stereo images based on the calculated disparity information, and continuously track movement of an object after object detection. Herein, the stereo images are based on the first image received from the first camera 195a and the second image received from the second camera 195b.

In particular, in detecting an object, the processor 170 may perform lane detection (LD), vehicle detection (VD), pedestrian detection (PD), bright spot detection (BD), traffic sign recognition (TSR), and road surface detection.

In addition, the processor 170 may calculate the distance to a detected vehicle, the speed of the detected vehicle, and difference in speed from the detected vehicle.

The processor 170 is configured to control zoom of the first and second cameras 195a and 195b individually. The processor 170 may periodically change the zoom ratio of the second camera 195b, keeping the zoom ratio of the first camera 195a constant. The processor 170 may periodically change the zoom ratio of the first camera 195a, keeping the zoom ratio of the second camera 195b constant.

The processor 170 is configured to control the first or second camera 195a or 195b to zoom in or out with a predetermined periodicity.

The processor 170 may set the first camera 195a to a high zoom ratio to readily detect a distant object. The processor 170 may also set a low zoom ratio of the second camera 195b to readily detect a nearby object. The processor 170 is configured to control the first camera 195a and the second camera 195b such that the first camera 195a zooms in and the second camera 195b zooms out.

Alternatively, the processor 170 may set the first camera 195a to a low zoom ratio to readily detect a nearby object. The processor 170 may also set a high zoom ratio of the second camera 195b to readily detect a distant object. The processor 170 is configured to control the first camera 195a and the second camera 195b such that the first camera 195a zooms out and the second camera 195b zooms in.

For example, the processor 170 is configured to control zoom of the first camera 195a or the second camera 195b according to a result of the object detection. For example, if a traffic signboard is detected, but details marked on the traffic signboard are not detected, the processor 170 is configured to control the first camera 195a or the second camera 195b to zoom in.

Meanwhile, the processor 170 may automatically control the focus according to zoom control of the camera 195.

FIG. 7C is a block diagram illustrating the interior of the driver assistance system 100.

The driver assistance system 100 of FIG. 7C differs from the driver assistance system 100 of FIG. 7A in that the driver assistance system 100 of FIG. 7C includes around view cameras 195d, 195e, 195f and 195g. Hereinafter, description will be given focusing on this difference.

The driver assistance system 100 may include around view cameras 195d, 195e, 195f and 195g.

Each of the around view cameras 195d, 195e, 195f and 195g may include a lens and a light shield for shielding light incident on the lens.

The around view cameras may include a left camera 195*d*, a rear camera 195*e*, a right camera 195*f* and a front camera 195*g*.

The left camera 195*d* acquires an image of the left side view of the vehicle. The rear camera 195*e* acquires an image of the rear view of the vehicle. The right camera 195*f* acquires an image of the right side view of the vehicle. The front camera 195*g* acquires an image of the front view of the vehicle.

Images acquired by the around view cameras 195*d*, 195*e*, 195*f* and 195*g* are delivered to the processor 170.

The processor 170 may synthesize a left view image, rear view image, right view image and front view image of the vehicle to generate a surroundings-of-vehicle image. In this case, the surroundings-of-vehicle image may be a top view image or bird's eye view image. The processor 170 may receive and synthesize the left view image, rear view image, right view image and front view image of the vehicle, and convert the synthesize image into a top view image to generate a surroundings-of-vehicle image.

The processor 170 may detect an object based on the surroundings-of-vehicle image. In particular, in detecting an object, the processor 170 may perform lane detection (LD), vehicle detection (VD), pedestrian detection (PD), bright spot detection (BD), traffic sign recognition (TSR), and road surface detection.

The processor 170 may detect a relative distance to the detected object or a relative speed of the object. Detection of the relative distance or relative speed may be performed as described above with reference to FIG. 7A or 7B.

The processor 170 may individually control zoom of the around view cameras 195*d*, 195*e*, 195*f* and 195*g*. Zoom control of the processor 170 may be performed in the same manner as zoom control of stereo cameras described above with reference to FIG. 7B.

Figure 8A:
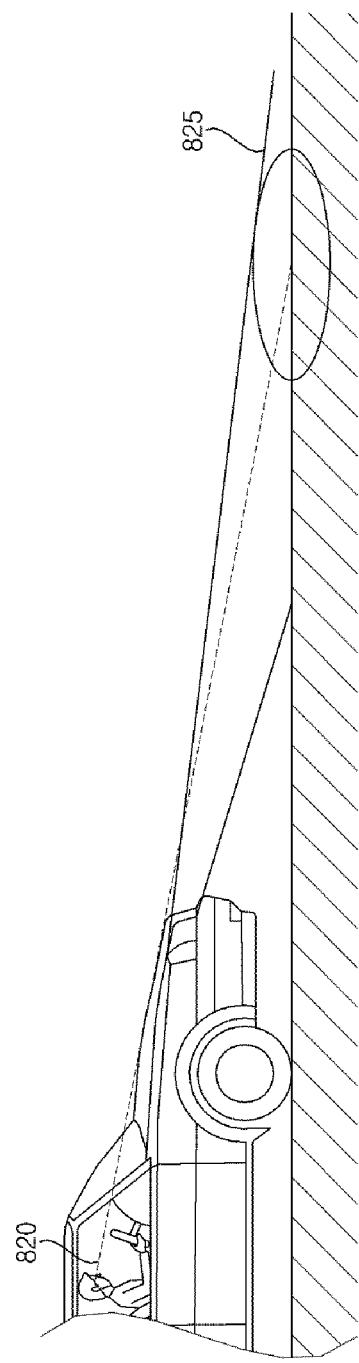
FIGS. 8A and 8B are diagrams illustrating an example lamp for vehicles that displays information in an area corresponding to the user's gaze.
Figure 8B:
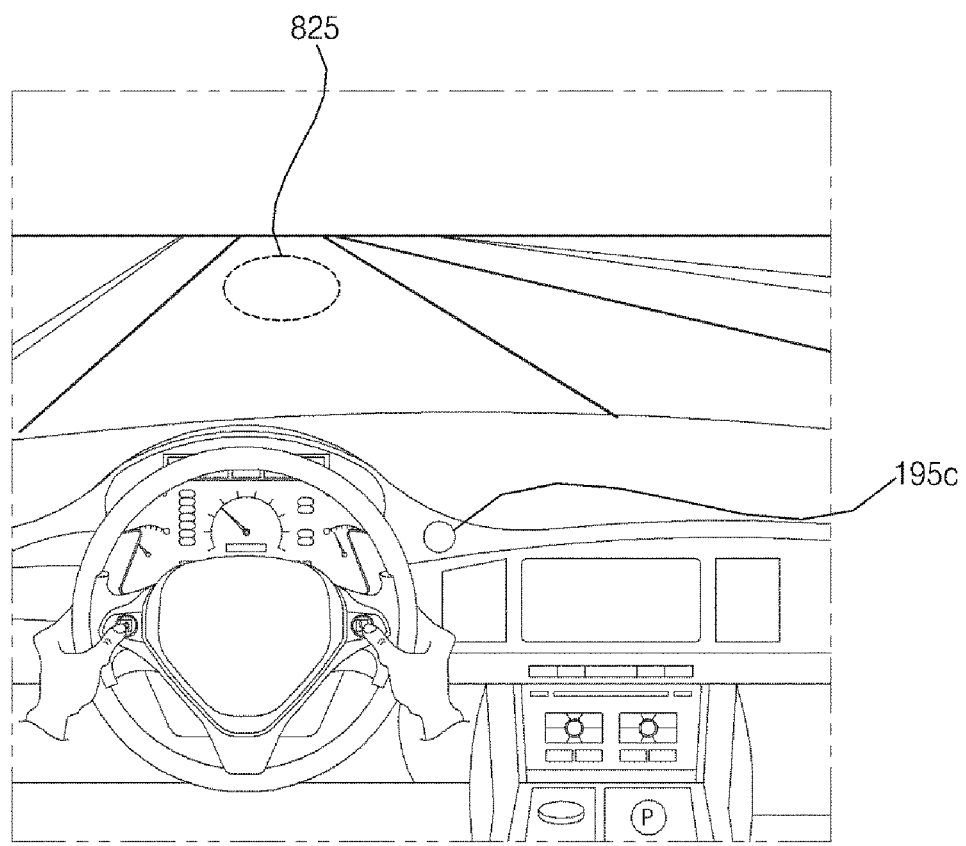

FIGS. 8A and 8B illustrate an example lamp for vehicles that displays information in an area corresponding to the user's gaze.

FIG. 8A illustrates a case where the user gazes at the right side of the vehicle, and FIG. 8B illustrates a case where the user in the driver's seat gazes forward.

Referring to FIGS. 8A and 8B, the vehicle 700 may include a gaze-sensing module for sensing the user's gaze. The gaze-sensing module may include an internal camera 195*c* disposed inside the vehicle and an internal image processor for processing an image acquired by the internal camera 195*c*.

The gaze-sensing module may sense the user's gaze. For example, the internal camera 195*c* may capture an image of the user's face. The internal image processor may detect a pupil image in the face image captured by the internal camera 195*c* using a technique such as circular detection template and circular edge detection. The internal image processor may detect the user's gaze based on movement of the detected pupil image. The detected user gaze information may be delivered to the controller 770 or the lamp 200.

The processor 270 of the lamp for vehicles is configured to control the transparent display 250 such that predetermined information is displayed in an area 825 corresponding to the user's gaze 820 sensed through the internal camera 195*c*. For example, the processor 270 of the lamp may adjust the area of content or a pattern created on the transparent display 250 such that predetermined information is displayed in the area 825 corresponding to the user's gaze.

In some implementations, the processor 270 is configured to control the position adjustment unit 255 to adjust the position of the transparent display 250 such that various kinds of information are displayed in the area 825 corresponding to the user's gaze 820.

Figure 9A:
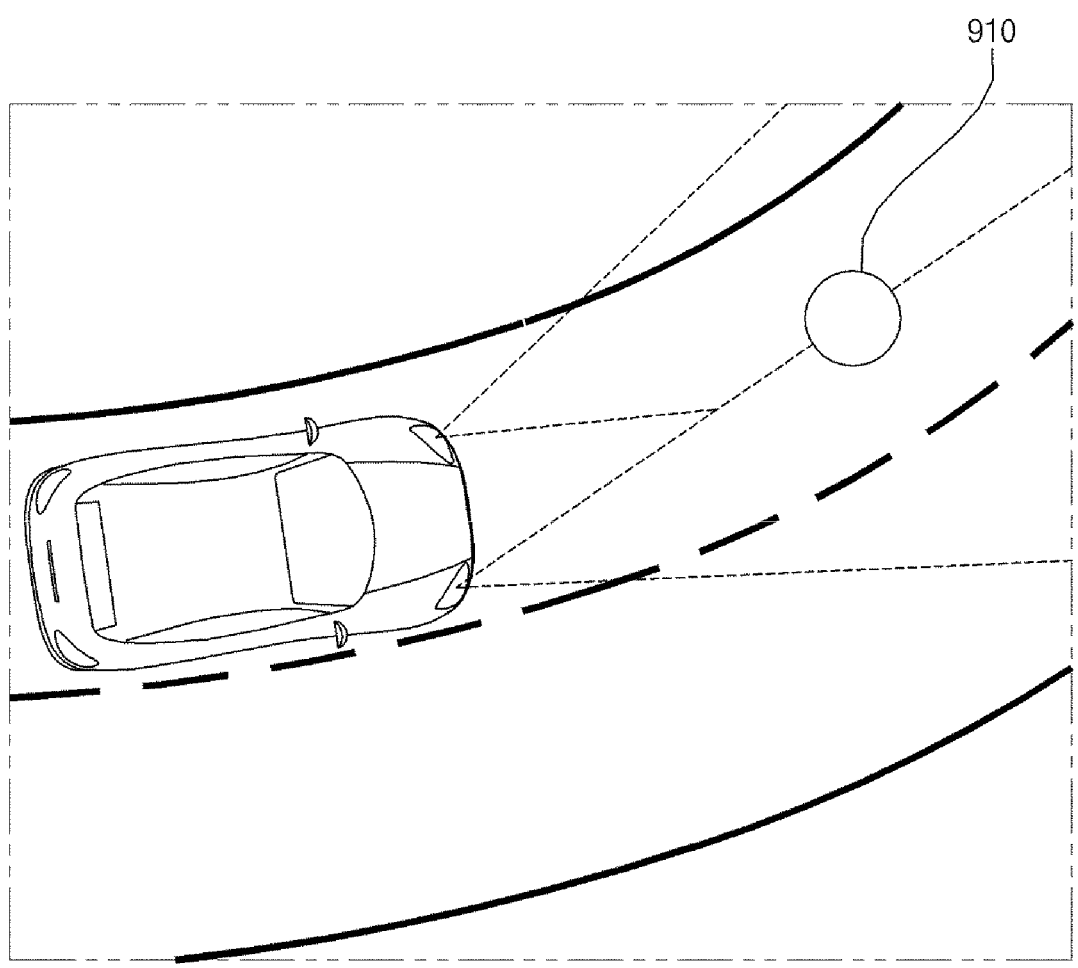
FIGS. 9A and 9B are diagrams illustrating an example projection surface on which information is displayed.
Figure 9B:
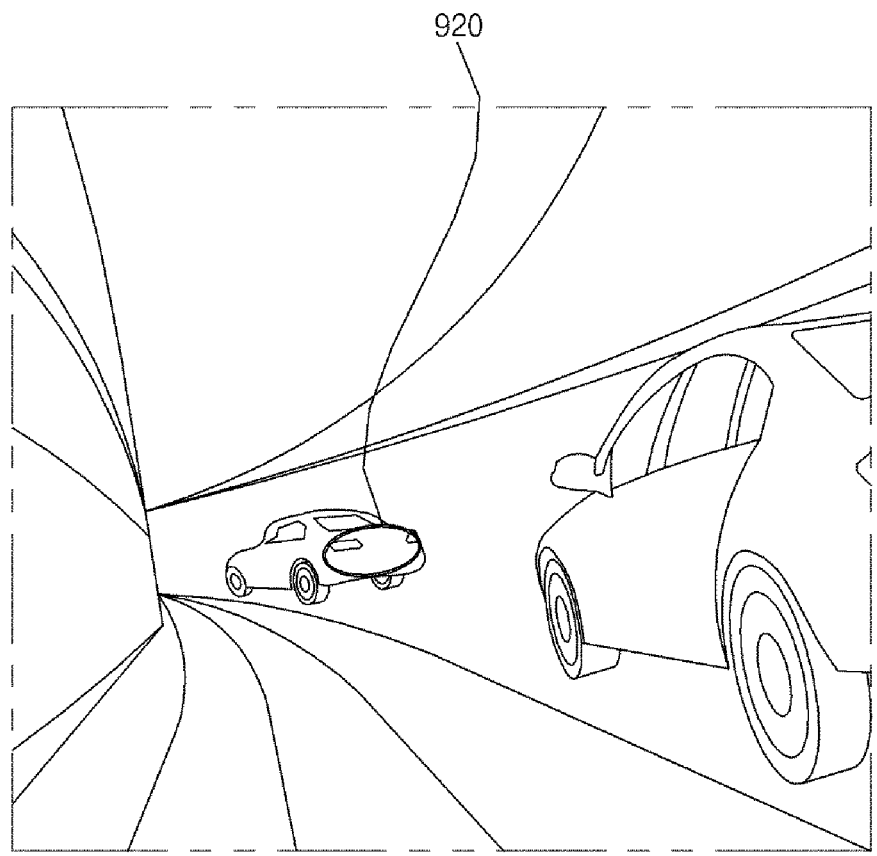

FIGS. 9A and 9B illustrate an example projection surface on which information is displayed.

Referring to FIGS. 9A and 9B, the projection surface may be a road surface, fog or the body of another vehicle.

As shown in FIG. 9A, the processor 270 of the lamp may perform a control operation to project light onto the surface of a road on which the vehicle is traveling and to display predetermined information in the light. In this case, the processor 270 may perform a control operation such that the predetermined information is displayed in the lane on which the vehicle 700 is traveling. As the information is displayed only in the lane on which the vehicle is traveling, incorrect information may be prevented from being delivered to drivers of other nearby vehicles.

Alternatively, as shown in FIG. 9B, the processor 270 of the lamp may perform a control operation to project light onto the surface of a road on which the vehicle is traveling and a part of the body of a foregoing vehicle and to display predetermined information in the light projected onto the body of the foregoing vehicle.

When fog is detected through the driver assistance system 100, the processor 270 may perform a control operation such that light is projected onto the fog and predetermined information is displayed in the light projected onto the fog.

Meanwhile, the processor 270 is configured to control the transparent display 250 to control the location of the projection surface. For example, the processor 270 is configured to control the area of content or a pattern created on the transparent display 250 to control the location of the projection surface.

The processor 270 of the lamp for vehicles is configured to control the position adjustment unit 255 to adjust the location of the projection surface. Alternatively, the processor 270 is configured to control the light source position adjustment unit 268 to adjust the location of the projection surface.

As shown in FIG. 9A, the processor 270 is configured to control the position adjustment unit 255 or the light source position adjustment unit 268 to adjust the position of the transparent display 250 or the light source 265 such that information is displayed on a road surface 910.

As shown in FIG. 9B, the processor 270 is configured to control the position adjustment unit 255 or the light source position adjustment unit 268 to adjust the position of the transparent display 250 or the light source 265 such that information is displayed on the body 920 of a foregoing vehicle.

Meanwhile, the processor 270 is configured to control the position adjustment unit 255 or the light source position adjustment unit 268 to adjust the position of the transparent display 250 or the light source 265 such that information is displayed on fog.

The processor 270 may adjust the projection surface based on a relative distance to a foregoing vehicle or following vehicle.

Figure 10:
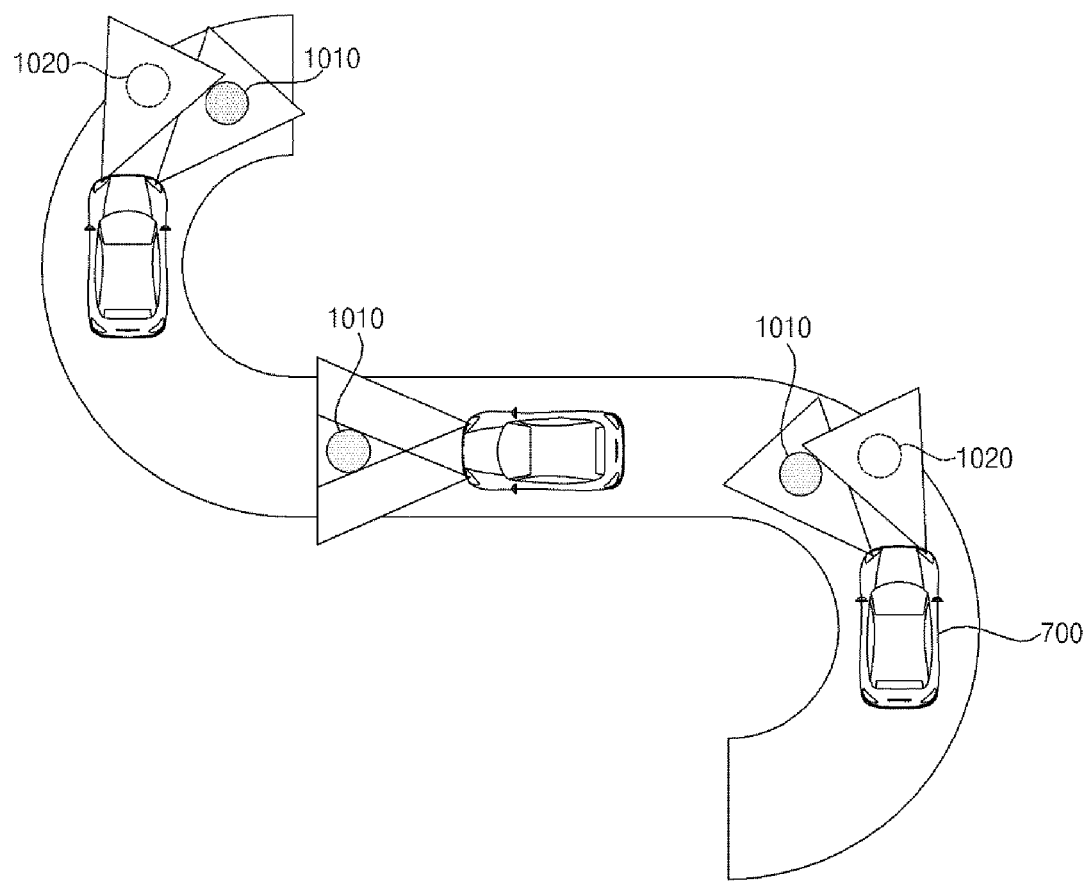
FIG. 10 is a diagram illustrating displaying predetermined information between curved driving lanes that a vehicle travels.

FIG. 10 illustrates example of displaying predetermined information between curved driving lanes that a vehicle travels.

Referring to FIG. 10, when the vehicle 700 is traveling on a road curved to the left, the processor 270 of the lamp for vehicles is configured to control information 1010 such that the information 1010 is displayed further to the left than when the vehicle 700 is traveling on a straight road 1020. In this case, light emitted from the headlamp may be directed further to the left than when the vehicle travels along a straight road, in consideration of the curve. Herein, curve information may be detected in a front view image of the vehicle through the driver assistance system 100.

When the vehicle 700 is traveling on a road curved to the right, the processor 270 of the lamp is configured to control the information 1010 such that the information 1010 is displayed further to the right than when the vehicle 700 travels on the straight road 1020. In this case, light emitted from the headlamp may be directed further to the right than when the vehicle travels along a straight road, in consideration of the curve. Herein, curve information may be detected in a front view image of the vehicle through the driver assistance system 100.

The processor 270 may adjust the location of the projection surface by controlling the content or pattern created on the transparent display 250.

The processor 270 may adjust the location of the projection surface by controlling the position adjustment unit 255. Alternatively, the processor 270 may adjust the location of the projection surface by controlling the light source position adjustment unit 268.

In some implementations, the exterior of the transparent display 250 may have a circular shape or a rectangular shape. In some other implementations, the shape of the transparent display 250 may change based on the lamp design. For example, the exterior of the transparent display 250 may have a polygonal shape.

FIGS. 11 to 27 illustrate examples of displaying information with a light source of a headlamp.

Figure 11:
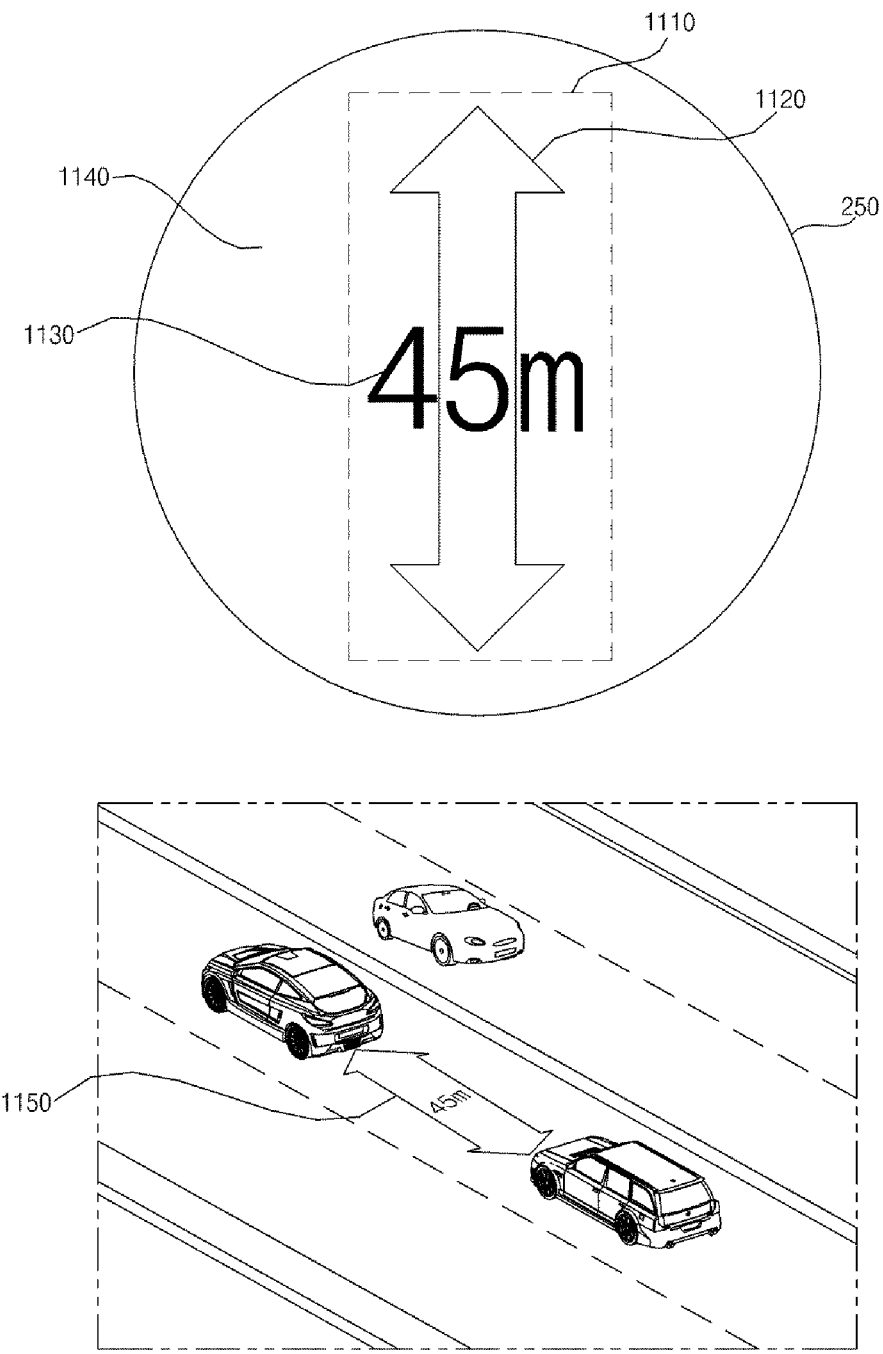
FIGS. 11 to 27 are diagrams illustrating example displaying information with a light source of a headlamp.

FIG. 11 illustrates an example of displaying information on a distance to a foregoing vehicle or following vehicle.

Referring to FIG. 11, the processor 270 of the lamp 200 may receive information on a distance to an object ahead of the vehicle through the interface unit 280. Herein the distance information may be generated by the driver assistance system 100 based on change in size of a foregoing vehicle in time in images acquired by the camera 195 (e.g., a mono camera). Herein, the distance information may be generated by the driver assistance system 100 based on disparity information in images acquired by the stereo cameras 195*a* and 195*b*.

The processor 270 of the lamp for vehicles is configured to control the transparent display 250 to display the distance information on a projection surface. The processor 270 is configured to control the transparent display 250 to form a design 1120 or text 1130 corresponding to the distance to a foregoing vehicle in one area 1110 of the transparent display 250 using a difference in color, brightness or light intensity. There is a difference in color, brightness or light intensity between light emitted outward through the area of the transparent display 250 in which the design 1120 or text 1130 is formed and light emitted outward through the other area 1140 of the transparent display 250 in which neither design nor text is formed.

As light is emitted outward from the lamp with different colors, brightness or light intensities, distance information 1150 about the foregoing vehicle may be displayed on projection surface. In this case, the distance information 1150 may be formed in the light that is emitted from the lamp 200 to secure a clear view.

Figure 12:
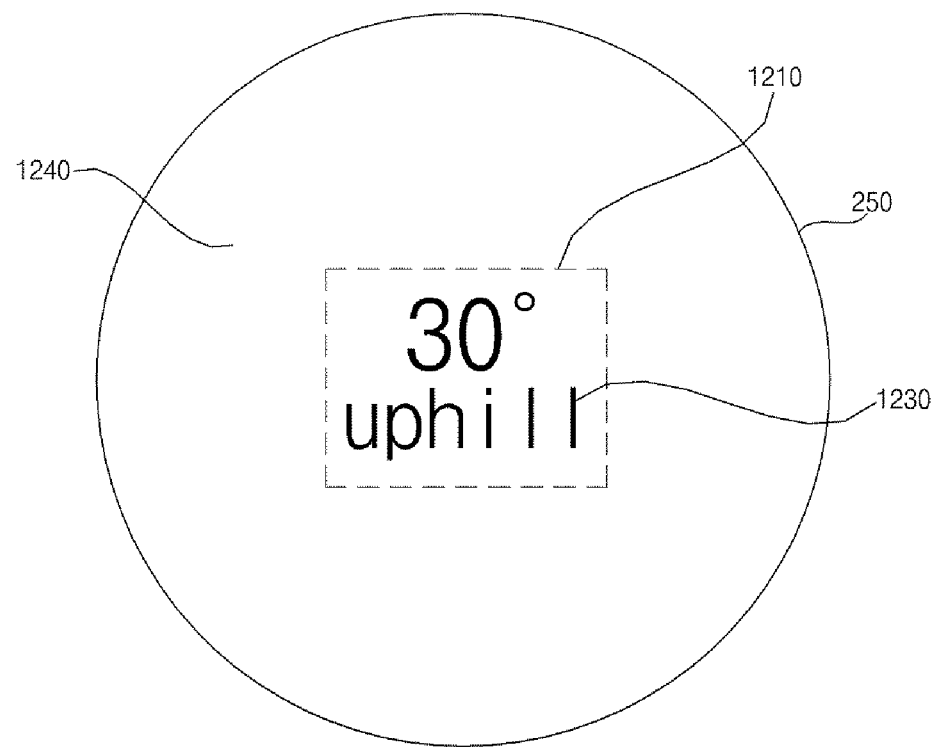
Figure 12:
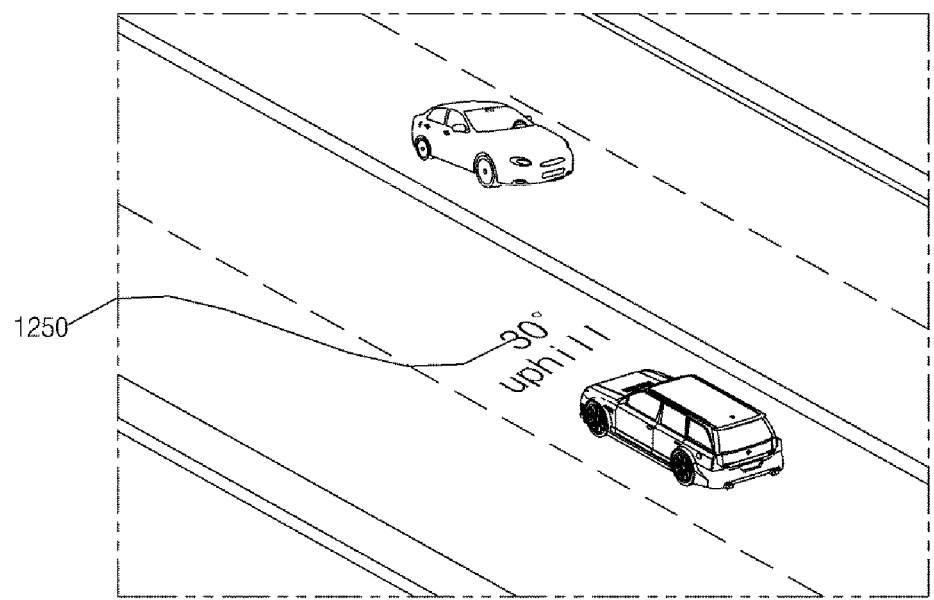
Figure 13:
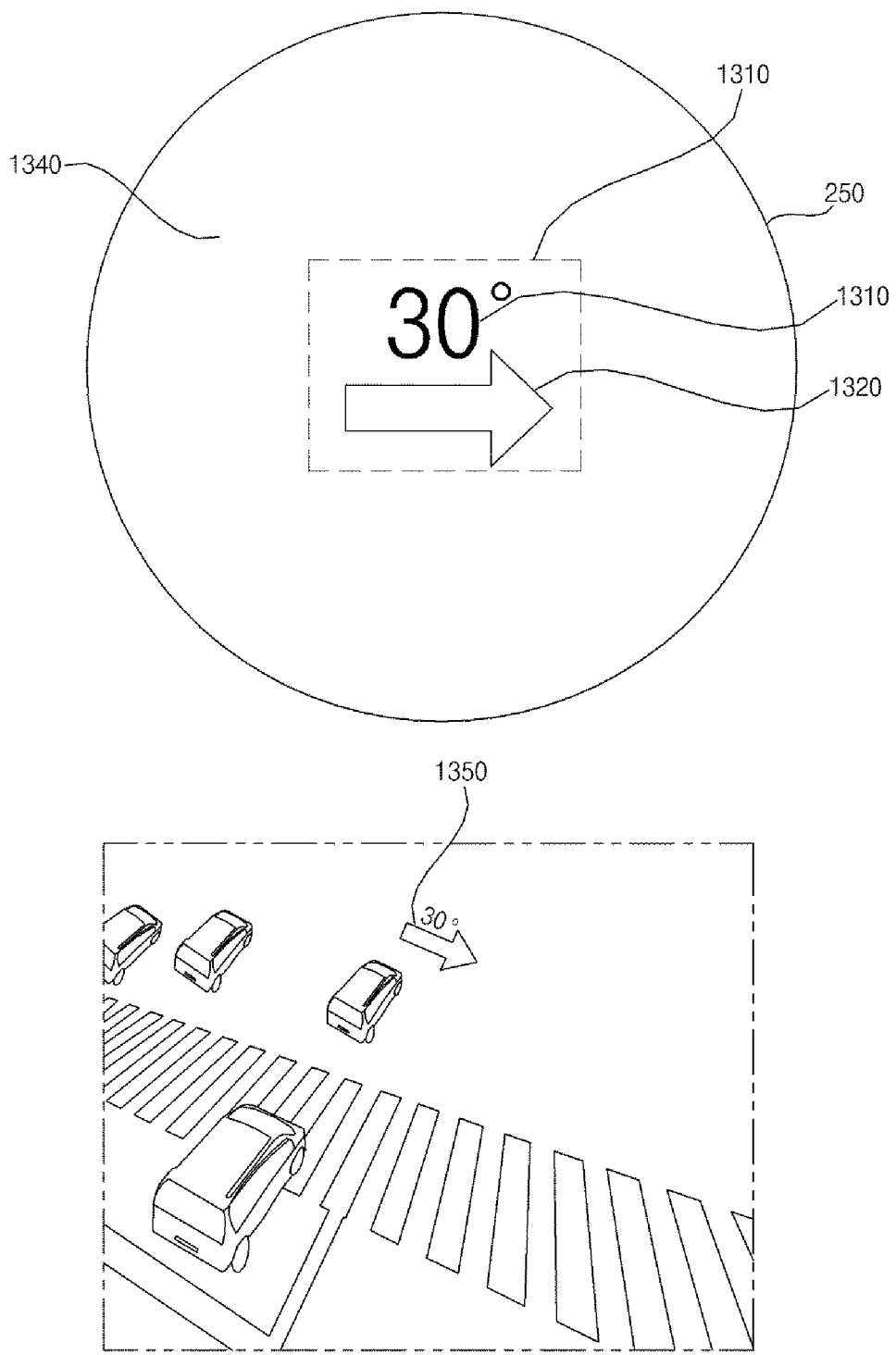

FIGS. 12 and 13 illustrate examples of displaying road information.

Referring to FIG. 12, the processor 270 of the lamp 200 may receive gradient information about a road through the interface unit 280. Herein, the gradient information about the road may be inclination information acquired from a tilt sensor included in the sensing unit 760 of the vehicle.

The gradient information about a road may be inclination information acquired by processing a stereo image of the front view of the vehicle in the driver assistance system 100 using a depth map technique.

The driver assistance system 100 may generate a depth map based on the stereo image of the front view of the vehicle, detect an uphill road or downhill road ahead of the traveling vehicle based on the generated depth map, and detect the inclination of the road.

The driver assistance system 100 may detect a road surface in the stereo image or depth map, detect the uphill road or downhill road ahead of the vehicle based on the detected road surface, and detect the inclination of the road.

The driver assistance system 100 may detect a lane in the stereo image or depth map, detect the uphill road or downhill road ahead of the vehicle based on the detected lane, and detect the inclination of the lane.

The driver assistance system 100 may detect the uphill road or downhill road ahead of the vehicle based on a vanishing point marked in the stereo image or depth map, and detect the inclination of the road.

The driver assistance system 100 may detect the uphill road or downhill road based on a plurality of fixed objects (e.g., street trees or streetlights) around the road displayed in the stereo image or depth map, and detect the inclination of the road.

The processor 270 is configured to control the transparent display 250 to display the gradient information on the projection surface.

The processor 270 is configured to control the transparent display 250 to display the gradient information on the projection surface. The processor 270 is configured to control the transparent display 250 such that a text 1230 corresponding to the gradient information is displayed in one area 1210 of the transparent display 250 using a difference in color, brightness or light intensity. There is a difference in color, brightness or light intensity between light emitted outward through the area of the transparent display 250 in which the text 1230 is formed and light emitted outward through the other area 1240 of the transparent display 250 in which no text is formed.

As light is emitted outward from the lamp with different colors, brightness or light intensities, gradient information 1250 may be displayed on the projection surface. In this case, the gradient information 1250 may be formed in the light that is emitted from the lamp 200 to secure a clear view.

Referring to FIG. 13, the processor 270 of the lamp 200 may receive curvature information about the road through the interface unit 280. Herein, the curvature information may be detected based on the angle of rotation of the steering wheel that is acquired from a steering sensor included in the sensing unit 260 of the vehicle.

Alternatively, the curvature information about the road may be information about a curve acquired by the driver assistance system 100 based on a front view image of the vehicle.

The driver assistance system 100 may detect a lane in a front view image of the vehicle, and generate the information about a curve based on the detected lane. The driver assistance system 100 may detect a lane on which the vehicle is traveling and generate information about the curve, based on the lines on both sides of the lane. Alternatively, the driver assistance system 100 may detect a lane and generate information about the curve, based on the center lane. For example, the driver assistance system 100 may detect a lane through Hough transformation, and generate information on the curve of the road. Herein, the information about the curve may include curvature.

The processor 270 of the lamp for vehicles is configured to control the transparent display 250 to display the curvature information on the projection surface. The processor 270 may perform a control operation such that a design 1320 or text 1330 corresponding to the curvature information is formed in one area 1310 of the transparent display 250 using a difference in color, brightness or light intensity. There is a difference in color, brightness or light intensity between light emitted outward through the area of the transparent display 250 in which the design 1320 or text 1330 is formed and light emitted outward through the other area 1240 of the transparent display 250 in which neither design nor text is formed.

As light is emitted outward from the lamp with different colors, brightness or light intensities, the curvature information 1350 may be displayed on the projection surface. In this case, the curvature information 1350 may be formed in the light that is emitted from the lamp 200 to secure a clear view.

Figure 14:
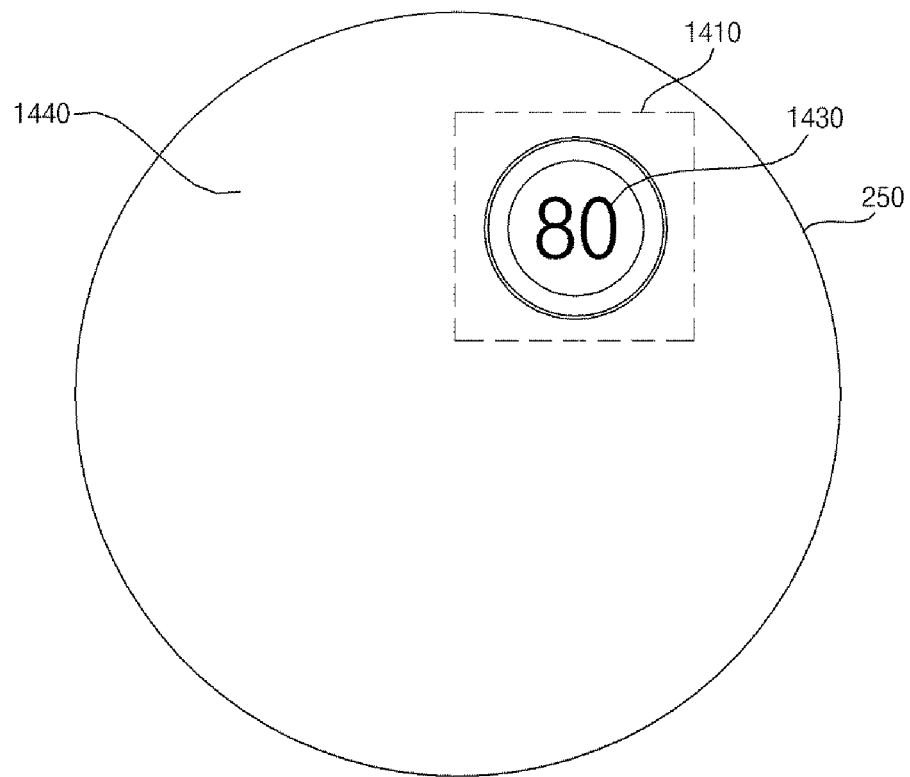
Figure 14:
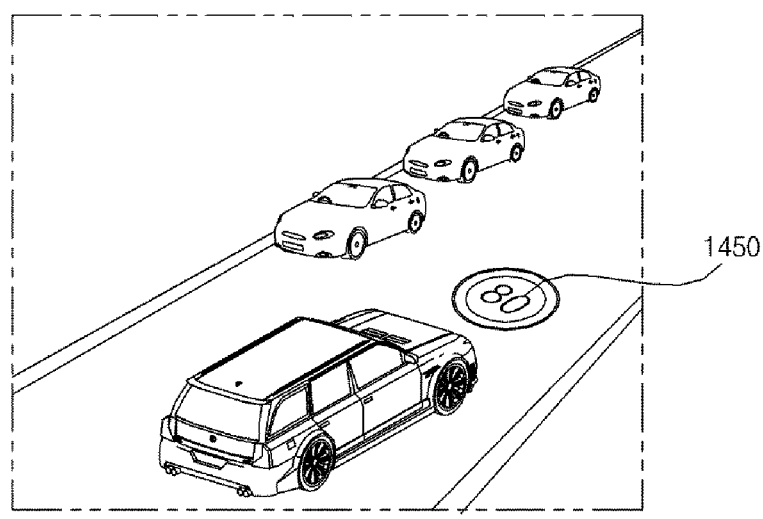

FIG. 14 illustrates an example of displaying traffic sign recognition information.

Referring to FIG. 14, the processor 270 of the lamp 200 may receive detected traffic sign recognition (TSR) information through the interface unit 280. Herein the TSR information may be detected based on an image of the front view of the vehicle acquired by the driver assistance system 100.

The detected TSR information may include traffic signboard detection information, traffic light detection information, and road surface detection information.

The driver assistance system 100 may detect a traffic signboard in the acquired image of the front view of the vehicle. The driver assistance system 100 may detect a design or a text on the detected traffic signboard. The detected design or text information may be delivered to the lamp 200.

The driver assistance system 100 may detect a traffic light in the acquired image of the front view of the vehicle. The driver assistance system 100 may detect a signal output from the detected traffic light. The detected signal information may be delivered to the lamp 200.

The driver assistance system 100 may detect a road surface from the acquired image of the front view of the vehicle. The driver assistance system 100 may detect a design or a text on the detected road surface. The detected design or text information may be delivered to the lamp 200.

The processor 270 of the lamp for vehicles is configured to control the transparent display 250 to display the TSR information on the projection surface. The processor 270 of the lamp may perform a control operation such that a design or text 1430 corresponding to the TSR information is formed in one area 1410 of the transparent display 250 using a difference in color, brightness or light intensity. In this example, a text 1430 for sectional speed limit is exemplarily formed as the TSR information.

There is a difference in color, brightness or light intensity between light emitted outward through the area of the transparent display 250 in which the design or text 1430 is formed and design or text and light emitted outward through the other area 1440 of the transparent display 250 in which neither design nor text is formed.

As light is emitted outward from the lamp with different colors, brightness or light intensities, the detected TSR information 1450 may be displayed on the projection surface. In this case, the detected TSR information 1450 may be formed in the light that is emitted from the lamp 200 to secure a clear view.

Figure 15:
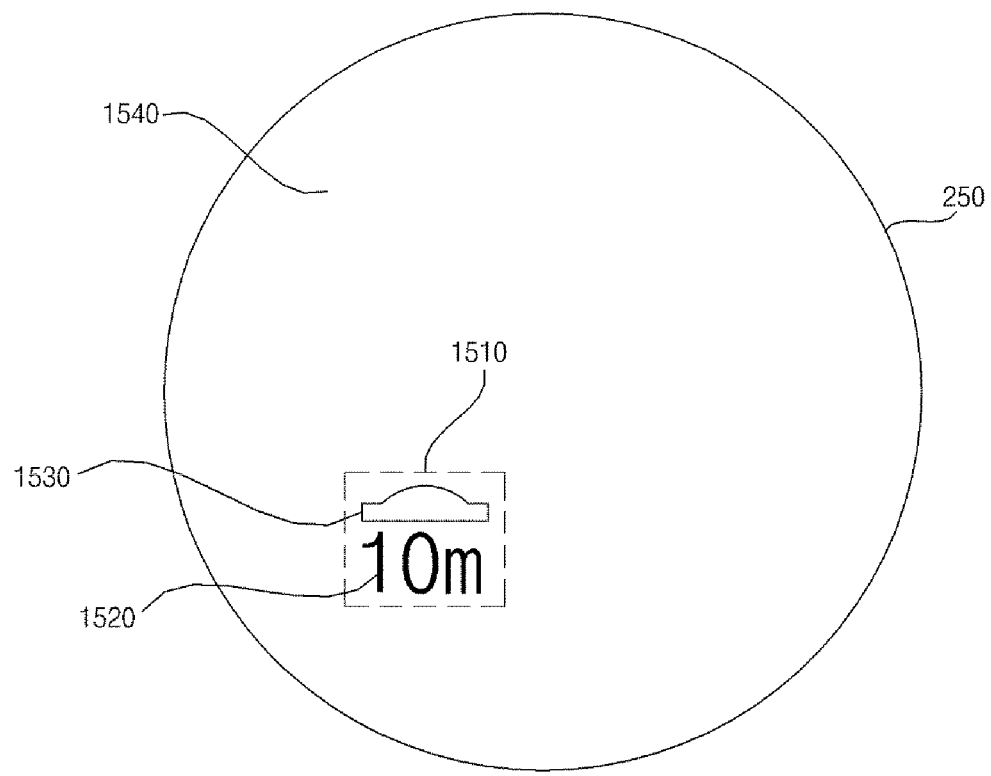
Figure 15:
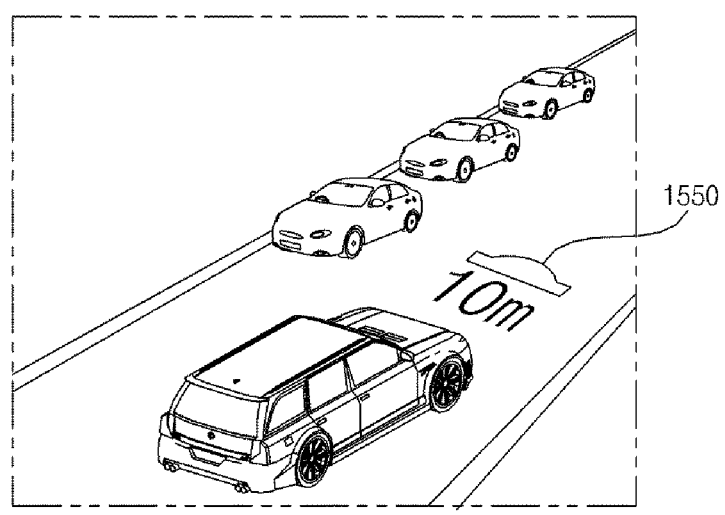

FIG. 15 illustrates an example of displaying speed bump detection information.

Referring to FIG. 15, the processor 270 of the lamp 200 may receive detected speed bump information through the interface unit 280. Herein, the speed bump information may be detected based on an image of the front view of the vehicle acquired by the driver assistance system 100.

The driver assistance system 100 may detect a road surface in the acquired image of the front view of the vehicle. The driver assistance system 100 may detect a speed bump based on the color and shape of the detected road surface. The detected speed bump information may be delivered to the lamp 200.

The processor 270 of the lamp for vehicles is configured to control the transparent display 250 to display the speed bump information on a projection surface. The processor 270 of the lamp may perform a control operation such that a design 1530 or text 1520 corresponding to the speed bump information is formed in one area 1510 of the transparent display using a difference in color, brightness or light intensity. In this case, the processor 270 of the lamp may form a bump image 1530 corresponding to the speed bump in the one area 1510 of the transparent display. Alternatively, the processor 270 of the lamp may create a number 1520 indicating the distance from the vehicle 700 to the speed bump.

There is a difference in color, brightness or light intensity between light emitted outward through the area of the transparent display 250 in which the design 1530 or text 1520 is formed and light emitted outward through the area 1540 in which neither design nor text is formed.

As light is emitted outward from the lamp with different colors, brightness or light intensities, detected speed bump information 1550 may be displayed on the projection surface. In this case, the speed bump information 1550 may be formed in the light that is emitted from the lamp 200 to secure a clear view.

Figure 16:
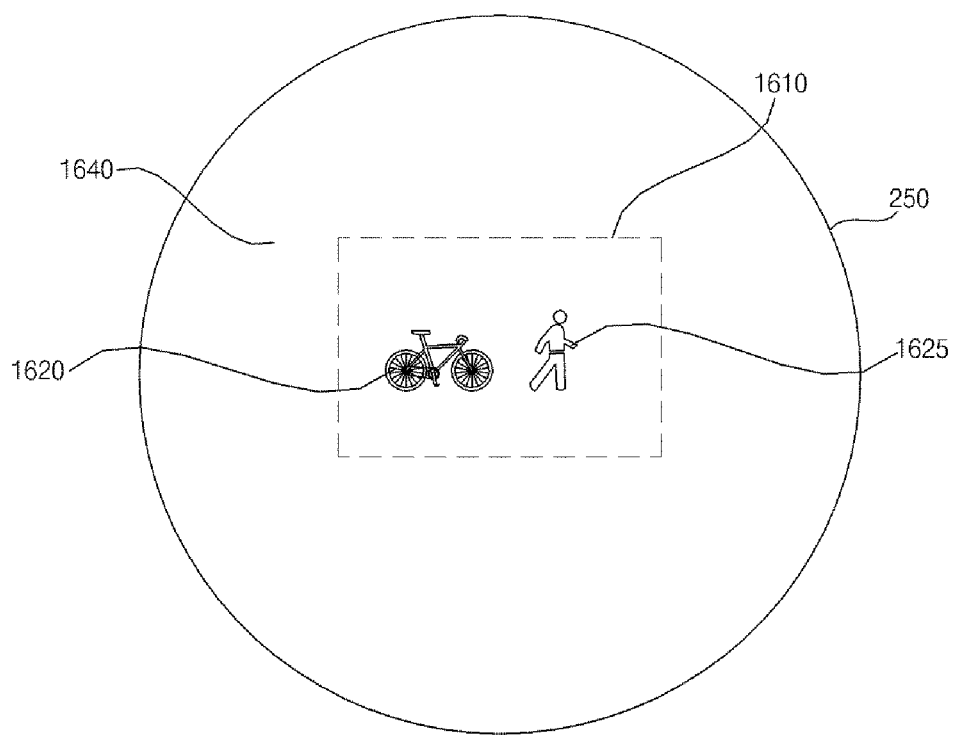
Figure 16:
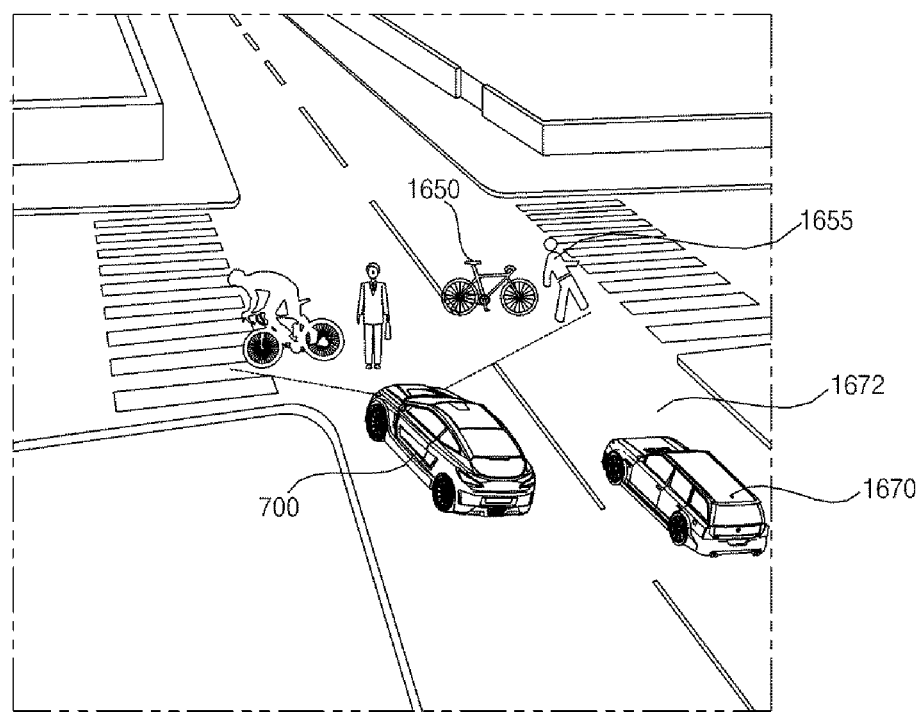
Figure 17:
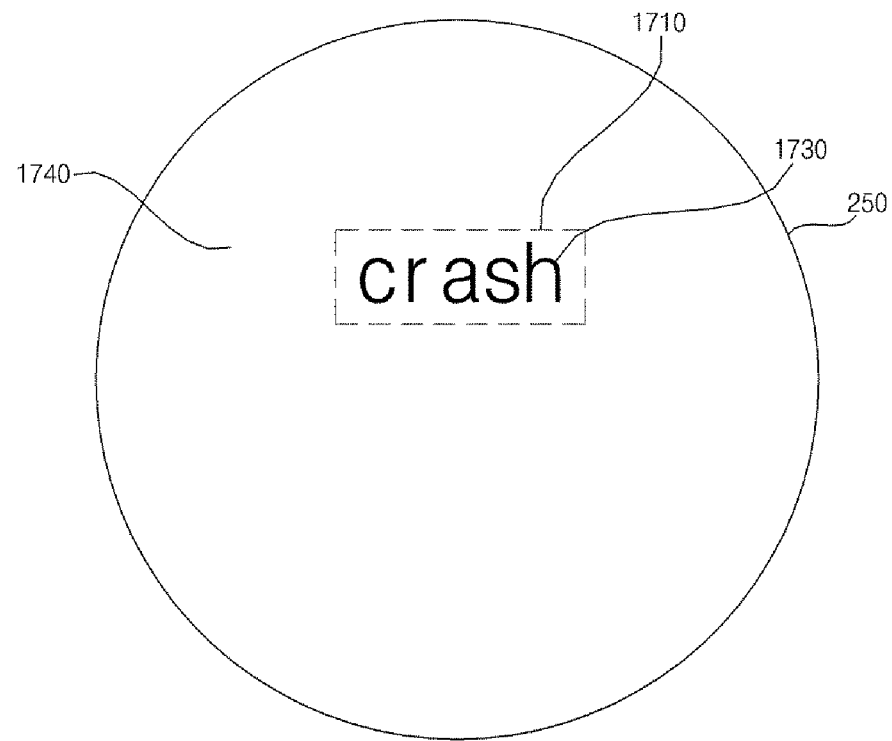
Figure 17:
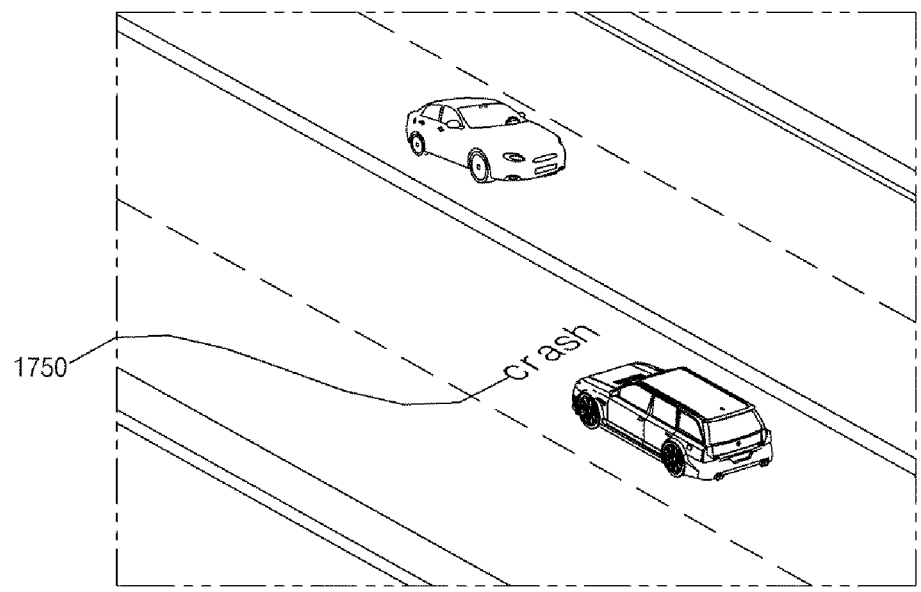
Figure 18:
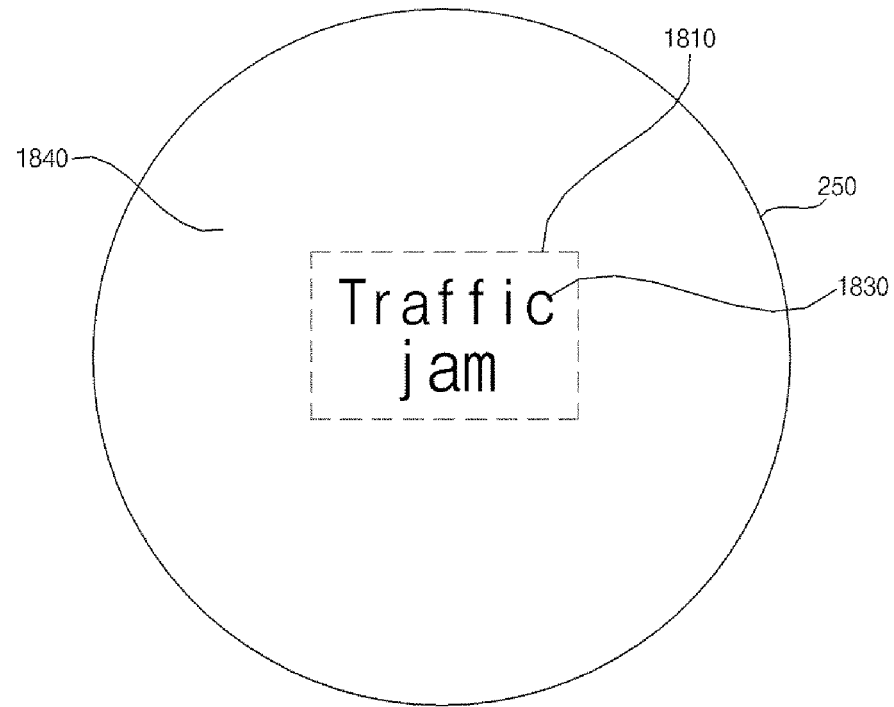
Figure 18:
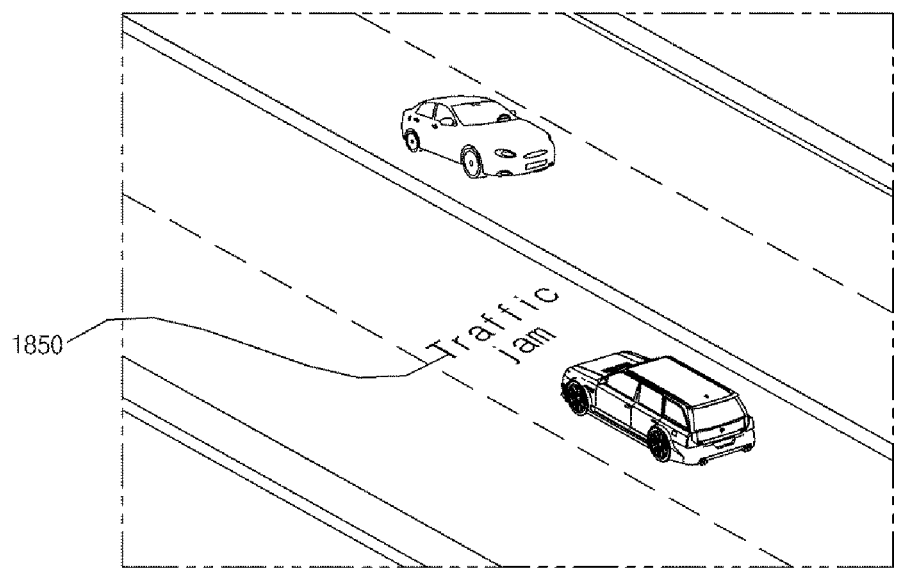

FIGS. 16 to 18 illustrate examples of displaying obstacle detection information.

Referring to FIGS. 16 to 18, the processor 270 of the lamp 200 may receive obstacle information through the interface unit 280. Herein, the obstacle information may include other-vehicle detection information, two-wheeled vehicle detection information, pedestrian detection information, traffic accident information, construction information or road congestion information.

The obstacle information may be detected through the driver assistance system 100. The driver assistance system 100 may detect another vehicle, a two-wheeled vehicle, or a pedestrian based on an acquired image of the front view of the vehicle. The driver assistance system 100 may detect another vehicle, a two-wheeled vehicle, or a pedestrian by comparing the shape of a detected object with shapes stored in the memory 140. Information about the detected vehicle, two-wheeled vehicle, or pedestrian may be delivered to the lamp 200.

The obstacle information may be received through the communication unit 710 of the vehicle 700. The vehicle 700 may receive traffic accident information, construction information and road congestion information from external devices 600, 510 and 520 through the communication unit 710.

Referring to FIG. 16, the processor 270 of the lamp 200 may receive two-wheeled vehicle detection information or pedestrian information through the interface unit 280.

The processor 270 of the lamp for vehicles is configured to control the transparent display 250 to display the two-wheeled vehicle detection information or pedestrian detection information on the projection surface. The processor 270 of the lamp may perform a control operation such that designs 1620 and 1625 or a text corresponding to the detected two-wheeled vehicle information or pedestrian information is formed in one area 1610 of the transparent display using a difference in color, brightness or light intensity.

There is a difference in color, brightness or light intensity between light emitted outward through the area of the transparent display 250 in which the designs 1620 and 1625 or text is formed and light emitted outward through the area 1640 in which neither design nor text is formed.

As light is emitted outward from the lamp 200 with different colors, brightness or light intensities, the detected two-wheeled vehicle information 1650 or pedestrian information 1655 may be displayed on the projection surface. In this case, the detected two-wheeled vehicle information 1650 or pedestrian information 1655 may be formed in the light that is emitted from the lamp 200 to secure a clear view.

Meanwhile, the processor 270 of the lamp 200 may receive side traveling vehicle detection information through the interface unit 280. A side traveling vehicle 1670 may be detected by the driver assistance system 100. For example, the side traveling vehicle 1670 may be detected through around view cameras 195d, 195e, 195f and 195g.

When obstacle detection information is received with the side traveling vehicle detection information received, the processor 270 of the lamp may display obstacle detection information 1650 and 1655 on the drive lane 1672 of a vehicle traveling on one side of the vehicle 700. When an obstacle is hidden by the vehicle 700, the driver of the side traveling vehicle 1670 cannot recognize the obstacle. In this case, the lamp 200 may display obstacle information on the drive lane of the vehicle traveling on one side of the vehicle 700, thereby preventing an accident.

Referring to FIG. 17, the processor 270 of the lamp 200 may receive traffic accident information through the interface unit 280.

The processor 270 of the lamp is configured to control the transparent display 250 to display the traffic accident information on a projection surface. The processor 270 of the lamp may perform a control operation such that a design or text 1730 corresponding to the traffic accident information is formed in one area 1710 of the transparent display using a difference in color, brightness or light intensity. There is a difference in color, brightness or light intensity between light emitted outward through the area of the transparent display 250 in which the design or text 1730 is formed and light emitted outward through the area 1740 in which neither design nor text is formed.

As light is emitted outward from the lamp 200 with different colors, brightness or light intensities, the traffic accident information 1750 may be displayed on the projection surface. In this case, traffic accident information 1750 may be formed in the light that is emitted from the lamp 200 to secure a clear view.

Referring to FIG. 18, the processor 270 of the lamp 200 may receive road congestion information through the interface unit 280.

The processor 270 of the lamp is configured to control the transparent display 250 to display the road congestion information on the projection surface. The processor 270 of the lamp may perform a control operation such that a design or text 1830 corresponding to the road congestion information is formed in one area 1810 of the transparent display using a difference in color, brightness or light intensity. There is a difference in color, brightness or light intensity between light emitted outward through the area of the transparent display 250 in which the design or text 1830 is formed and light emitted outward through the area 1840 of the transparent display 250 in which neither design nor text is formed.

As light is emitted outward from the lamp 200 by making the difference in color, brightness or light intensity, the road congestion information 1850 may be displayed on the projection surface. In this case, the road congestion information 1850 may be formed in the light that is emitted from the lamp 200 to secure a clear view.

Figure 19:
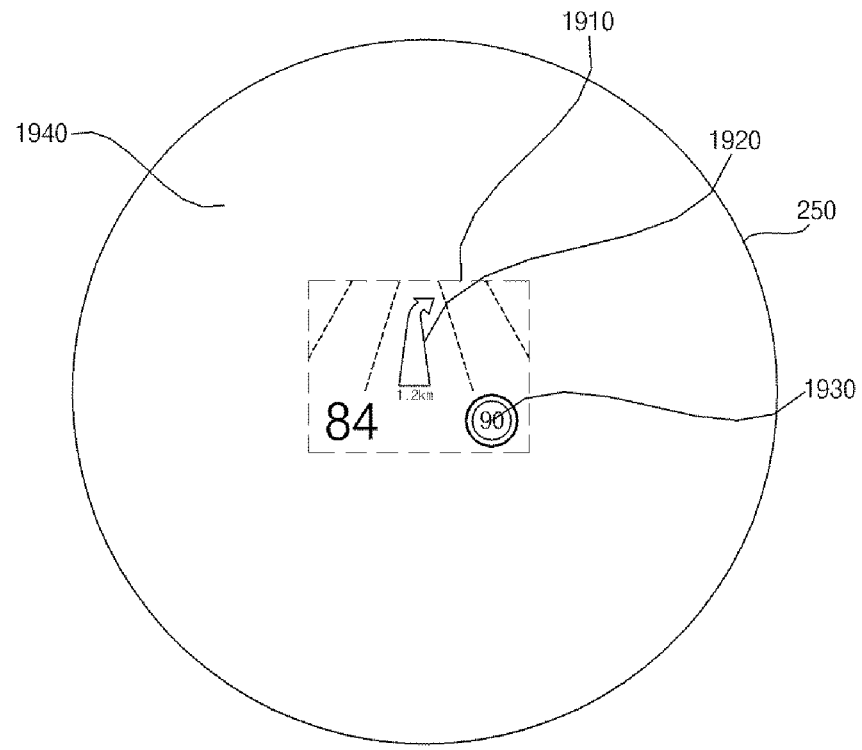
Figure 19:
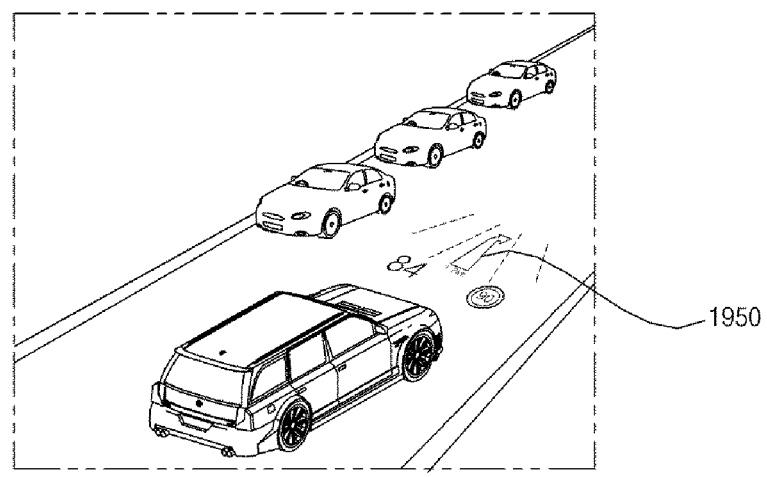
Figure 20:
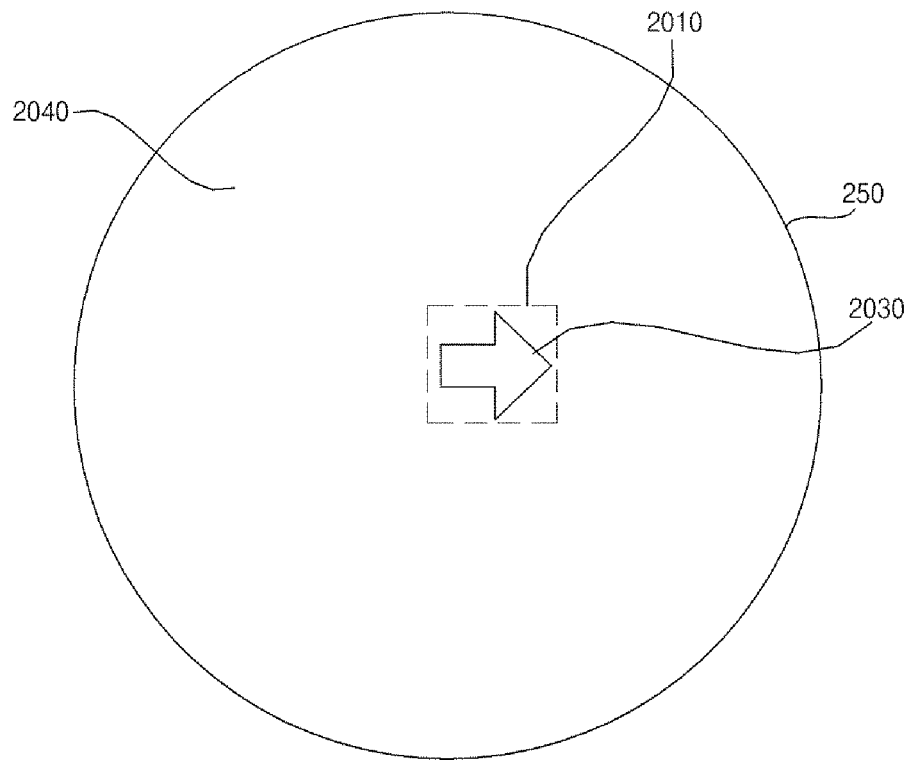
Figure 20:
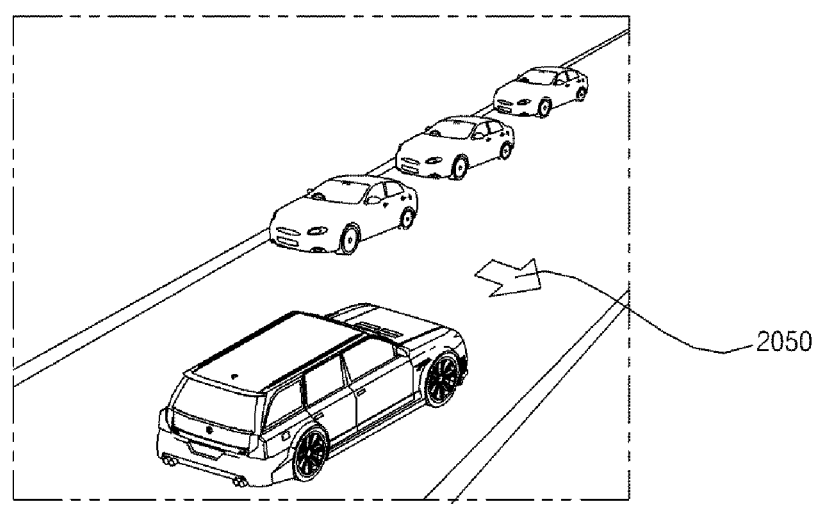

FIGS. 19 and 20 illustrate examples of displaying navigation information.

Referring to FIG. 19, the processor 270 of the lamp 200 may receive navigation information through the interface unit 280. The navigation information may be provided by the AVN apparatus 400 or a separate navigation apparatus (not shown).

The navigation information may include driving route information, predetermined destination information, remaining distance information, driving area information, driving road information, and speed camera information.

The processor 270 of the lamp is configured to control the transparent display 250 to display the navigation information on a projection surface. The processor 270 of the lamp may perform a control operation such that a design 1920 or text 1930 corresponding to the navigation information is displayed in one area 1910 of the transparent display 250 using a difference in color, brightness or light intensity.

There is a difference in color, brightness or light intensity between light emitted outward through the area 1910 of the transparent display 250 in which the design 1920 or text 1930 is formed and light emitted outward through the area 1940 in which neither design nor text is formed.

As light is emitted outward from the lamp 200 with different colors, brightness or light intensities, the navigation information 1950 may be displayed on the projection surface. In this case, the navigation information 1950 may be formed in the light that is emitted from the lamp 200 to secure a clear view.

Referring to FIG. 20, the processor 270 of the lamp is configured to control the transparent display 250 to display driving route information on the projection surface in a turn-by-turn (TBT) manner. The processor 270 of the lamp may perform a control operation display such that a straight arrow, a left turn arrow, a right turn arrow or a U-turn arrow corresponding to a driving route is formed in one area 2010 of the transparent display 250. In FIG. 20, a right turn arrow 2030 is exemplarily formed on the one area 2010 of the transparent display 250.

There is a difference in color, brightness or light intensity between light emitted outward through the area of the transparent display 250 in which the predetermined arrow 2030 is formed and light emitted outward through the area 2040 in which the arrow is not formed.

As light is emitted outward from the lamp 200 by making the difference in color, brightness or light intensity, an arrow 2050 corresponding to the driving route may be displayed on the projection surface. In this case, the arrow 2050 may be formed in the light that is emitted from the lamp 200 to secure a clear view.

Meanwhile, the processor 270 of the lamp 200 may receive side traveling vehicle detection information through the interface unit 280.

If navigation information is received after the side traveling vehicle detection information, the processor 270 of the lamp may display the navigation information on the drive lane of a side traveling vehicle. Herein, the navigation information may be a straight arrow, a left turn arrow, a right turn arrow or a U-turn arrow corresponding to the driving route.

Figure 21:
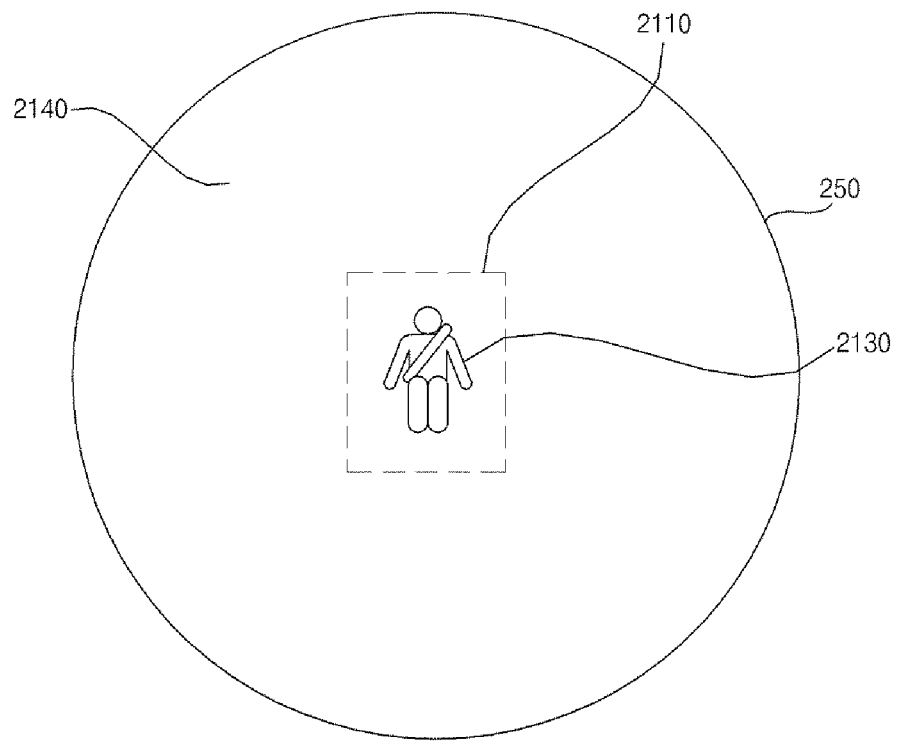
Figure 21:
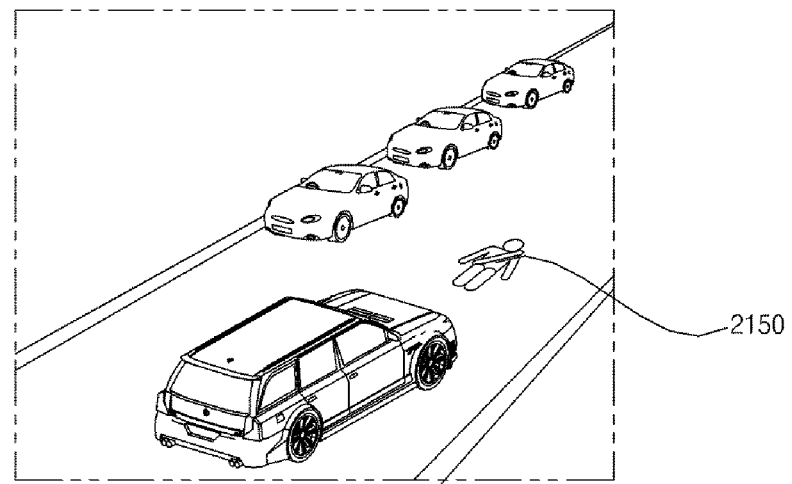

FIG. 21 illustrates an example of displaying vehicle condition information.

Referring to FIG. 21, the processor 270 of the lamp 200 may receive vehicle condition information through the interface unit 280. Herein, vehicle condition information may be OBD information. The vehicle condition information may include parking brake state information, high beam on/off information, washer liquid level information, engine oil level information, power source temperature information, remaining energy information, tire pressure information, brake oil condition information or door opening information.

The processor 270 of the lamp 200 may receive the OBD information from the controller 770 or the sensing unit 760 of the vehicle.

The processor 270 of the lamp is configured to control the transparent display 250 to display the OBD information on a projection surface. The processor 270 of the lamp may perform a control operation such that a design or text corresponding to the OBD information is formed in one area 2110 of the transparent display 250 using a difference in color, brightness or light intensity. Herein, the processor 270 of the lamp may perform a control operation such that a predetermined icon 2130 corresponding to the OBD information is formed on the transparent display 250.

There is a difference in color, brightness or light intensity between light emitted outward through the area of the transparent display 250 in which a design or text is formed and light emitted outward through the area 2140 of the transparent display 250 in which neither design nor text is formed.

As light is emitted outward from the lamp with different colors, brightness or light intensities, OBD information 2150 may be displayed on a projection surface. In this case, the OBD information 2150 may be formed in the light that is emitted from the lamp 200 to secure a clear view.

Figure 22:
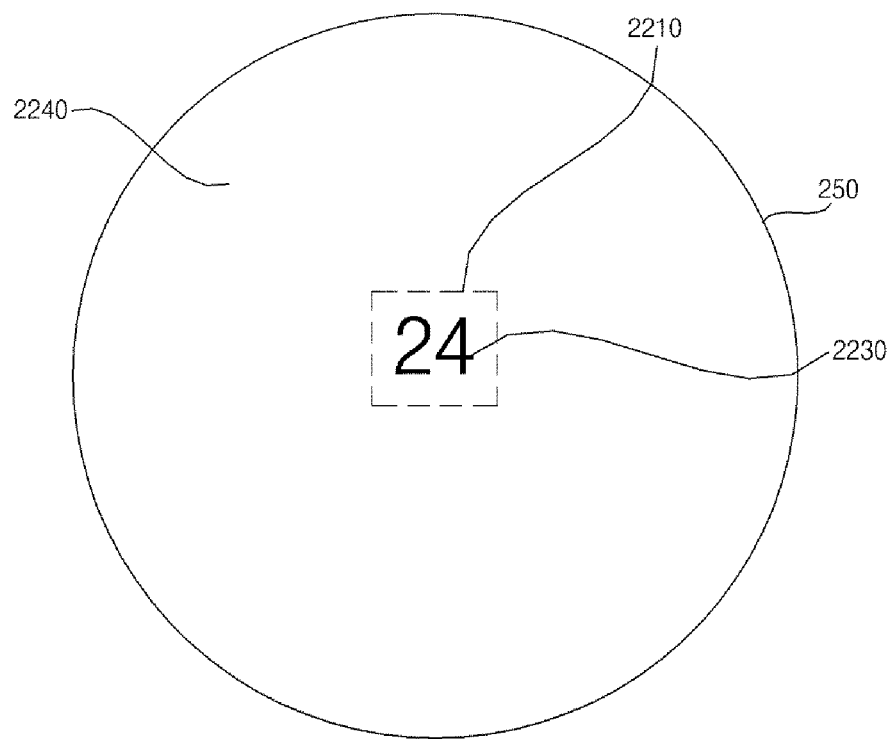
Figure 22:
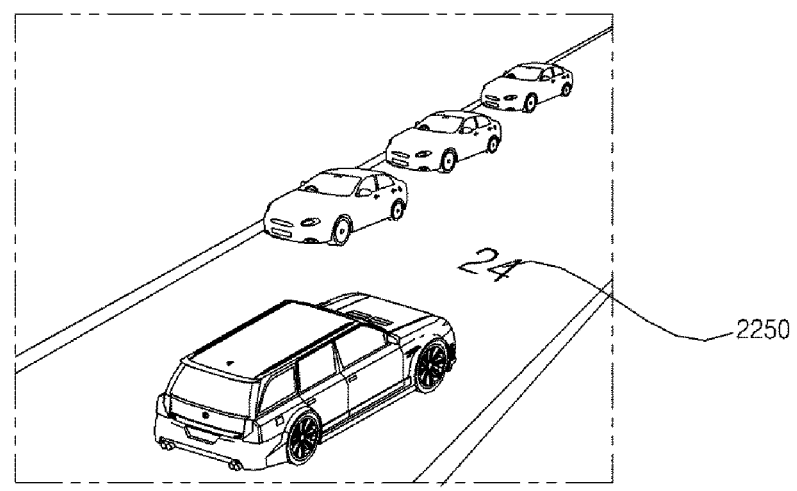
Figure 23:
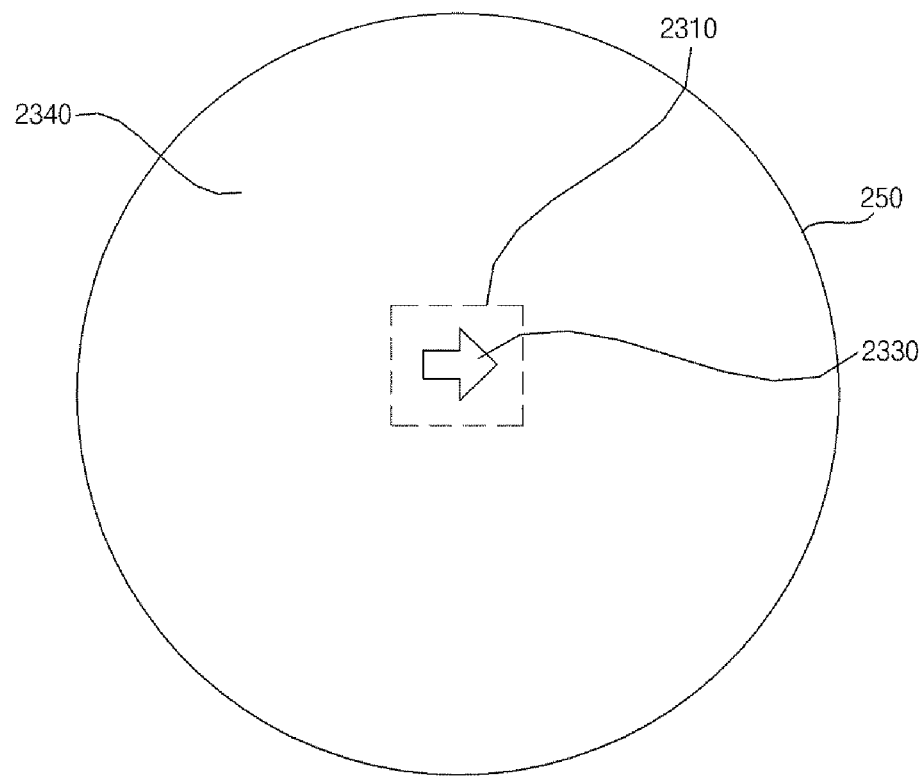
Figure 23:
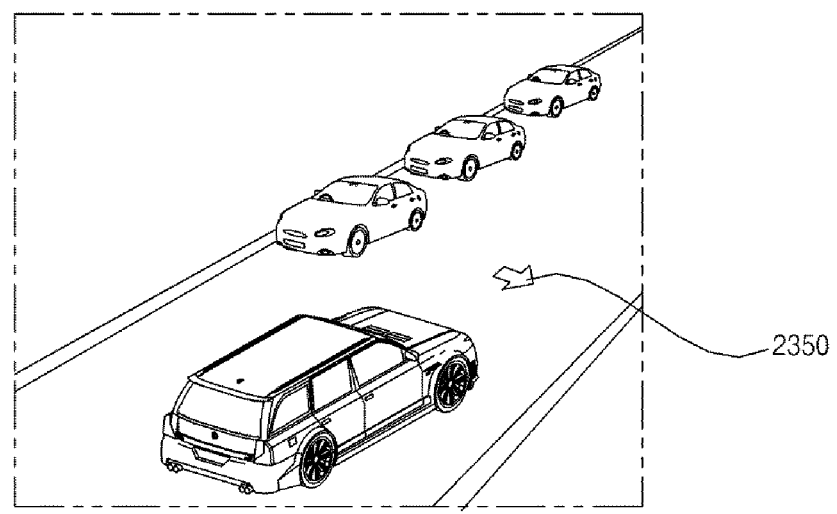

FIGS. 22 and 23 illustrate examples of displaying vehicle driving information.

Referring to FIGS. 22 and 23, the processor 270 of the lamp 200 may receive vehicle driving information through the interface unit 280. Herein, the vehicle driving information may include driving speed information, gear shift information or turn signal information delivered to the turn signal lamp.

The processor 270 of the lamp may receive the vehicle driving information from the controller 770 or the sensing unit 760 of the vehicle.

Referring to FIG. 22, the processor 270 of the lamp may receive driving speed information through the interface unit 280.

The processor 270 of the lamp is configured to control the transparent display 250 to display the driving speed information about the vehicle on a projection surface. The processor 270 of the lamp may perform a control operation such that a design or text 2230 corresponding to the driving speed information is formed in one area 2210 of the transparent display 250 using a difference in color, brightness or light intensity.

There is a difference in color, brightness or light intensity between light emitted outward through the area of the transparent display 250 in which the design or text 2230 is formed and light emitted outward through the area 2240 of the transparent display 250 in which neither design nor text is formed.

As light is emitted outward from the lamp 200 with different colors, brightness or light intensities, the driving speed information 2250 may be displayed on the projection surface. The driving speed information 2250 may be formed in the light that is emitted from the lamp 200 to secure a clear view.

Referring to FIG. 23, the processor 270 of the lamp may receive turn signal information through the interface unit 280.

The processor 270 of the lamp is configured to control the transparent display 250 to display the turn signal information on the projection surface. The processor 270 of the lamp may perform a control operation such that a design 2330 or text corresponding to a turn signal is formed in one area 2310 of the transparent display 250 using a difference in color, brightness or light intensity.

There is a difference in color, brightness or light intensity between light emitted outward through the area of the transparent display 250 in which the design 2330 or text is formed and light emitted outward through the area 2340 in which neither design nor text is formed.

As light is emitted outward from the lamp 200 with different colors, brightness or light intensities, turn signal information 2350 may be displayed on the projection surface. The turn signal information 2350 may be formed in the light that is emitted from the lamp 200 to secure a clear view.

Figure 24:
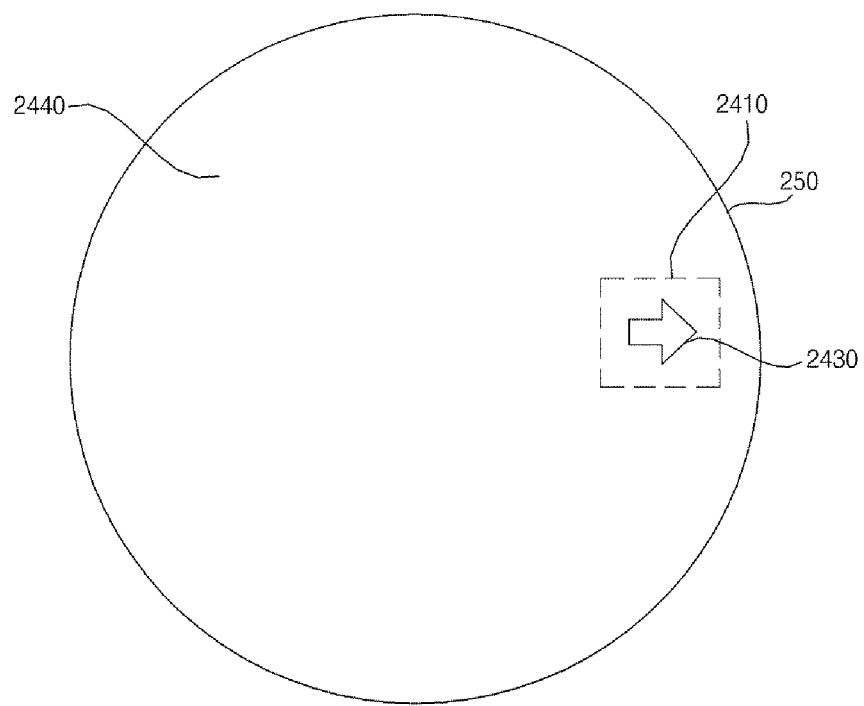
Figure 24:
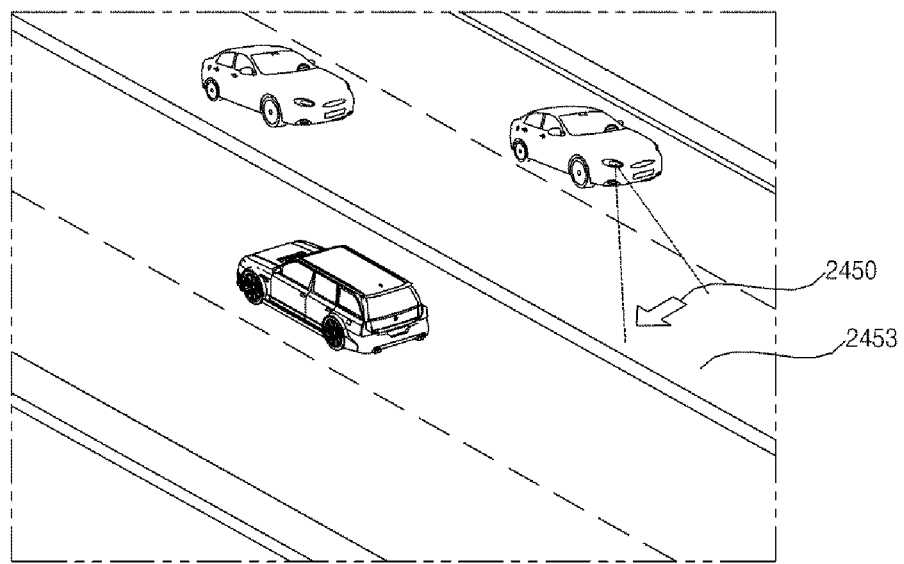

FIG. 24 illustrates an example of displaying information on a lane other than the lane on which the vehicle is traveling.

The processor 270 of the lamp may receive side traveling vehicle detection information through the interface unit 280.

If the turn signal information is received after the side traveling vehicle detection information is received, the processor 270 of the lamp may display the turn signal information 2450 on the drive lane 2453 of a side traveling vehicle. As the turn signal information is displayed on the drive lane 2453 of the side traveling vehicle, a signal having good visibility may be provided to the driver of the side traveling vehicle, thereby preventing an accident which may occur when the vehicle changes lanes.

Figure 25:
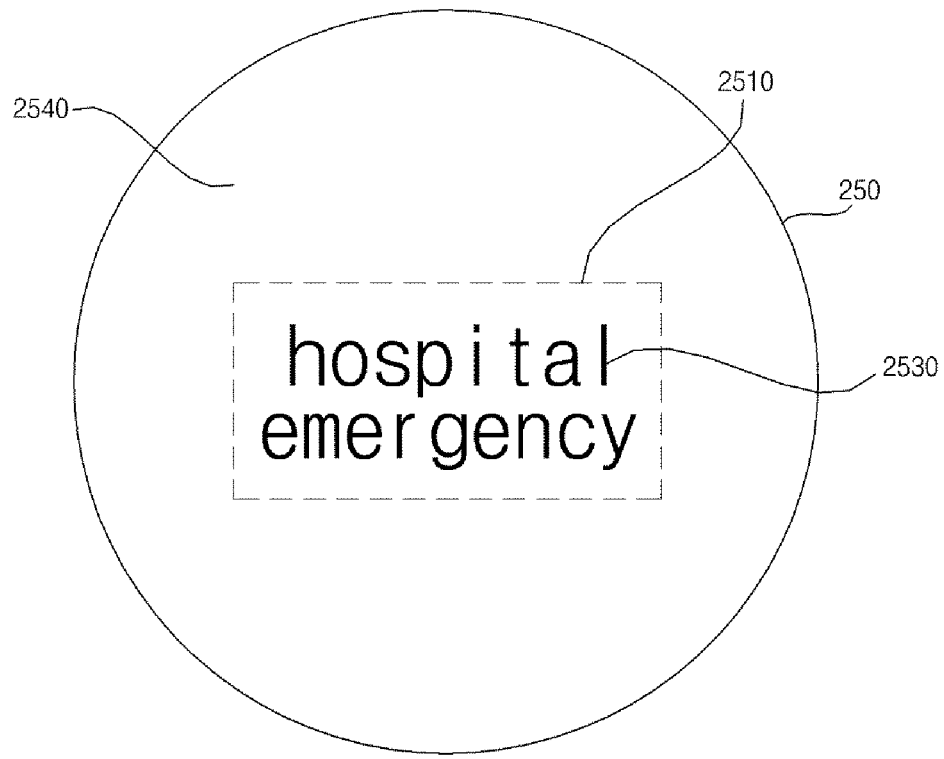
Figure 25:
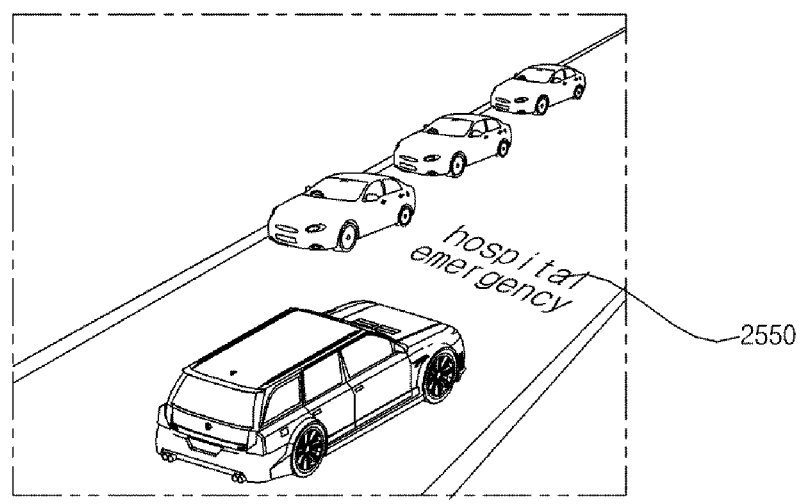

FIG. 25 illustrates an example of displaying in-vehicle situation information.

Referring to FIG. 25, the processor 270 of the lamp 200 may receive in-vehicle situation information through the interface unit 280. Herein, in-vehicle situation information may be patient evacuation situation information, emergency aid request information, infant-on-board information or inexperienced driver information. The in-vehicle situation information may be generated through the input unit 720 of the vehicle 700 according to user input.

The processor 270 of the lamp is configured to control the transparent display 250 to display the in-vehicle situation information on the projection surface. The processor 270 of the lamp may perform a control operation such that a design or text 2530 corresponding to the in-vehicle situation information is formed in one area 2510 of the transparent display 250 using a difference in color, brightness or light intensity.

In this example, a text 2530 corresponding to patient evacuation situation information is exemplarily formed.

There is a difference in color, brightness or light intensity between light emitted outward through the area of the transparent display 250 in which the design or text 2530 is formed and light emitted outward through the area 2540 of the transparent display 250 in which neither design nor text is formed.

As light is emitted outward from the lamp with different colors, brightness or light intensities, in-vehicle situation information 2550 may be displayed on the projection surface. In this case, the in-vehicle situation information 2550 may be formed in the light that is emitted from the lamp 200 to secure a clear view.

Figure 26A:
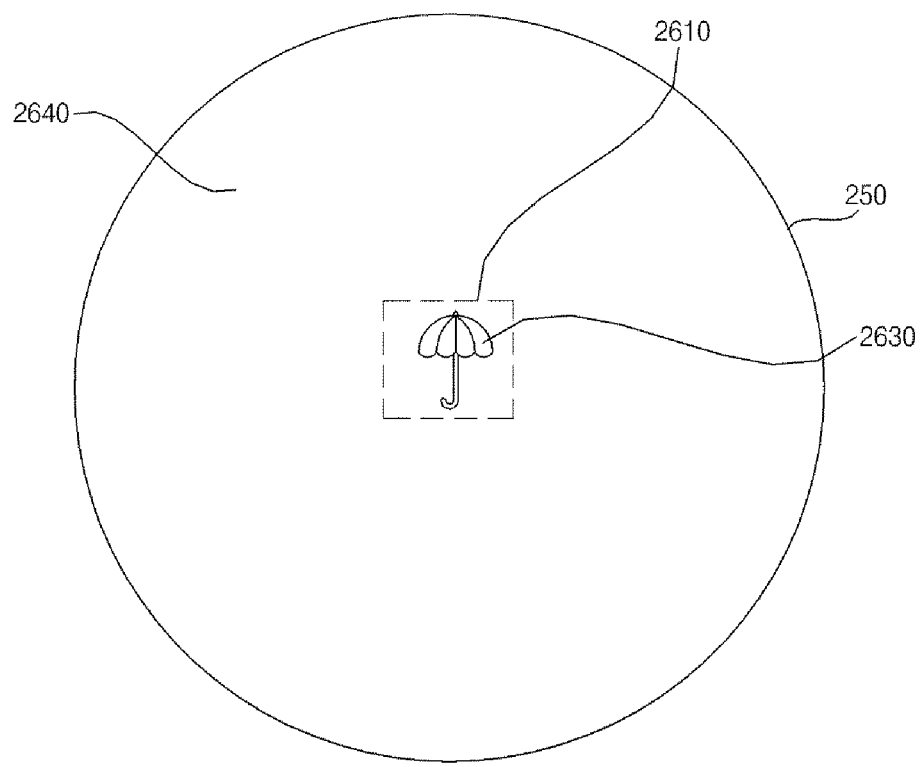
Figure 26A:
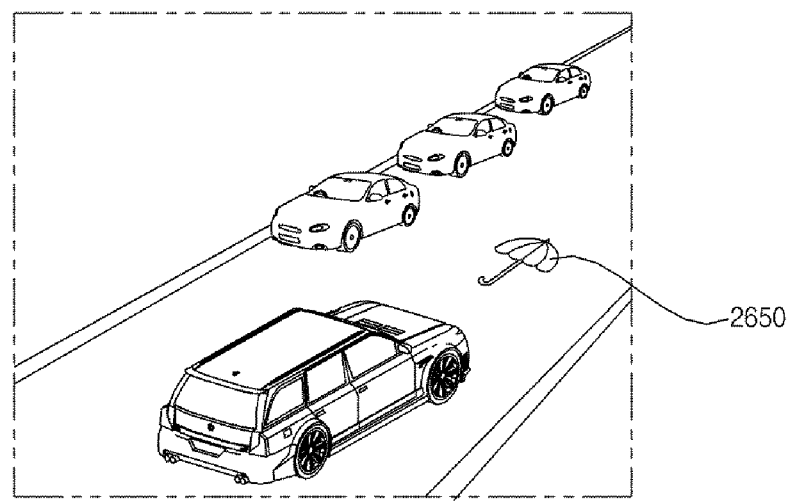
Figure 26B:
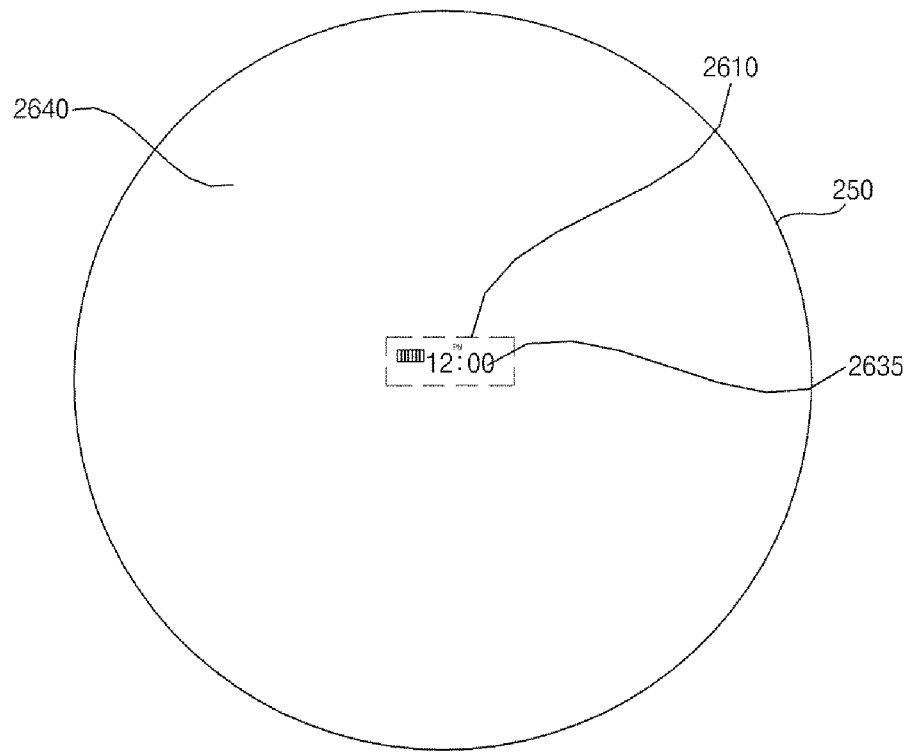
Figure 26B:
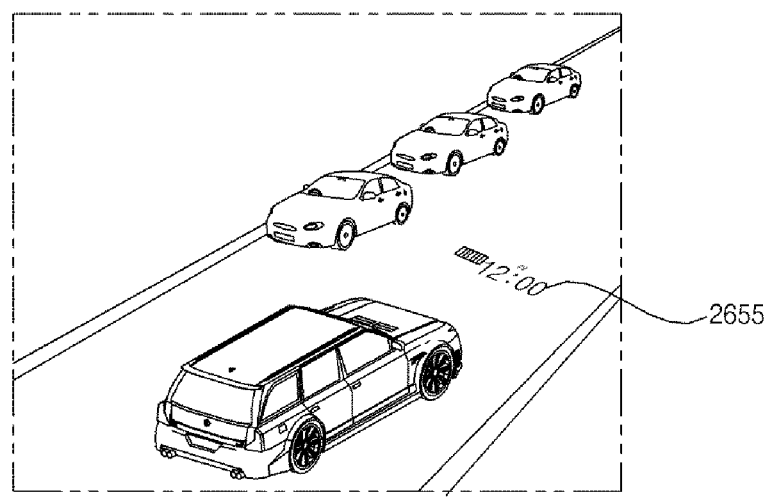

FIGS. 26A and 26B illustrate examples of displaying driving environment information.

Referring to FIGS. 26A and 26B, the processor 270 of the lamp 200 may receive driving environment information through the interface unit 280. Herein, the driving environment information may include weather information or time information for driving.

Referring to FIG. 26A, the processor 270 of the lamp is configured to control the transparent display 250 to display weather information on a projection surface. Herein, the weather information may be received from external devices 600, 510 and 520 through the communication unit 710 of the vehicle 700.

The processor 270 of the lamp may perform a control operation such that a design 2630 or text corresponding to the weather information is formed in one area 2610 of the transparent display 250 using a difference in color, brightness or light intensity. In this case, the processor 270 of the lamp may perform a control operation such that a predetermined icon 2630 corresponding to the weather information is formed.

There is a difference in color, brightness or light intensity between light emitted outward through the area of the transparent display 250 in which the design 2630 or text is formed and light emitted outward through the area 2640 in which neither design nor text is formed.

As light is emitted outward from the lamp by making the difference in color, brightness or light intensity, weather information 2650 may be displayed on the projection surface. In this case, the weather information 2650 may be formed in the light that is emitted from the lamp 200 to secure a clear view.

Referring to FIG. 26B, the processor 270 of the lamp is configured to control the transparent display 250 to display time information on the projection surface. Herein, the time information may be stored in the memory 730 of the vehicle 700. Alternatively, the time information may be received from the external devices 600, 510 and 520 through the communication unit 710 of the vehicle 700.

The processor 270 of the lamp may perform a control operation such that a design or text 2635 corresponding to the time information is formed in one area 2610 of the transparent display 250 using a difference in color, brightness or light intensity.

The processor 270 of the lamp may perform a control operation such that the time information is formed in real time. Alternatively, the processor 270 of the lamp may perform a control operation such that the time information is formed every hour for a predetermined time.

There is a difference in color, brightness or light intensity between light emitted outward through the area of the transparent display 250 in which the design or text 2635 is formed and light emitted outward through the area 2640 of the transparent display 250 in which neither design nor text is formed.

As light is emitted outward from the lamp by making the difference in color, brightness or light intensity, time information 2655 may be displayed on the projection surface. In this case, the time information 2655 may be formed in the light that is emitted from the lamp 200 to secure a clear view.

Figure 27:
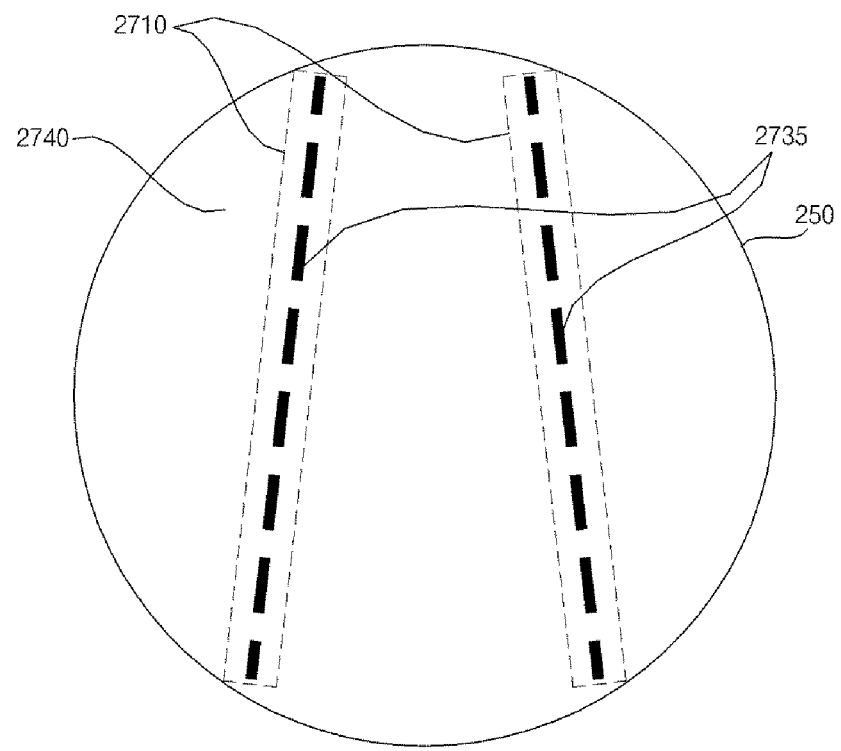
Figure 27:
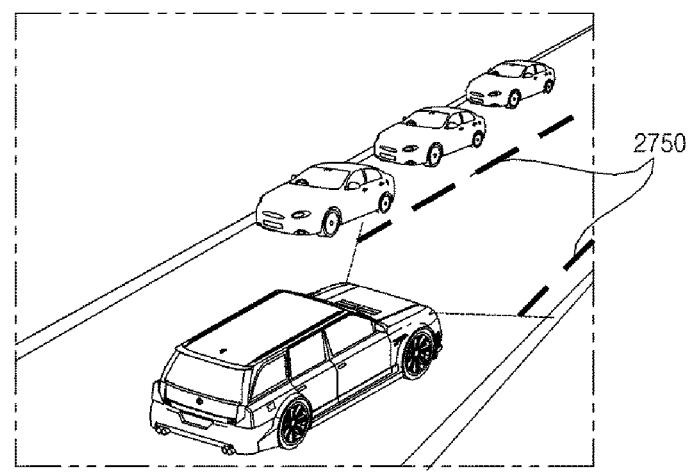

FIG. 27 illustrates an example of displaying a lane.

Referring to FIG. 27, the processor 270 of the lamp 200 may receive lane information. Herein, the lane information may be detected based on a road surface detected in an image of the front view of the vehicle captured through the driver assistance system 100.

The driver assistance system 100 may detect a road surface in the acquired front view of the vehicle. The driver assistance system 100 may detect a lane on the detected road surface. The detected lane information may be delivered to the lamp 200.

The processor 270 of the lamp is configured to control the transparent display 250 to display a virtual lane on the road surface based on the received lane information.

Meanwhile, the driver assistance system 100 may detect a foregoing vehicle. In particular, the driver assistance system 100 may detect the taillight or stop lamp of the foregoing vehicle at night.

The processor 270 of the lamp is configured to control the transparent display 250 to display a virtual lane on the road surface based on the received foregoing vehicle information.

The processor 270 of the lamp may perform a control operation such that a pattern 2735 corresponding to the virtual lane is formed in one area 2710 of the transparent display 250 using a difference in color, brightness or light intensity.

There is a difference in color, brightness or light intensity between light emitted outward through the area of the transparent display 250 in which the pattern 2735 is formed and light emitted outward through the area 2740 of the transparent display 250 in which the pattern 2735 is not formed.

As light is emitted outward from the lamp by with different colors, brightness or light intensities, a virtual lane 2750 may be displayed on the projection surface. In this case, the virtual lane 2750 may be formed in the light that is emitted from the lamp 200 to secure a clear view.

When the driver is driving the vehicle at night or in bad weather, the drive lane may be temporarily unidentified. In this case, safe driving may be ensured by displaying a virtual lane on the road surface based on the pre-received lane information or foregoing vehicle information.

FIGS. 28 to 32 illustrate examples of displaying information with a light source of a rear combination lamp.

Figure 28:
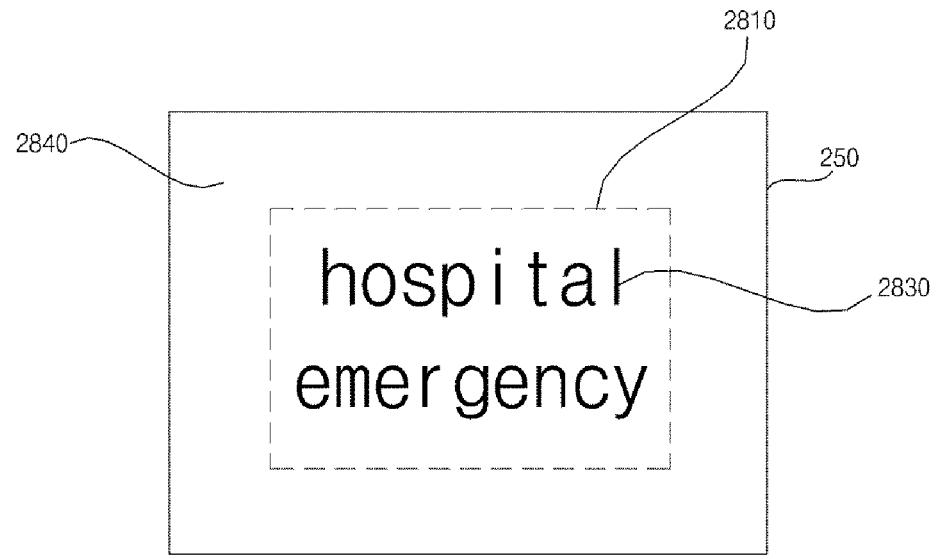
FIGS. 28 to 32 are diagrams illustrating example displaying information with a light source of a rear combination lamp.
Figure 28:
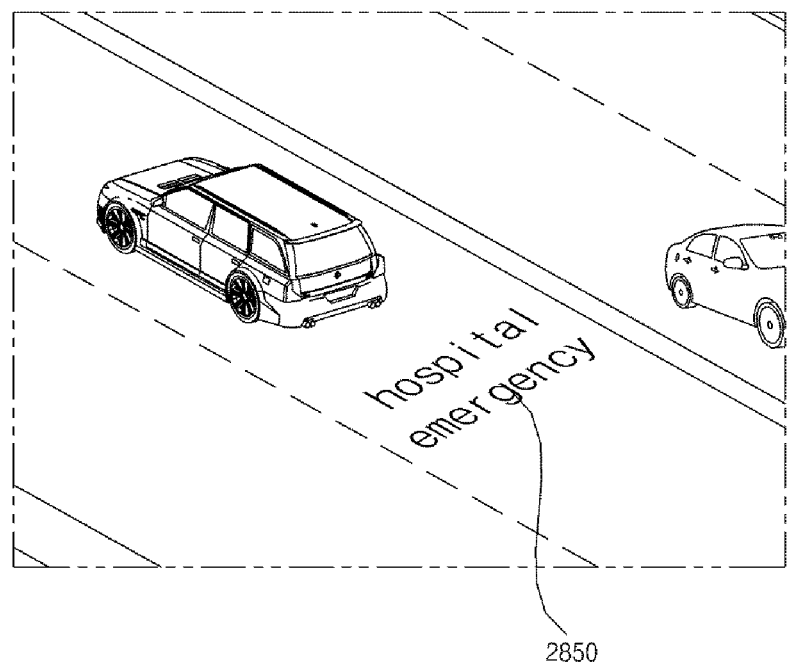

FIG. 28 illustrates an example of displaying in-vehicle situation information.

Referring to FIG. 28, the processor 270 of the lamp 200 may receive in-vehicle situation information through the interface unit 280. Herein, the in-vehicle situation information may be patient evacuation situation information, emergency aid request information, infant-on-board information or inexperienced driver information. The in-vehicle situation information may be generated through the input unit 720 of the vehicle 700 according to user input.

The processor 270 of the lamp is configured to control the transparent display 250 to display the in-vehicle situation information on the projection surface. The processor 270 of the lamp may perform a control operation such that a design or text 2830 corresponding to the in-vehicle situation information is formed in one area 2810 of the transparent display 250 using a difference in color, brightness or light intensity. In this example, a text 2830 corresponding to patient evacuation situation information is exemplarily formed.

There is a difference in color, brightness or light intensity between light emitted outward through the area of the transparent display 250 in which the design or text 2830 is formed and light emitted outward through the area 2840 of the transparent display 250 in which neither design nor text is formed.

As light is emitted outward from the lamp with different colors, brightness or light intensities, in-vehicle situation information 2850 may be displayed on the projection surface. In this case, the in-vehicle situation information 2850 may be delivered to a following vehicle.

Figure 29A:
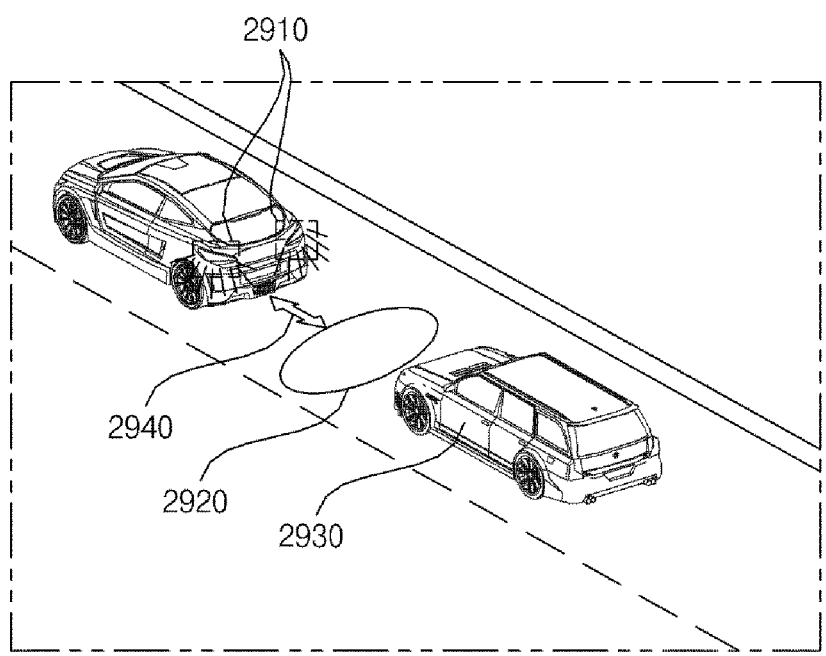
Figure 29B:
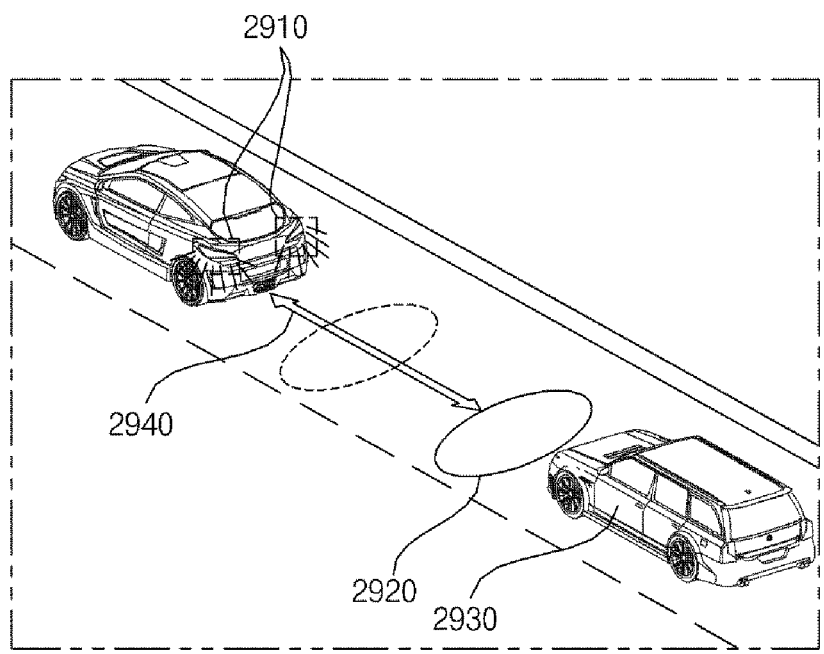

FIGS. 29A and 29B illustrate examples of displaying information based on a relative distance to a following vehicle.

Referring to FIGS. 29A and 29B, the processor 270 of the lamp may receive rearward objects information through the interface unit 280. Herein, a rear object of the vehicle may be a following vehicle. The processor 270 of the lamp may receive information on a relative distance to the following vehicle.

The driver assistance system 100 may acquire an image of the rear view of the vehicle. The driver assistance system 100 may detect a following vehicle in the image of the rear view of the vehicle. The driver assistance system 100 may compute the information on the relative distance to the following vehicle based on the information about change in size of the following vehicle according to disparity information or time. The information on the following vehicle including the relative distance information may be delivered to the lamp 200.

The processor 270 of the lamp may perform a control operation such that a distance 2940 between a projection surface 2920 and a rear combination lamp 2910 is adjusted according to the information on the relative distance to a following vehicle 2930. The processor 270 of the lamp is configured to control the transparent display 250 to adjust the distance 2940. Alternatively, the processor 270 of the lamp is configured to control the position adjustment unit 255 to adjust the position of the transparent display 250 to adjust the distance 2940. Alternatively, the processor 270 of the lamp is configured to control the light source position adjustment unit 268 to adjust the position of the light source 265 to adjust the distance 2940.

Meanwhile, the processor 270 of the lamp may adjust the intensity of light emitted outward from the rear combination lamp according to the information on the distance to the following vehicle 2930. The processor 270 of the lamp is configured to control the drive unit 267 to adjust the intensity of light generated by the light source 265 to adjust the intensity of light emitted outward.

Alternatively, the processor 270 of the lamp is configured to control brightness of the transparent display 250 to adjust the intensity of light emitted outward.

Figure 30:
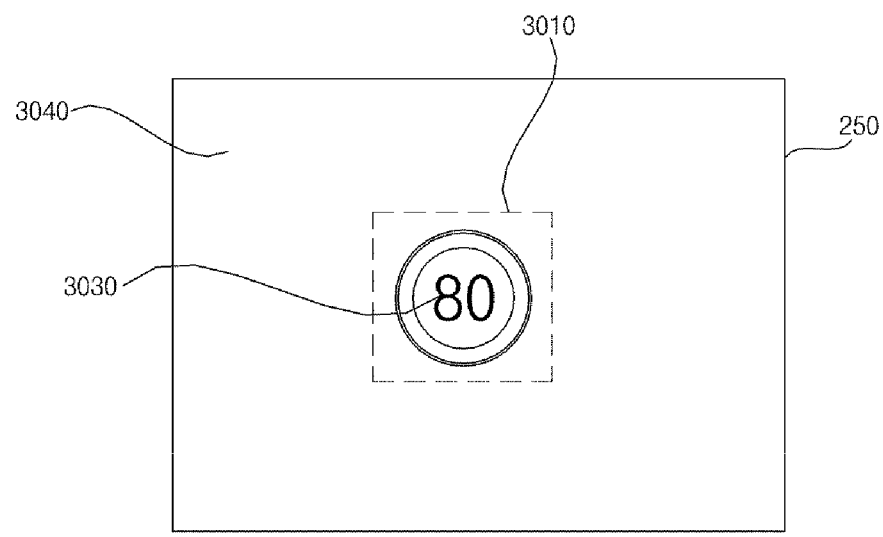
Figure 30:
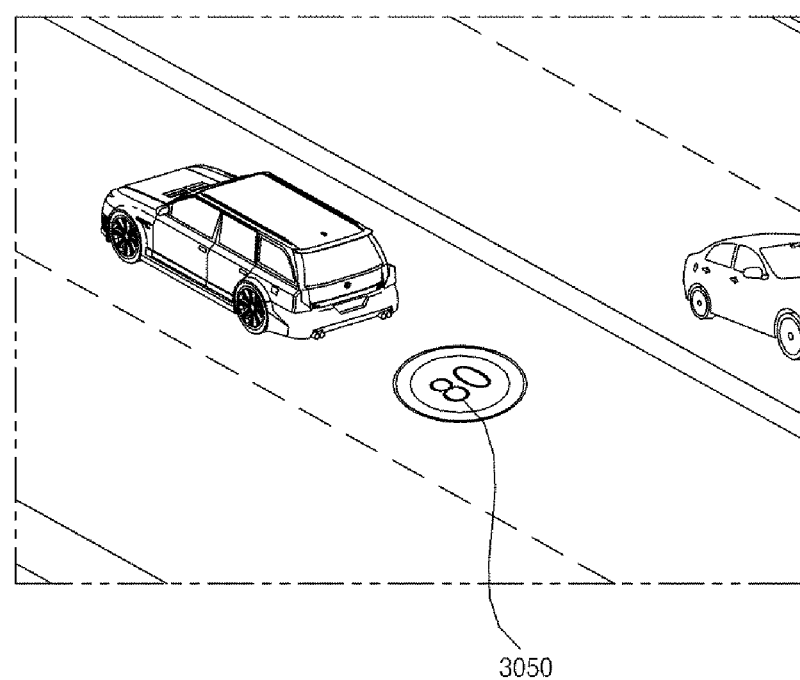

FIG. 30 illustrates an example of displaying TSR information.

Referring to FIG. 30, the processor 270 of the lamp 200 may receive detected TSR information through the interface unit 280. Herein, the TSR information may be detected based on an image of the front view of the vehicle acquired by the driver assistance system 100.

The detected TSR information may include traffic signboard detection information, traffic light detection information, and road surface detection information.

The driver assistance system 100 may detect a traffic signboard in the acquired image of the front view of the vehicle. The driver assistance system 100 may detect a design or a text on the detected traffic signboard. The detected design or text information may be delivered to the lamp 200.

The driver assistance system 100 may detect a traffic light in the acquired image of the front view of the vehicle. The driver assistance system 100 may detect a signal output from the detected traffic light. The detected signal information may be delivered to the lamp 200.

The driver assistance system 100 may detect a road surface in the acquired image of the front view of the vehicle. The driver assistance system 100 may detect a design or a text on the detected road surface. The detected design or text information may be delivered to the lamp 200.

The processor 270 of the lamp is configured to control the transparent display 250 to display the TSR information on the projection surface. The processor 270 of the lamp may perform a control operation such that a design or text 3030 corresponding to the TSR information is formed in one area 3010 of the transparent display using a difference in color, brightness or light intensity. In this example, a text 3030 corresponding to sectional speed limit information is exemplarily formed as the TSR information.

There is a difference in color, brightness or light intensity between light emitted outward through the area of the transparent display 250 in which the design or text 3030 is formed and light emitted outward through the area 3040 of the transparent display 250 in which neither design nor text is formed.

As light is emitted outward from the lamp with different colors, brightness or light intensities, detected TSR information 3050 may be displayed on the projection surface. In this case, the detected TSR information 3050 may be delivered to the following vehicle.

Figure 31:
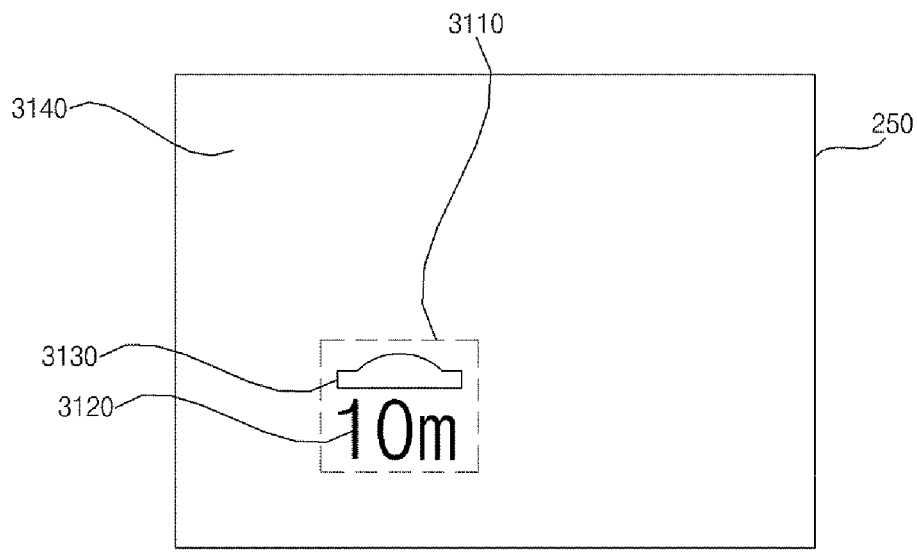
Figure 31:
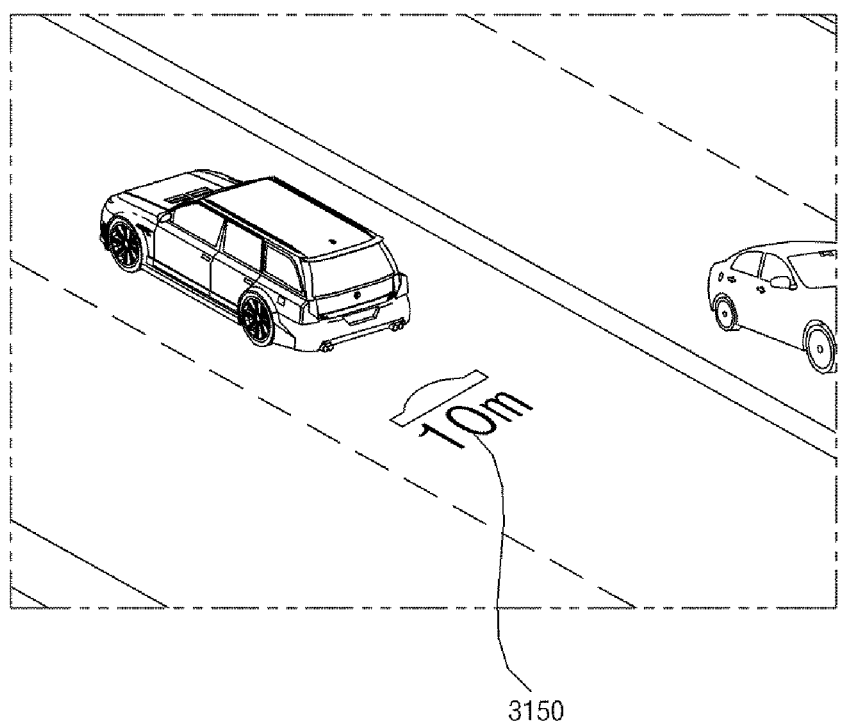

FIG. 31 illustrates an example of displaying speed bump detection information.

Referring to FIG. 31, the processor 270 of the lamp 200 may receive detected speed bump information through the interface unit 280. Herein, the speed bump information may be detected based on an image of the front view of the vehicle acquired by the driver assistance system 100.

The driver assistance system 100 may detect a road surface in the acquired image of the front view of the vehicle. The driver assistance system 100 may detect a speed bump based on the color or shape on the detected road surface. The detected speed bump information may be delivered to the lamp 200.

The processor 270 of the lamp is configured to control the transparent display 250 to display the speed bump information on the projection surface. The processor 270 of the lamp may perform a control operation such that a design 3130 or text 3120 corresponding to the speed bump information is formed in one area 3110 of the transparent display using a difference in color, brightness or light intensity. In this case, the processor 270 of the lamp may form a bump image 3130 corresponding to the speed bump in the area 3110 of the transparent display. Alternatively, the processor 270 of the lamp may create a number 3120 corresponding to the distance between the vehicle 700 and the speed bump.

There is a difference in color, brightness or light intensity between light emitted outward through the area of the transparent display 250 in which the design 3130 or text 3120 is formed and light emitted outward through the area 3140 of the transparent display 250 in which neither design nor text is formed.

As light is emitted outward from the lamp with different colors, brightness or light intensities, detected speed bump information 3150 may be displayed on the projection surface. In this case, the speed bump information 3150 may be delivered to a following vehicle.

Figure 32:
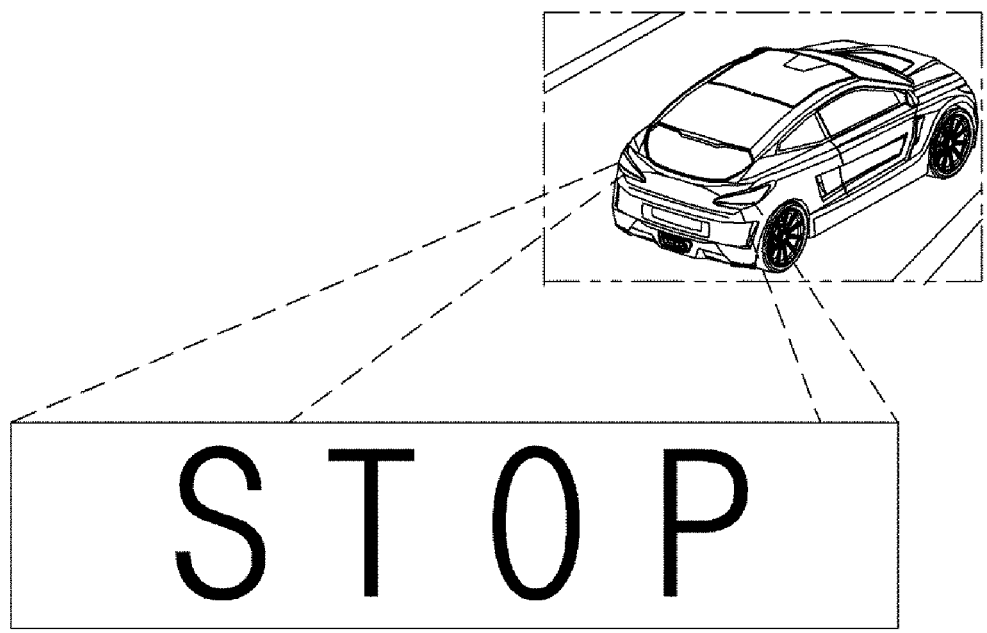

FIG. 32 illustrates an example of displaying information on fog taken as a projection surface.

The driver assistance system 100 may detect a foggy condition based on an image of the front view of the vehicle or an image of the surroundings of the vehicle. The communication unit 710 of the vehicle may receive foggy condition information about a current location. Herein, information about the current location may be detected by the location information module 714 or may be received from the AVN apparatus 400 or navigation apparatus (not shown).

When the vehicle 700 is traveling in a foggy space, the processor 270 of the lamp is configured to control the transparent display 250 to display predetermined information on the foggy space. Alternatively, the processor 270 of the lamp is configured to control the position adjustment unit 255 to adjust the position of the transparent display 250 to display the predetermined information on the foggy space. Alternatively, the processor 270 of the lamp is configured to control the light source position adjustment unit 268 to adjust the position of the light source 265 to display the predetermined information on the foggy space.

As information is delivered to a following vehicle using the fog as a projection surface, safe driving of the following vehicle may be ensured based on the delivered information.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and desired results still may be achieved. Similarly, components in the disclosed systems may be combined in a different manner and/or replaced or supplemented by other components and desired results still may be achieved.

As is apparent from the above description, at least one of the following effects can be obtained.

First, a transparent display is provided, and information having good visibility may be provided using light transmitted through the transparent display.

Second, forward objects information, rearward objects information, navigation information, vehicle condition information, vehicle driving information, in-vehicle situation information or driving environment information may be provided to the driver by securing good visibility of the information, thereby assisting the driver in driving and ensuring safe driving.

Third, information on the distance to an object in front of the vehicle may be provided to the driver by securing good visibility of the information, thereby allowing the driver to take an action according to the distance to the object in front of the vehicle.

Fourth, road information such as road inclination information or road curvature information may be provided to the driver by securing good visibility of the information, thereby assisting the driver in driving according to the conditions of a road on which the vehicle is traveling.

Fifth, detailed information such as front object detection information, navigation information, vehicle condition information, vehicle driving information, or in-vehicle situation information may be provided to other vehicles.

What is claimed is:

1. A lamp for a vehicle, comprising:
   at least one light source configured to generate light;
   a transparent display configured to allow at least a portion of the light to pass through the transparent display;
   a position adjustment unit configured to adjust a position of the transparent display; and
   a processor configured to control the transparent display to display, on a projection surface using the light, information related to the vehicle or driving conditions for the vehicle,
   wherein the processor is further configured to:
      receive user gaze information sensed by a camera,
      change an area of the transparent display that defines a content or a pattern based on the user gaze information, and
      control the position adjustment unit to change the position of the transparent display based on the user gaze information.

2. The lamp according to claim 1, wherein the processor is configured to control the transparent display to display a pattern on at least one area of the transparent display.

3. The lamp according to claim 1, wherein the processor is configured to display a predetermined content on the transparent display.

4. The lamp according to claim 1, further comprising:
   an aspheric lens configured to allow the light generated by the light source to be refracted and pass through the aspheric lens,
   wherein the transparent display is disposed at a front end or at a rear end of the aspheric lens.

5. The lamp according to claim 1, wherein the processor is configured to filter the information related to the vehicle or the driving conditions for the vehicle using an optical filter, wherein the optical filter is located at a windshield.

6. The lamp according to claim 1, wherein the projection surface is a road surface, and
   wherein the processor is configured to display driving lanes on the road surface.

7. The lamp according to claim 1, wherein the processor is configured to display the information related to the vehicle or the driving conditions for the vehicle between the driving lanes.

8. The lamp according to claim 7, wherein the processor is configured to display the information related to the vehicle or the driving conditions for the vehicle between the lanes based on curve information of a road on which the vehicle travels.

9. The lamp according to claim 1, further comprising:
an interface unit configured to receive the information related to the vehicle or the information related to the driving condition for the vehicle,
wherein the information related to the driving condition for the vehicle includes forward objects information, rearward objects information, navigation information, road information, or driving environment information,
wherein the information related to the vehicle includes vehicle condition information, vehicle driving information, or in-vehicle situation information, and
wherein the light source comprises a headlamp.

10. The lamp according to claim 9, wherein the interface unit receives distance information about a forward object ahead of the vehicle,
wherein the processor is configured to display the distance information on the projection surface.

11. The lamp according to claim 9, wherein the road information comprises gradient information or curve information of a road on which the vehicle travels,
wherein the processor is configured to display the gradient information or the curve information on the projection surface.

12. The lamp according to claim 9, wherein the forward objects information comprises traffic sign recognition (TSR) detection information or speed bump detection information,
wherein the processor is configured to display the TSR detection information or the speed bump detection information on the projection surface.

13. The lamp according to claim 12, wherein the TSR detection information comprises traffic signboard detection information, traffic light detection information, and road surface detection information,
wherein the processor is configured to display, on the projection surface, information based on a design or text marked on a traffic signboard, a signal output from a traffic light, or a design or text marked on a road surface.

14. The lamp according to claim 12, wherein the processor is configured to display, on the projection surface, a bump image based on the speed bump detection information.

15. The lamp according to claim 9, wherein the forward objects information comprises other-vehicle detection information, two-wheeled vehicle detection information, pedestrian detection information, traffic accident information, construction information, or road congestion information,
wherein the processor is configured to display the other-vehicle detection information, the two-wheeled vehicle detection information, the pedestrian detection information, the traffic accident information, the construction information, or the road congestion information on the projection surface.

16. The lamp according to claim 15, wherein the interface unit is configured to receive side vehicle detection information,
wherein the processor is configured to, based on the other-vehicle detection information, two-wheeled vehicle detection information or pedestrian detection information being received with the side vehicle detection information, display the other-vehicle detection information, two-wheeled vehicle detection information, or pedestrian detection information on a lane of a side vehicle.

17. The lamp according to claim 9, wherein the navigation information comprises driving route information, preset destination information, remaining distance information, driving area information, driving road information, or speed camera information, wherein the processor is configured to display the driving route information, the preset destination information, the remaining distance information, the driving area information, the driving road information, or the speed camera information on the projection surface.

18. The lamp according to claim 17, wherein the processor is configured to display a straight arrow, a left turn arrow, a right turn arrow, or a U-turn arrow on the projection surface as the driving route information.

19. The lamp according to claim 18, wherein the interface unit is configured to receive side vehicle detection information,
wherein the processor is configured to, based on the driving route information being received with the side vehicle detection information, display the straight arrow, the left turn arrow, the right turn arrow, or the U-turn arrow on the lane of the side vehicle as the driving route information.

20. The lamp according to claim 9, wherein the vehicle condition information comprises parking brake state information, high beam on/off information, washer liquid level information, engine oil level information, power source temperature information, remaining energy information, tire pressure information, brake oil condition information, or door opening information,
wherein the processor is configured to display the parking brake state information, the high beam on/off information, the washer liquid level information, the engine oil level information, the power source temperature information, the remaining energy information, the tire pressure information, the brake oil condition information, or the door opening information on the projection surface.

21. The lamp according to claim 9, wherein the vehicle driving information comprises driving speed information, gear shift information, or turn signal information delivered to a turn signal lamp,
wherein the processor is configured to display the driving speed information, the gear shift information, or the turn signal information on the projection surface.

22. The lamp according to claim 21, wherein the interface unit is configured to receive side vehicle detection information,
wherein the processor is configured to, based on the turn signal information being received with the side vehicle detection information, display the turn signal information on a lane of a side vehicle.

23. The lamp according to claim 9, wherein the interface unit is configured to receive user input provided through an input unit,
wherein the processor is configured to display, on the projection surface, in-vehicle situation information corresponding to the user input.

24. The lamp according to claim 23, wherein the in-vehicle situation information comprises patient evacuation situation information, or emergency aid request information, wherein the in-vehicle situation information is generated according to the user input.

25. The lamp according to claim 9, wherein the driving environment information comprises weather information or time information,
wherein the processor is configured to display the weather information or the time information on the projection surface.

26. The lamp according to claim 1, further comprising:
an interface unit configured to receive forward objects information, rearward objects information, navigation information, vehicle condition information, vehicle driving information, driving environment information, or in-vehicle situation information,
wherein the light source comprises a rear combination lamp.

27. The lamp according to claim 26, wherein the in-vehicle situation information comprises emergency aid information, infant-on-board information, or inexperienced driver information.

28. The lamp according to claim 26, wherein the processor is configured to, based on distance information about a rearward object behind the vehicle being received through the interface unit, adjust a distance between the projection surface and the rear combination lamp or an intensity of light emitted outward from the rear combination lamp according to the distance information.

29. The lamp according to claim 26, wherein the forward objects information comprises traffic sign recognition (TSR) detection information or speed bump detection information,
wherein the processor is configured to display the TSR detection information or the speed bump detection information.

30. The lamp according to claim 26, wherein the driving environment information comprises fog information, and
wherein the processor is configured to, based on the vehicle travelling in an area with fog, display the fog information in the area with fog.

* * * * *